United States Patent
Kapoor et al.

(10) Patent No.: US 9,063,978 B1
(45) Date of Patent: Jun. 23, 2015

(54) APPARATUSES, METHODS AND SYSTEMS FOR A FINANCIAL TRANSACTION TAGGER

(75) Inventors: Vikas Kapoor, New York, NY (US); Abhilash Madhavarapu, Nutley, NJ (US)

(73) Assignees: Igor US Inc., New York, NY (US); Igor Holdings Inc., New York, NY (US)

( * ) Notice: Subject to any disclaimer, the term of this patent is extended or adjusted under 35 U.S.C. 154(b) by 269 days.

(21) Appl. No.: 12/903,685

(22) Filed: Oct. 13, 2010

Related U.S. Application Data

(63) Continuation-in-part of application No. 12/763,320, filed on Apr. 20, 2010, and a continuation-in-part of application No. 12/760,948, filed on Apr. 15, 2010, and a continuation-in-part of application No. 12/762,570, filed on Apr. 19, 2010, and a continuation-in-part of application No. 12/763,331, filed on Apr. 20, 2010, and a continuation-in-part of application No. 12/762,577, filed on Apr. 19, 2010, said application No. 12/763,320 is a continuation of application No. 12/650,542, filed on Dec. 31, 2009, now abandoned, said application No. 12/760,948 is a continuation of application No. 12/650,493, filed on Dec. 30, 2009, now abandoned, said application No. 12/762,570 is a continuation of application No. 12/650,442, filed on Dec. 30, 2009, now abandoned, said application No. 12/763,331 is a continuation of application No. 12/650,530, filed on Dec. 30, 2009, now abandoned, said application No. 12/762,577 is a continuation of application No. 12/650,548, filed on Dec. 31, 2009, now abandoned.

(60) Provisional application No. 61/252,611, filed on Oct. 16, 2009.

(51) Int. Cl.
*G06F 17/30* (2006.01)

(52) U.S. Cl.
CPC .... G06F 17/30507 (2013.01); *G06F 17/30501* (2013.01)

(58) Field of Classification Search
USPC .......................................................... 707/769
See application file for complete search history.

(56) References Cited

U.S. PATENT DOCUMENTS

| | | |
|---|---|---|
| 5,117,356 A | 5/1992 | Marks |
| 5,262,942 A | 11/1993 | Earle |
| 5,442,780 A | 8/1995 | Takanashi et al. |
| 5,848,415 A | 12/1998 | Guck |
| 5,911,776 A | 6/1999 | Guck |
| 6,094,684 A | 7/2000 | Pallmann |
| 6,233,584 B1 | 5/2001 | Purcell |
| 6,381,599 B1 | 4/2002 | Jones et al. |

(Continued)

*Primary Examiner* — Rehana Perveen
*Assistant Examiner* — Hung Havan
(74) *Attorney, Agent, or Firm* — Daniel Bason, Esq.; Jacob P. Martinez, Esq.

(57) ABSTRACT

The APPARATUSES, METHODS AND SYSTEMS FOR A FINANCIAL TRANSACTION TAGGER (hereinafter "FTT") implement efficient and scalable monitoring, regulation, and allocation of computational processing, data, labor, and/or the like resources within an enterprise. In some embodiments, the FTT may facilitate, in various implementations, tagging transactions with transaction characteristics through the use of universal variables and economical interface features. In one embodiment, transaction data associated with a transaction and including at least a transaction identifier may be received. The transaction data may be analyzed, and contextual rules may be applied to the transaction to tag the transaction with transaction characteristics.

12 Claims, 45 Drawing Sheets

(56) References Cited

U.S. PATENT DOCUMENTS

| | | |
|---|---|---|
| 6,643,635 B2 | 11/2003 | Nwabueze |
| 6,654,806 B2 | 11/2003 | Wall et al. |
| 6,684,384 B1 | 1/2004 | Bickerton et al. |
| 6,952,714 B2 | 10/2005 | Peart |
| 7,155,433 B2 | 12/2006 | Lasken et al. |
| 7,284,005 B1 | 10/2007 | Wiryawan et al. |
| 7,379,934 B1 | 5/2008 | Forman et al. |
| 7,596,573 B2 | 9/2009 | O'Neil et al. |
| 7,603,378 B2 | 10/2009 | Ivanova |
| 7,613,740 B2 * | 11/2009 | Holenstein et al. ........... 370/400 |
| 7,822,653 B2 | 10/2010 | Hahn-Carlson et al. |
| 8,660,945 B1 * | 2/2014 | Pariante et al. ................. 705/39 |
| 2002/0087441 A1 | 7/2002 | Wagner, Jr. et al. |
| 2003/0158798 A1 * | 8/2003 | Green ............................ 705/30 |
| 2005/0125371 A1 * | 6/2005 | Bhide et al. ...................... 707/1 |
| 2005/0289469 A1 * | 12/2005 | Chandler et al. .............. 715/745 |
| 2006/0031547 A1 | 2/2006 | Tsui et al. |
| 2006/0070131 A1 | 3/2006 | Braddy et al. |
| 2007/0185791 A1 | 8/2007 | Chan et al. |
| 2008/0005197 A1 | 1/2008 | Chang et al. |
| 2008/0086365 A1 * | 4/2008 | Zollino et al. .................. 705/10 |
| 2008/0154873 A1 * | 6/2008 | Redlich et al. .................... 707/5 |
| 2008/0244689 A1 | 10/2008 | Dalton |
| 2009/0043840 A1 | 2/2009 | Cherukuri et al. |

* cited by examiner

FIGURE 2B

| CLIENT | APPLICATION | TITLE | FUNCTION | SUB FUNCTION | DEPARTMENT | PROGRAM | NAME |
|---|---|---|---|---|---|---|---|
| ALL | NUMSION | SVP | FINANCE | x | IQ,REC,COL,FIN | x | x |
| Client1 | CALL BAR | AVP | OPERATIONS | x | x | x | x |
| Client2 | QORUS | AVP | OPERATIONS | x | x | x | x |
| Client3 | QORUS | VP | OPERATIONS | x | x | x | x |
| Client4 | PROQOR | EVP | Talent | Center Management | x | x | x |
| Client5 | PROQOR | Agent | x | x | x | x,x,F,x,x | x |
| Client6 | ASPECT | Sr Agent | x | x | x | x | x |
| Client6 | PARS | VP | TECHNOLOGY | x | x | x | x |
| Client7 | SOFT PHONE | VP | x | x | x | x | x |

| FAMILY | SUB FAMILY | FIELD NAME | DISPLAY NAME | TYPE | CATEGORY | FUNCTION | FIELD | USED BY | Values |
|---|---|---|---|---|---|---|---|---|---|
| CANDIDATES | CANDIDATEIDENTIFIER | CANDIDATESSN | SSN | STATIC | PRIVATE | | | PRODOR | |
| CANDIDATES | CANDIDATEIDENTIFIER | CANDIDATESIN | SIN | STATIC | PRIVATE | | | PRODOR | |
| CANDIDATES | CANDIDATEIDENTIFIER | CANDIDATENIN | NIN | STATIC | PRIVATE | | | PRODOR | |
| CANDIDATES | CANDIDATENAME | CANDIDATEBIRTHDATE | DATE OF BIRTH | STATIC | PRIVATE | | | PRODOR | |
| CANDIDATES | CANDIDATENAME | CANDIDATEPREFIX | PREFIX | RESTRICTED TEXT | PRIVATE | | | PRODOR | |
| CANDIDATES | CANDIDATENAME | CANDIDATESUFFIX | SUFFIX | RESTRICTED TEXT | PRIVATE | | | PRODOR | |
| CANDIDATES | CANDIDATENAME | CANDIDATELASTNAME | LAST NAME | STATIC | PRIVATE | | | PRODOR | |
| CANDIDATES | CANDIDATENAME | CANDIDATEFIRSTNAME | FIRST NAME | STATIC | PRIVATE | | | PRODOR | |
| CANDIDATES | CANDIDATENAME | CANDIDATEMIDDLENAME | MIDDLE NAME | STATIC | PRIVATE | | | PRODOR | |
| CANDIDATES | CANDIDATENAME | CANDIDATENAME | NAME | DYNAMIC | PRIVATE | CONCATENATE | FIRSTNAME LASTNAME | PRODOR | |
| CANDIDATES | CANDIDATEADDRESS | CANDIDATEADDRESS | ADDRESS | STATIC | PRIVATE | | | PRODOR | |
| CANDIDATES | CANDIDATEADDRESS | CANDIDATECITY | CITY | STATIC | PRIVATE | | | PRODOR | |
| CANDIDATES | CANDIDATEADDRESS | CANDIDATEREGION | STATE | RESTRICTED TEXT | PRIVATE | | | PRODOR | |
| CANDIDATES | CANDIDATEADDRESS | CANDIDATEMAILCODE | POSTAL CODE | STATIC | PRIVATE | | | PRODOR | |
| CANDIDATES | CANDIDATEADDRESS | CANDIDATECOUNTRY | COUNTRY | RESTRICTED TEXT | PRIVATE | | | PRODOR | |
| CANDIDATES | CANDIDATEPHONE | CANDIDATEHOMEPHONE | HOME PHONE | STATIC | PRIVATE | | | PRODOR | |
| CANDIDATES | CANDIDATEPHONE | CANDIDATEWORKPHONE | WORK PHONE | STATIC | PRIVATE | | | PRODOR | |
| CANDIDATES | CANDIDATEPHONE | CANDIDATECELLPHONE | CELL PHONE | STATIC | PRIVATE | | | PRODOR | |
| CANDIDATES | CANDIDATEEMAIL | CANDIDATEPERSONALEMAIL | EMAIL | STATIC | PRIVATE | | | PRODOR | |
| CANDIDATES | CANDIDATEEMAIL | CANDIDATEWORKEMAIL | EMAIL | STATIC | PRIVATE | | | PRODOR | |
| CANDIDATES | CANDIDATEDEMOGRAPHICS | CANDIDATEGENDER | GENDER | RESTRICTED TEXT | PRIVATE | | | PRODOR | |
| CANDIDATES | CANDIDATEDEMOGRAPHICS | CANDIDATEETHNICITY | ETHNICITY | RESTRICTED TEXT | PRIVATE | | | PRODOR | |
| CANDIDATES | CANDIDATEDEMOGRAPHICS | CANDIDATEDISABILITY | DISABILITY | RESTRICTED TEXT | PRIVATE | | | PRODOR | |
| CANDIDATES | CANDIDATEDEMOGRAPHICS | CANDIDATEVETERAN | VETERAN | RESTRICTED TEXT | PRIVATE | | | PRODOR | |
| CANDIDATES | CANDIDATEDEMOGRAPHICS | CANDIDATEMILITARYBRANCH | MILITARY BRANCH | RESTRICTED TEXT | PRIVATE | | | PRODOR | |
| CANDIDATES | CANDIDATEEDUCATION | CANDIDATESCHOOLTYPE | SCHOOL TYPE | STATIC | PRIVATE | | | PRODOR | |
| CANDIDATES | CANDIDATEEDUCATION | CANDIDATESCHOOL | SCHOOL | STATIC | PRIVATE | | | PRODOR | |
| CANDIDATES | CANDIDATEEDUCATION | CANDIDATEFIELDOFSTUDY | FIELD OF STUDY | RESTRICTED TEXT | PRIVATE | | | PRODOR | |
| CANDIDATES | CANDIDATEEDUCATION | CANDIDATEDEGREE | DEGREE | RESTRICTED TEXT | PRIVATE | | | PRODOR | |
| CANDIDATES | CANDIDATEEDUCATION | CANDIDATEDURATIONOFSTUDY | DURATION OF STUDY | STATIC | PRIVATE | | | PRODOR | |
| CANDIDATES | CANDIDATEEMPLOYMENT | CANDIDATEEMPLOYER | EMPLOYER | STATIC | PRIVATE | | | PRODOR | |
| CANDIDATES | CANDIDATEEMPLOYMENT | CANDIDATEEMPLOYERPHONE | PHONE | STATIC | PRIVATE | | | PRODOR | |
| CANDIDATES | CANDIDATEEMPLOYMENT | CANDIDATEEMPLOYMENTFROM | FROM | STATIC | PRIVATE | | | PRODOR | |
| CANDIDATES | CANDIDATEEMPLOYMENT | CANDIDATEEMPLOYMENTTO | TO | STATIC | PRIVATE | | | PRODOR | |
| CANDIDATES | CANDIDATEEMPLOYMENT | CANDIDATEEMPLOYMENTTYPE | TYPE | RESTRICTED TEXT | PRIVATE | | | PRODOR | |
| CANDIDATES | CANDIDATEEMPLOYMENT | CANDIDATECOMPENSATION | COMPENSATION | STATIC | PRIVATE | | | PRODOR | |
| CANDIDATES | CANDIDATETEST | TESTDATE | DATE | STATIC | PRIVATE | | | PRODOR | |
| CANDIDATES | CANDIDATETEST | ANSWERSELECTED | ANSWER | RESTRICTED TEXT | PRIVATE | | | PRODOR | |
| CANDIDATES | CANDIDATETEST | FIRSTPARTYSCORE | FIRST PARTY | STATIC | PRIVATE | | | PRODOR | |
| CANDIDATES | CANDIDATETEST | THIRDPARTYSCORE | THIRD PARTY | STATIC | PRIVATE | | | PRODOR | |
| CANDIDATES | CANDIDATETEST | NUMBEROFTESTS | NUMBER | DYNAMIC | PRIVATE | | | PRODOR | |
| CANDIDATES | CANDIDATETEST | AVERAGEOFFIRSTPARTYSCORES | AVERAGE | DYNAMIC | PRIVATE | | | PRODOR | |

FIGURE 22A

| Access | Assets | Programs | Data | Delta | Crane | | | | | | | | | | |
|---|---|---|---|---|---|---|---|---|---|---|---|---|---|---|---|

| PROGRAM CODE | FILE |
|---|---|
| CCG.US.FC.TPR.001 | INBOUND.ZIP |
| CO.US.FC.T.PR.001 | |

22.01

22.05

FILE DETAILS
FILETYPE: INBOUND  22.10

FILE INFORMATION
NAME: INBOUND  22.15
TAG: NONE
EXTENSION: dat
FILE PASSWORD: *****
ENCRYPTION: *****
FROM: FTP
TO: QORUS

PRE POST PROCESSING
OPERATION | VALUE
BREAK RECORD | 147

FTP INFORMATION
LOCATION: ftp.abc.com   22.20
FOLDER: INBOUND
USER ID: *****
PASSWORD: *****
PORT #: 20
SSL: *****

| SUBFILE 1 | SUBFILE 2 |
|---|---|
| NAME | SUBFILE 1 |
| TAG | NONE |
| EXTENSION | dat |
| FILE PASSWORD | ***** |
| ENCRYPTION | ***** |

PRE POST PROCESSING
OPERATION | VALUE
JOIN RECORD | 147

LIMITER | VALUE | FUNCTION

CLARIFIER
VALUE | FUNCTION

WORKPAD
NONE

FIGURE 22B

| Access | Assets | Programs | Data | Delta | Crane | | | | WORKPAD | |
|---|---|---|---|---|---|---|---|---|---|---|
| | | | | | | | | | HOME | |
| | | | | LIMITER | | VALUE | FUNCTION | | | |
| | | | | | | 22 30 | | | | |
| | | | | | | | | | VALUE | CLARIFIER FUNCTION |
| PROGRAM CODE | FILE | FAMILY | SUB FAMILY | FIELD | | | | | | |
| CC0.USFC.TPR.001 | INBOUND | CONSUMER | CONSUMERIDENTIFIER | CONSUMERSSN | | | | | | |
| C01.USFC.T PR.001 | | ACTIVITY | ACTIVITYANALYSIS | PROFITMARGIN | | | | | | |
| | | CONSUMER | CONSUMERIDENTIFIER | CONSUMERACCOUNTNUMBER | | | | | | |
| | | CONSUMER | CONSUMERNAME | CONSUMERLASTNAME | | | | | | |
| | | CONSUMER | CONSUMERNAME | CONSUMERFIRSTNAME | | | | | | |
| | | CONSUMER | CONSUMERNAME | CONSUMERMIDDLENAME | | | | | | |
| | | CONSUMER | CONSUMERNAME | CONSUMERNAME | | | | | | |
| | | CONSUMER | CONSUMERADDRESS | CONSUMERADDRESSTYPE | | | | | | |
| | | CONSUMER | CONSUMERADDRESS | CONSUMERADDRESS | | | | | | |
| | | CONSUMER | CONSUMERADDRESS | CONSUMERCITY | | | | | | |
| | | CONSUMER | CONSUMERADDRESS | CONSUMERSTATECODE | | | | | | |
| | | CONSUMER | CONSUMERADDRESS | CONSUMERSTATENAME | | | | | | |
| | | CONSUMER | CONSUMERADDRESS | CONSUMERPROVINCECODE | | | | | | |
| | | CONSUMER | CONSUMERADDRESS | CONSUMERPROVINCENAME | | | | | | |
| | | CONSUMER | CONSUMERADDRESS | CONSUMERZIPCODE | | | | | | |
| | | CONSUMER | CONSUMERADDRESS | CONSUMERPOSTALCODE | | | | | | |
| | | CONSUMER | CONSUMERADDRESS | CONSUMERPINCODE | | | | | | |
| | | CONSUMER | CONSUMERADDRESS | CONSUMERTIMEZONE | | | | | | |
| | | CONSUMER | CONSUMERADDRESS | CONSUMERCOUNTRYCODE | | | | | | |
| | | CONSUMER | CONSUMERADDRESS | CONSUMERCOUNTRYNAME | | | | | | |
| | | CONSUMER | CONSUMERADDRESS | CONSUMERADDRESSTAG | | | | | | |
| | | CONSUMER | CONSUMERADDRESS | CONSUMERADDRESSPROBABILITY | | | | | | |
| | | CONSUMER | CONSUMERADDRESS | CONSUMERMAILRETURNINDICATOR | | | | | | |
| | | CONSUMER | CONSUMERADDRESS | CONSUMERMAILRETURNDATE | | | | | | |
| | | CONSUMER | CONSUMERPHONE | CONSUMERPHONETYPE | | | | | | |
| | | CONSUMER | CONSUMERPHONE | CONSUMERPHONE | | | | | | |
| | | CONSUMER | CONSUMERPHONE | CONSUMERPHONEEXTENSION | | | | | | |
| | | CONSUMER | CONSUMERPHONE | CONSUMERFAX | | | | | | |
| | | CONSUMER | CONSUMERPHONE | CONSUMERPHONETAG | | | | | | |

| ID | FROM | TO | FREQUENCY | LIMITER OPERATION | FUNCTION | CHOOSER OPERATION KEY | CLAIFIER OPERATION FUNCTION |
|---|---|---|---|---|---|---|---|
| CLIENT1 PRICING | QORUS | NUVISION | Monthly | | | | |
| CLIENT2 PRICING | QORUS | NUVISION | | | | | |
| DEBTOR INFO | PROD REPORTING | QORUS | | | | | |
| CLIENT3 SHORT | DB1 | NUVISION | | | | | |
| CLIENT3 LONG | DB1 | NUVISION | | | | | |
| 26 01 | 26 05 | 26 10 | 26 15 | | 26 20 | 26 25 | 26 30 |

FIGURE 27A

| Access | Assets | Programs | Data | Delta | Crane | | | | |
|---|---|---|---|---|---|---|---|---|---|
| AUTHOR | NAME | DISTRIBUTION | FREQUENCY | L | LIMITER | VALUE | FUNCTION | CHOOSER | APPLICATION | CLARIFIER | VALUE |

| AUTHOR | NAME | DISTRIBUTION | FREQUENCY | LIMITER | VALUE | FUNCTION | CHOOSER | APPLICATION | CLARIFIER | VALUE |
|---|---|---|---|---|---|---|---|---|---|---|
| JOHN DOE<br>JOHN DOE<br>JERRY SMITH<br>_27.01_ | CLIENT1 PRICING<br><br><br>_27.05_ | _27.10_ | WEEKLY<br>_27.15_ | PROGRAMCODE = CL1.USMI.FP.HR AND<br>PLACEMENTMONTH = AUG2008<br>_27.20_ | | GROUP BY | PERCENTLIQUIDATION<br>NUMBEROFACCOUNTS<br>NUMBEROFPLACEMENTS<br>PERCENTLIQUIDATION<br>NUMBEROFACCOUNTS<br>NUMBEROFPLACEMENTS<br>PERCENTLIQUIDATION<br>NUMBEROFACCOUNTS<br>NUMBEROFPLACEMENTS<br>NUMBEROFACCOUNTS<br>NUMBEROFPLACEMENTS<br>RECALLDATE<br>PENETRATIONRATE<br>NUMBEROFDIALATTEMPTS<br>NUMBEROFPLACEMENTS<br>CONNECTRATE<br>NUMBEROFACCOUNTS<br>NUMBEROFPLACEMENTS<br>CONTACTRATE<br>NUMBEROFACCOUNTS<br>NUMBEROFPLACEMENTS<br>PROMISERATE<br>NUMBEROFACCOUNTS<br>NUMBEROFACCOUNTS<br>KEPTRATE<br>NUMBEROFACCOUNTS<br>NUMBEROFACCOUNTS<br>%QUICKPAYMENTS<br>NUMBEROFACCOUNTS<br>NUMBEROFACCOUNTS | QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>QORUS<br>_27.25_ | DIALEDDATE >= PLACEMENTD/<br>DIALEDDATE <= PLACEMENTD/<br>CALLRESULT = PROMISE<br>_27.30_ | |

| | 27 40 | 27 45 | 27 50 | 27 55 | 27 60 | 27 65 | |
|---|---|---|---|---|---|---|---|
| | A | B | C | D | E | F | G |
| 1 | CALLACCOUNTNUMBER | CALLUSERNAME | CALLPHONENUMBER | CALLRESULT | EXTENDED RESULT | CALLDATE | |
| 2 | 2089068 | | 2505552734 | BUSY | | 12/29/2009 13:00 | |
| 3 | 732578 | | 6045550198 | BUSY | | 12/29/2009 13:06 | |
| 4 | 1048685 | | 5065559441 | NO ANSWER | | 12/29/2009 8:06 | |
| 5 | 1797521 | | 9025558514 | NO ANSWER | | 12/29/2009 8:06 | |
| 6 | 2357994 | | 7095559354 | NO ANSWER | | 12/29/2009 8:08 | |
| 7 | 2548592 | | 9025557864 | NO ANSWER | | 12/29/2009 8:08 | |
| 8 | 873844 | | 2225552222 | NO ANSWER | | 12/29/2009 8:08 | |
| 9 | 2977502 | | 5065553891 | NO ANSWER | | 12/29/2009 8:10 | |
| 10 | 996892 | | 5065559087 | NO ANSWER | | 12/29/2009 8:10 | |
| 11 | 667345 | | 9025554605 | ABANDON | | 12/29/2009 8:10 | |
| 12 | 1452804 | | 5065555725 | RIGHT PARTY | RIGHT PARTY PROMISE | 12/29/2009 8:10 | |
| 13 | 1252063 | | 9025559366 | RIGHT PARTY | RIGHT PARTY ALREADY PAID | 12/29/2009 8:10 | |
| 14 | 426601 | | 9025559101 | RIGHT PARTY | RIGHT PARTY | 12/29/2009 8:10 | |
| 15 | 2975928 | | 5065558975 | RIGHT PARTY | RIGHT PARTY PROMISE | 12/29/2009 8:12 | |
| 16 | 1751999 | | 7095553802 | RIGHT PARTY | RIGHT PARTY ALREADY PAID | 12/29/2009 8:12 | |
| 17 | 2682201 | | 9025556825 | RIGHT PARTY | RIGHT PARTY PROMISE | 12/29/2009 8:12 | |
| 18 | 2994622 | | 5065554719 | NO ANSWER | | 12/29/2009 8:12 | |
| 19 | 1523794 | | 9025552013 | NO ANSWER | | 12/29/2009 8:12 | |
| 20 | 3063609 | | 5195556713 | NO ANSWER | | 12/29/2009 8:12 | |
| 21 | 2458941 | | 5065550443 | NO ANSWER | | 12/29/2009 8:14 | |
| 22 | 1242486 | | 9025559360 | NO ANSWER | | 12/29/2009 8:14 | |
| 23 | 1908813 | | 5065559400 | NO ANSWER | | 12/29/2009 8:14 | |
| 24 | 1190669 | | 5065559242 | NO ANSWER | | 12/29/2009 8:14 | |
| 25 | 2953636 | | 9025553453 | NO ANSWER | | 12/29/2009 8:16 | |
| 26 | 2659688 | | 7095553645 | NO ANSWER | | 12/29/2009 8:16 | |
| 27 | 1685619 | | 9025550008 | NO ANSWER | | 12/29/2009 8:16 | |
| 28 | 1511278 | | 5065552830 | NO ANSWER | | 12/29/2009 8:16 | |

US 9,063,978 B1

APPARATUSES, METHODS AND SYSTEMS FOR A FINANCIAL TRANSACTION TAGGER

PRIORITY CLAIM AND RELATED APPLICATIONS

This application is a Non-Provisional of and claims priority under 35 U.S.C. §119 to prior U.S. Provisional Patent Ser. No. 61/252,611 entitled, "Apparatuses, Methods and Systems for Tailored and Customizable Management of Enterprise and Human Resources," filed Oct. 16, 2009.

This application is also a Continuation-In-Part of and claims priority under 35 U.S.C. §120 to prior U.S. Non-Provisional patent application Ser. No. 12/763,320 entitled, "Apparatuses, Methods and Systems for a Descriptive Business Grammar Syntax Querier," filed Apr. 20, 2010, which in turn claims priority to prior U.S. Non-Provisional patent application Ser. No. 12/650,542 entitled, "Apparatuses, Methods and Systems for a Descriptive Business Grammar Syntax Querier," filed Dec. 31, 2009.

This application is also a Continuation-In-Part of and claims priority under 35 U.S.C. §120 to prior U.S. Non-Provisional patent application Ser. No. 12/760,948 entitled, "Apparatuses, Methods and Systems for a Universal Data Librarian," filed Apr. 15, 2010, which in turn claims priority to prior U.S. Non-Provisional patent application Ser. No. 12/650,493 entitled, "Apparatuses, Methods and Systems for a Universal Data Librarian," filed Dec. 30, 2009.

This application is also a Continuation-In-Part of and claims priority under 35 U.S.C. §120 to prior U.S. Non-Provisional patent application Ser. No. 12/762,570 entitled, "Apparatuses, Methods and Systems for a Global Data Exchange," filed Apr. 19, 2010, which in turn claims priority to prior U.S. Non-Provisional patent application Ser. No. 12/650,442 entitled, "Apparatuses, Methods and Systems for a Global Data Exchange," filed Dec. 30, 2009.

This application is also a Continuation-In-Part of and claims priority under 35 U.S.C. §120 to prior U.S. Non-Provisional patent application Ser. No. 12/763,331 entitled, "Apparatuses, Methods and Systems for an Automated Data Extractor," filed Apr. 20, 2010, which in turn claims priority to prior U.S. Non-Provisional patent application Ser. No. 12/650,530 entitled, "Apparatuses, Methods and Systems for an Automated Data Extractor," filed Dec. 30, 2009.

This application is also a Continuation-In-Part of and claims priority under 35 U.S.C. §120 to prior U.S. Non-Provisional patent application Ser. No. 12/762,577 entitled, "Apparatuses, Methods and Systems for a Real-Time Desktop Configurer," filed Apr. 19, 2010, which in turn claims priority to prior U.S. Non-Provisional patent application Ser. No. 12/650,548 entitled, "Apparatuses, Methods and Systems for a Real-Time Desktop Configurer," filed Dec. 31, 2009.

This application is also related to co-pending U.S. Non-Provisional patent application Ser. No. 12/903,660 filed Oct. 13, 2010, entitled "Apparatuses, Methods and Systems for a Journal Entry Automator,"; U.S. Non-Provisional patent application Ser. No. 12/903,718 filed Oct. 13, 2010, entitled "Apparatuses, Methods and Systems for a Chart of Accounts Simplifier,".

The entire contents of the aforementioned applications are herein expressly incorporated by reference.

FIELD

The present invention is directed generally to apparatuses, methods, and systems of classification automation, and more particularly, to APPARATUSES, METHODS AND SYSTEMS FOR A FINANCIAL TRANSACTION TAGGER.

BACKGROUND

Accounting is used to communicate financial information regarding a business entity. This financial information is based on the financial transactions performed by the business entity. In modern accounting, double-entry bookkeeping system, in which every transaction impacts at least two ledger accounts, is used to keep track of the transactions. Usually, transactions are kept in journals and totaled at the end of the quarter. The quarterly total is then entered into the ledger accounts. Recently, accounting software has become available that allows the use of a computer to help with accounting tasks.

SUMMARY

The APPARATUSES, METHODS AND SYSTEMS FOR A FINANCIAL TRANSACTION TAGGER (hereinafter "FTT") implement efficient and scalable monitoring, regulation, and allocation of computational processing, data, labor, and/or the like resources within an enterprise. In some embodiments, the FTT may access data via a plurality of universal variables linked to tables and/or fields across multiple, otherwise disparate database systems, providing economical access to data in those tables and/or fields. In some implementations, the universal variables may be selectively chosen for broad applicability to a vast swath of enterprise data types and organizations, and may themselves be organized in accordance with a hierarchical schema facilitating business understanding and decision making. The FTT may further facilitate, in various implementations, report generation, data accessibility, scheduled and/or triggered distribution of data updates, and/or the like through the use of universal variables and economical interface features.

In various implementations and embodiments, FTT systems may facilitate: generation and maintenance of a universal business data library; a descriptive business grammar linked to and substantially tracking tables within the universal business data library and search methodologies based thereon; a global data exchange and universal data mapping tool; an automated data extractor; accounting journal entry automation and a chart/report clarifier; elimination of cash reconciliation requirements; invoice generation; a global payroll engine; cost center automation and graphical management; a universal payment integrator; transactional tagging; thin-client virtualization, tailored application provision, and device configuration; softphone configuration and personalization; storage configuration; user interface configuration and personalization; rules-based world wide web restriction; call recording and searching; payclock virtualization; call restriction and regulation; disclosure and/or disclaimer automation; rules-based referral bonus generation and payment tracking; emotional aptitude evaluation; streamlined labor resource allocation; purse-based global benefits planning; universal form resources; an integrated employee training platform; automatic reimbursement facilitation; graphical interactive voice response system programming; hardware asset utilization tracking and reporting; target contact estimation tools; strategic auto-dialing; estimation tools for payment collection efficacy; action sequence tools for collection strategy implementations; and/or the like and use of the FTT.

In one embodiment, transaction data associated with a transaction and including at least a transaction identifier may be received. The transaction data may be analyzed, and contextual rules may be applied to the transaction to tag the transaction with transaction characteristics.

BRIEF DESCRIPTION OF THE DRAWINGS

The accompanying appendices and/or drawings illustrate various non-limiting, example, inventive aspects in accordance with the present disclosure:

FIG. 16 shows an implementation of a user interface for universal variable allocation in one embodiment of FTT operation;

FIGS. 22A-C show implementations of a user interface for data exchange specification in one embodiment of FTT operation;

FIG. 26 shows an implementation of a user interface for database integration in one embodiment of FTT operation;

FIGS. 27A-C show implementations of a user interface for report generation and generated reports in one embodiment of FTT operation;

Appendix A includes further details of an implementation of hierarchically arranged universal variables for a universal data library in one embodiment of FTT operation.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Application Tailoring and Device Virtualization/Configuration

Figure 1:
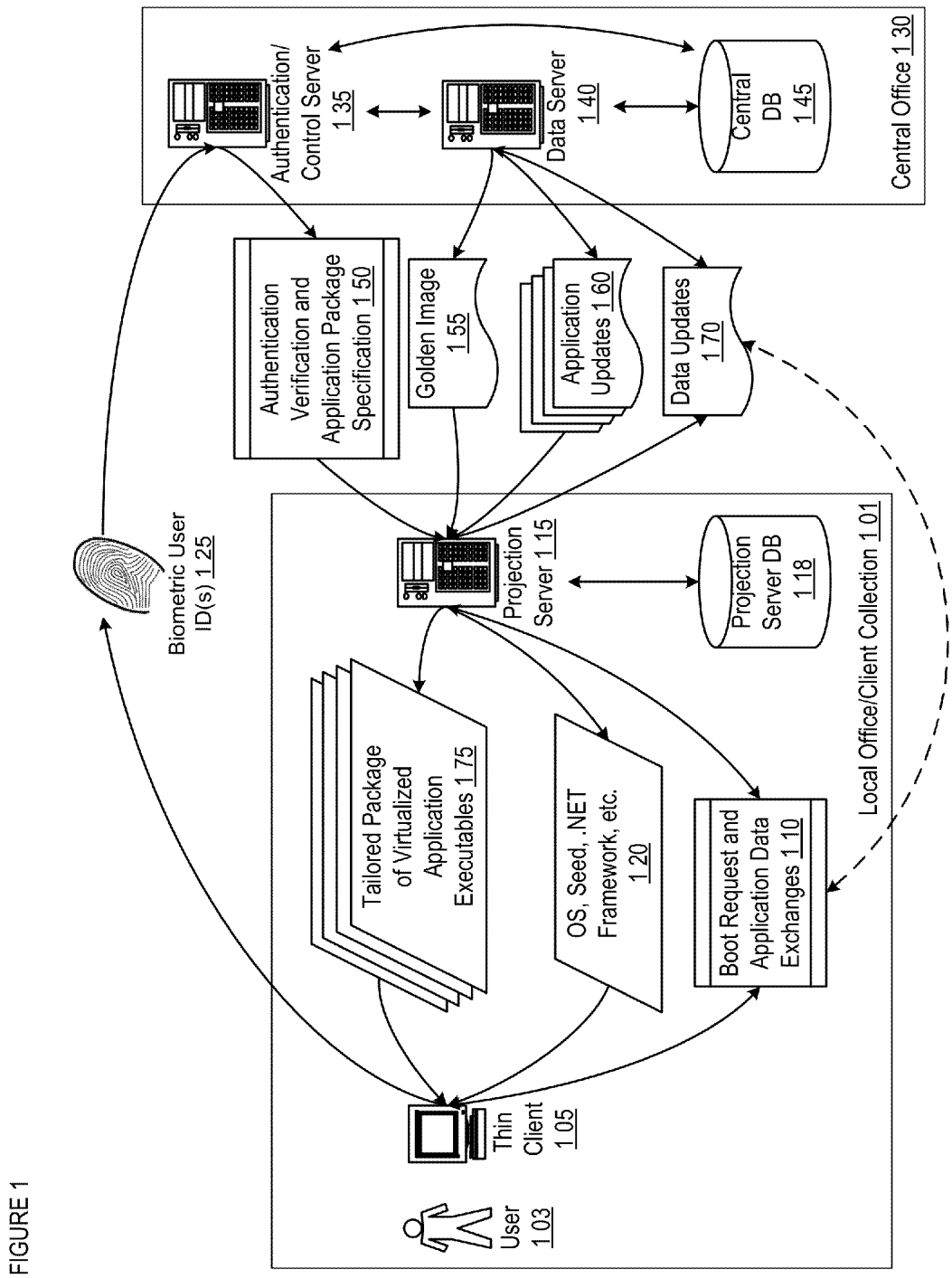
FIG. 1 illustrates an implementation of data flow among and between FTT components and/or affiliated entities for user authentication and application resource allocation in one embodiment of FTT operation.
Figure 2:
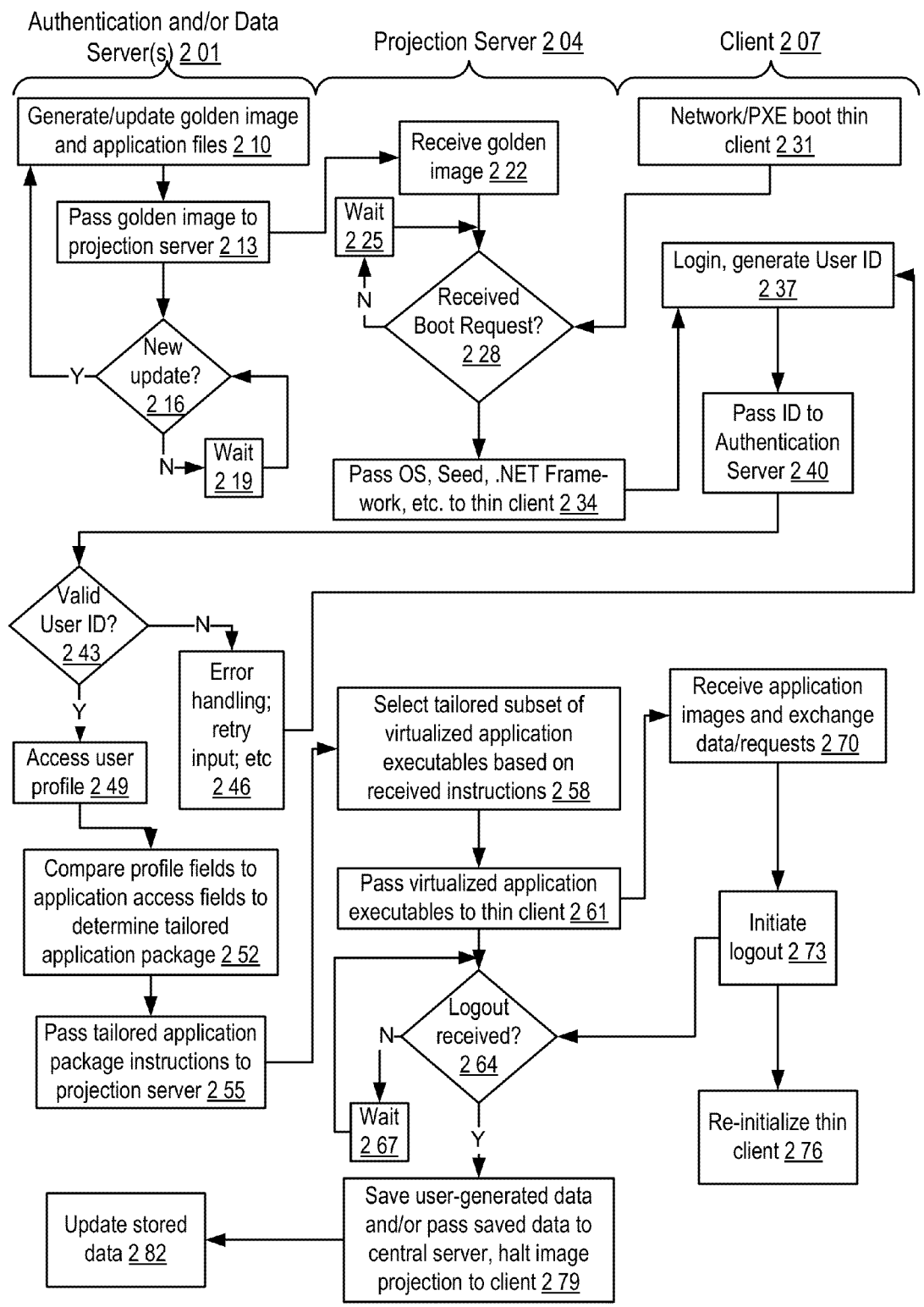
FIG. 2A shows an implementation of logic flow for user authentication and application resource allocation in one embodiment of FTT operation.
FIG. 2B shows an implementation of a user interface for specifying user application privileges in one embodiment of FTT operation.

FIG. 1 illustrates a dataflow of an example embodiment of FTT operation among and between FTT components and/or affiliated entities for user authentication and application resource allocation. A variety of other compositions and arrangements of FTT components and affiliated entities may be used in alternative embodiments of FTT operation. For example, in one embodiment, a FTT, requesting system, and database may all be localized within a single computing terminal. In another embodiment, the FTT may receive input strings over a network from one or more mobile devices and provide access to data from one or more databases in response to such received strings. The data flow shown in FIG. 1 is intended for illustrative purposes only, and to describe aspects of a particular embodiment.

In one embodiment, the FTT includes facilities for thin client virtualization and application tailoring based on user identities and/or profiles. In one implementation, a FTT computing environment may include a local office and/or collection of client terminals 101, wherein each client terminal 105 operated by a user 103 may comprise a thin client. In one implementation, the thin client may have no operating system initially installed. The computing environment may further include a projection server 115 communicatively coupled to the plurality of client terminals 105 in the local office. In one implementation, the projection server 115 may be situated locally with respect to the plurality of client terminals 105. In one implementation, the projection server may comprise a plurality of servers configured as a cloud computing facility. The computing environment may further include a central office facility 130 comprising one or more data 140 and/or authentication servers 135. A data server 140 in the central office may maintain and/or provide access to a central database 145, which may include master copies of one or more operating systems, applications, data files and/or database tables and/or the like. In one implementation, the data server may supply a so-called Golden Master or Golden Image 155 to the projection server 115, such as on a periodic basis, whenever requested by the projection server, whenever updates are made, and/or the like. The Golden Image 155 may, in one implementation, include an operating system destined for installation on one or more client terminals. The Golden Master may include additional files as well in various implementations, such as an authentication application, seed and/or compressed files for other applications, .NET framework files, and/or the like. The data server 140 may further provide a plurality of application files, application file updates 160, data values and/or updates 170, and/or the like to the projection server, which may be destined for installation and/or use on one or more of the client terminals. The projection server 115 may store received application files, data, and/or the like in a projection server database 118. In one implementation, the data server 140 may directly exchange data with one or more client terminals 105, including updated data values, records stored in the central database 145, and/or the like. In one implementation, application files may be "virtualized" prior to installation on the client terminals. In one implementation, application virtualization may be achieved using VMWare Thinapp. In one implementation, application virtualization occurs after application files are received at the projection server. In an alternative implementation, application files are virtualized at the central office, and virtualized application files are then provided to the projection server.

At power on, a client terminal 105 may be configured to boot from a communications network instead of from any local disk. In one implementation, a Preboot Execution Environment (PXE) boot may be engaged to boot the client terminal from the network, wherein the client polls for, contains, and/or is provided an address on the network to obtain boot information and/or to send a boot request. The client terminal's boot request 110 may be relayed to the projection server 115 which, in turn, may provide elements of the Golden Image, such as operating system files, application and/or authentication seed files, .NET framework files, and/or the like 120 for installation at the client terminal. Authentication seed files may then allow a user to submit authentication information in order to identify the user and/or initiate provision of further files and/or application use authorizations. In one implementation, the client terminal may be equipped with one or more biometric login devices (e.g., fingerprint and/or palmprint scanner, retina scanner, facial recognition scanner, earshape recognition scanner, voice recorder, typing rhythm analyzer, and/or the like) configured to admit biometric data associated with a user 125. In one example embodiment, a Digital Persona U.are.U. Fingerprint Reader is employed, which captures an image of the users fingerprint, converts it to a binary format and provides it via a Digital Persona service to the Authentication Control Server 135 server for authentication. In one implementation, software used to engage the one or more biometric login devices is provided from the Golden Image by the projection server to the client terminal after a boot request is made. In one implementation, other authentication measures may be used in place of and/or in addition to biometric authentication, such as use of a password, key device, secret question, and/or the like.

The user may engage the biometric login device and/or any other authentication measures to submit user identification information 125 to an authentication server 135, such as may be located at a central office 130. The authentication server may then verify and/or authenticate the user identification information, such as by comparing it against stored user identification information, e.g., as may be stored in a central database 145, ensuring a match beyond a specified threshold, and/or the like. If a match is detected, the authentication server 135 may query a database (e.g., the central database 145) for a matching user's profile to determine user access authorizations contained therein, such as a package of applications that should be provided to the user. In one implementation, the FTT may employ Microsoft Active Directory for administration of user access and authorizations, which may run on the Data Server. Based on the user identifier (ID) and/or information in an associated user profile, the FTT may determine one or more applications that the user is permitted to access. In one implementation, the applications a user may access may be correlated with one or more of a user's company, a user's department, a user's employment position, a user's location, a user's assignment, and/or the like. The authentication server 135 may provide an instruction 150 to the projection server 115 to provide authorized application files to the client terminal 105 at which the user 103 is logged in. In turn, the projection server may provide application files 175, such as in the form of executable virtualized application files, to the client terminal at which the user is logged in. In one implementation, the user may be required to periodically re-enter login and/or authentication information to ensure that they are still the user of that client terminal, and that another user has not taken their place.

FIG. 2A shows an implementation of logic flow for user authentication and application resource allocation in one embodiment of FTT operation. The implementation in FIG. 2A indicates entities that may perform aspects of the method shown in some implementations, including authentication and/or data server(s) 201, a projection server 204, and a client terminal 207. The authentication and/or data server(s) 201 may generate and/or update a golden image, application files, data tables and/or records, and/or the like 210 and may pass the golden image and/or other updates to the projection server 213, which receives them at 222. The authentication and/or data server(s) may subsequently determine whether new updates are available for a new golden image 216 and, if not, then wait for a period of time before checking again 219. The projection server, in one implementation, may store the received golden image, application files, data files, and/or the like, such as in a database and/or in temporary storage.

A client terminal may be booted, such as on machine startup, to initiate a network (e.g., PXE) boot 231, passing a boot request over the network, such as to the projection server 204. The projection server 204, in turn, may monitor and/or determine whether a boot request has been received 228. If not, the projection server may wait for a period of time before checking again for a boot request 225. In one embodiment, the boot request may be configured in accordance with the Preboot Execution Environment (PXE) Specification v. 2.1 standard.

Once the request is received, the projection server may pass files and/or data to the client terminal 234, such as by employing HP Image Manager. In one implementation, the projection server may provide all or aspects of the Golden Image to the client terminal, such as: operating system files; .NET framework files, Java files, and/or the like; application seed files; authentication and/or login input (e.g., biometric) files; and/or the like. The client starts the boot process and begins to copy and unpackage the materials provided from the projection server. Using files received from the projection server which have now been executed/instantiated, a user at the client terminal may login and/or otherwise generate a user ID 237. In one implementation, the user ID generated at 237 comprises a biometric user ID, such as but not limited to a thumbprint or scan; a print or scan of any other finger, combination of fingers, part of the palm, and/or the like; an iris or retina scan; facial image scan; earshape image scan; voice audio data; and/or the like. For example, one of the packages received at the thin client may be DigitalPersona Pro and/or other thumbprint device drivers and capture programs. The generated user ID may then be passed to the authentication and/or data server(s) 240 (e.g., by sending it via FTP, HTTP Post, SSH, FTPS, SFTP, HTTPS, another Digital Persona service, and/or the like), which may then determine whether the received ID is valid 243. For example, the send message may include an image converted to binary format and may be sent to a server-side component of DigitalPersona Pro fingerprint authentication application, which will perform the recognition/identification of the biometric identifier. In one implementation, this determination may be made based on a comparison of the received ID with stored IDs, stored ID formatting information, and/or the like. If the user ID is determined to be invalid at 243, an error handling procedure may be undertaken, a request may be transmitted for reentry and/or retransmission of the user ID information, and/or the like 246.

For valid user IDs, the authentication and/or data server(s) may access user information and/or a user profile associated with the user ID 249. Accessed user information may then be used to determine which applications to include in a tailored application package for that user 252. For example, in one implementation, a user profile may have fields identifying authorized applications for that user. In another implementation, profile fields may be compared with application access fields defined separately for the applications, and those applications having appropriately matching fields with the user profile may be selected for that user. For example, a user profile and/or other user information may, in one implementation, identify a department code, program code, and/or the like structured syntax string associated with the user (e.g., as may be see in FIGS. 6-7), and various applications may also have associations with various department codes, program codes, and/or the like. The authentication and/or data server(s) may then, in this implementation, instruct provision applications sharing one or more department codes, program codes, and/or the like with those of the user to the user's client terminal. In one implementation, some or all of the determination of which applications to provide to the user may take place at the projection server, and the authentication and/or data server(s) may provide sufficient information to the projection server to allow it to complete the identification of user-appropriate applications.

Once the appropriate package of applications is determined for the user, the authentication and/or data server(s) may pass an instruction message to the projection server 255, the message comprising, in one implementation, specification of applications to be provided to the user. The projection server may receive the instruction and select a package of tailored application files to provide to the client terminal 258. In one implementation, the projection server may select and provide to the client terminal a plurality of virtualized application executable files corresponding to selected applications. For example, FIG. 2B shows an implementation of a user interface for specifying user application privileges in one embodiment of FTT operation. The user interface provides a system administrator with facilities to specify a policy, rule, and/or the like delineating which employees, groups of employees, third parties, and/or the like should receive which applications and/or application packages. In the illustrated implementation, a user may specify at 285 a client and/or group of clients to which a particular specified application distribution and/or access rule and/or policy should be applied. The application may be specified at 286, and characteristics of users, employees, groups, departments, and/or the like who should receive and/or be allowed to use that application may be specified at 287-292. For example, access characteristics may include an employee title 287, an employee function 288, an employee subfunction 289, a department (as may be specified by a department code, which is discussed in further detail below and with reference to FIG. 7) 290, a program (as may be specified by a program code, which is discussed in further detail below and with reference to FIG. 6) 291, an employee name 292, and/or the like. The interface therefore provides both for specification of application privileges for wide classes of users, as well as for user-friendly exception handling whereby a single user or highly specific class of users may be given special access privileges as needed.

In some implementations, application files received from the authentication and/or data server(s) at 222 may be virtualized at the projection server, such as via application of VMWare's Thinapp to the application files to yield virtualized application executables, such as in .EXE format. In another implementation, application files may be virtualized at the authentication and/or data server(s), and the virtualized application executables provided to the projection server for temporary storage until they are to be provided to the client terminals.

In one implementation, virtualized application executables may be pushed to the thin client using a secure file transfer protocol, secure shell (SSH), and/or the like.

The projection server passes the virtualized application executables to the client terminal 261, which receives, unpackages, and/or runs the files to engage the applications at the client terminal, including exchanges of data related to operation of those applications 270. The projection server may then monitor whether a logout request has been received from the client terminal 264 and, if not, may wait until such a request is received 267. The user at the client terminal may then initiate a logout when he or she is finished with the application session 273, precipitating a re-initialization of the client terminal, whereby data updates are passed over the network to one or more targets, and the client terminal is returned to its pre-login and/or pre-boot state 276. In one embodiment, the terminal may erase (e.g., securely) the contents of its memory to ensure a pre-boot state and enhance security, for example, by issuing root/admin level format command on the storage mechanism, e.g., hard drive. In one implementation, user generated data and/or other saved data may be persisted and/or passed to the authentication and/or data server(s) by the projection server, and projection of application images to the client terminal ceased 279. In an alternative implementation, the client terminal may itself communicate directly with the authentication and/or data server(s) to provide data update information. Data updates received by the authentication and/or data server(s) may be stored and/or persisted, such as in a central database 282.

Figure 3:
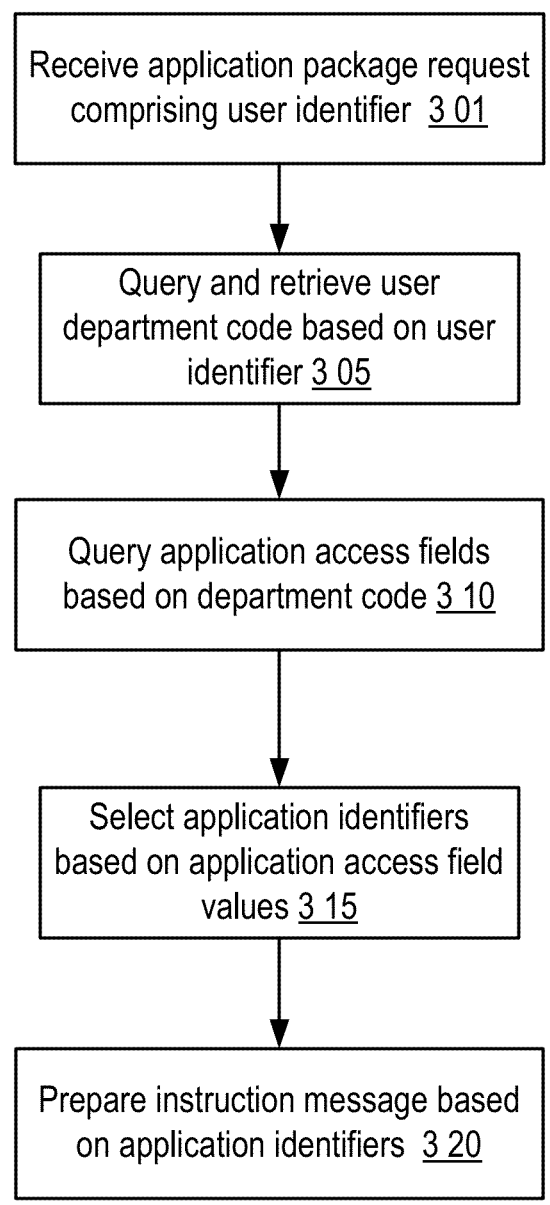
FIG. 3 shows an implementation of logic flow for application tailoring based on department codes in one embodiment of FTT operation.

FIG. 3 shows an implementation of logic flow for application tailoring based on department codes in one embodiment of FTT operation. In one implementation, the method illustrated in FIG. 3 may be operable on an authentication and/or data server. An application package request is received, the request comprising at least a user identifier 301. In another implementation, the request may further comprise a client terminal identifier and/or other information to assist in selecting an application package and/or providing requested applications to a client terminal device. A user department code may be queried based on the user identifier 305, such as, in one implementation, by accessing a user profile containing a department code (e.g., see FIG. 7 for more detail on department codes) associated with the user. A query may then be submitted for application access fields based on the department code 310. In one implementation, application access fields may specify applications accessible to users associated with the particular department code. Application identifiers may be selected based on the application access fields 315, and an instruction message may be prepared including the application identifiers 320. In an alternative implementation, application identifiers may be directly selected based on a department code and/or other user information, and/or a rules-based system may specify correspondences between application identifiers and department codes and/or other user information. An example of user information for obtaining application access may take a form similar to the following XML example:

<user info>
<name> John.Smith </name>
<title> Agent </title>
<function> Operations </function>
<subfunction> "blank"</subfunction>
<department code> CORP1.OPS.US.CS.TEAM1 </department code>
</user info>

In one implementation, one or more fields of user information (e.g., name and department code) may be mandatory, with remaining fields optional. An example of a instruction message response to user information for application access may comprise a list of application identifiers and may, in one implementation, take a form similar to the following XML example:

<response>
<application1> Qallbar </ application1>
< application2> Qorus </ application2>
< application3> CRM </ application3>
</response>

In one implementation, the instruction message may further include a client terminal device identifier to direct the application files to the appropriate target.

Data Construct and Tracking Syntax

Figure 4:
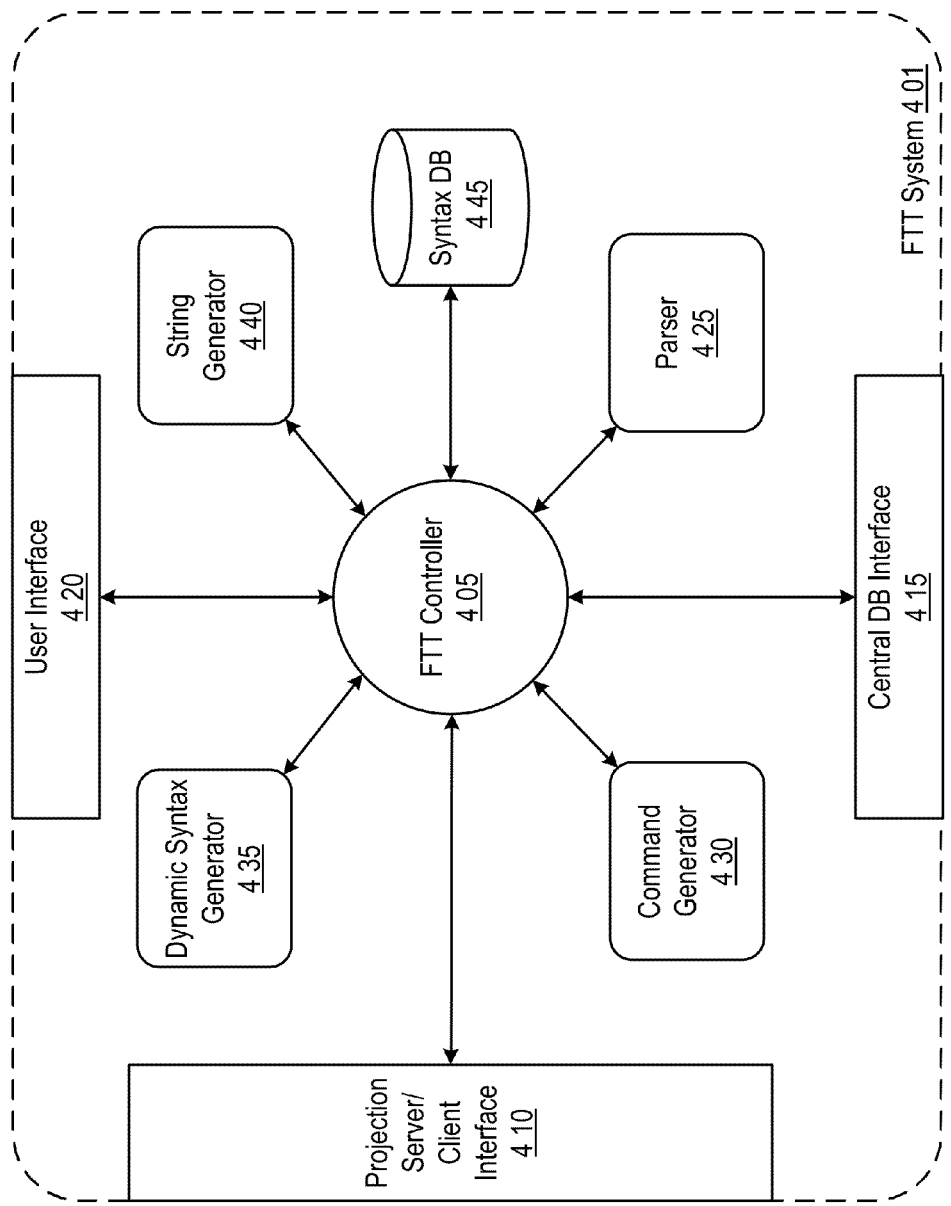
FIG. 4 shows an implementation of data flow between and among FTT system components in one embodiment of FTT operation.

FIG. 4 shows an implementation of data flow between and among FTT system components in one embodiment of FTT operation. The embodiments illustrated in FIG. 4 are directed to a FTT system residing at the Authentication/Control Server 135 and/or Data Server 140 shown in FIG. 1. It is to be understood that aspects of the illustrated embodiment directed to integration with the framework shown in FIG. 1 are for illustrative purposes only, and the FTT system may be deployed in a wide variety of other contexts, including those independent of and apart from the framework illustrated in FIG. 1.

The FTT system 401 may contain a number of operational components and/or data stores. A FTT controller 405 may serve a central role in some embodiments of FTT operation, serving to orchestrate the reception, generation, modification, and distribution of data and/or instructions to, from, and between FTT components and/or mediate communications with external entities and systems.

In one embodiment, the FTT controller 405 may be housed separately from other controllers, modules, components and/or databases within or external to the FTT system, while in another embodiment, some or all of the other modules, components, controllers and/or databases within and/or external to the FTT system may be housed within and/or configured as part of the FTT controller. Further detail regarding implementations of FTT controller operations, modules, components and databases is provided below.

In the implementation illustrated in FIG. 4, the FTT system may be integrated as part of an authentication/control and/or data server, and the FTT controller 405 may be configured to couple to external entities and/or systems via one or more interface components. For example. the FTT controller 405 may be coupled to a projection server/client interface 410. In one implementation, the projection server/client interface 410 may mediate communications to and from a remote projection server and/or one or more client terminals, such as to receive data requests, data inputs, table-tracking syntax configured strings, rule specifications, organizational structure specification and/or inputs, instructions, and/or the like and to return data, rules, instructions, parsed string tokens, generated table-tracking syntax configured strings, and/or the like. The FTT controller 405 may further be coupled to a central database interface 415. In one implementation, the central database interface 415 may mediate communications to and from a remote central database to send parsed string tokens, data updates, rules, data requests, and/or the like and to receive requested data, rules, table identifiers, field identifiers, column identifiers, and/or the like. The FTT controller 405 may further be coupled to a user interface 420. In one implementation, the user interface 420 may mediate communications to and from a user to receive administrator inputs, settings, configuration inputs and/or files, table-tracking syntax configured strings, data requests, data inputs, updates, and/or the like and to send graphical user interface screens, requested data, generated strings, and/or the like. In various implementations, one or more of the interface components described above may serve to configure data into application, transport, network, media access control, and/or physical layer formats in accordance with a network transmission protocol, such as, but not limited to FTP, TCP/IP, SMTP, Short Message Peer-to-Peer (SMPP), and/or the like. For example, the interfaces may be configured for receipt and/or transmission of data to an external and/or network database. The interfaces may further be configurable to implement and/or translate Wireless Application Protocol, VOIP, and/or the like data formats and/or protocols. The interfaces may further house one or more ports, jacks, antennas, and/or the like to facilitate wired and/or wireless communications with and/or within the FTT system.

In one implementation, the FTT controller 405 may further be coupled to a plurality of components configured to implement FTT functionality and/or services. For example, the FTT controller 405 may be coupled to a Parser component 425 which may, in one implementation, be configured to parse received input strings into constituent string tokens and/or otherwise implement interpretation of inputs in accordance with one or more table-tracking syntaxes and/or descriptive business grammars. The Parser component 425 may further be configured to parse inputs into a table-tracking syntax configured input string and attendant data, instructions, requests, and/or the like (e.g., a search query, data input, rule request, and/or the like accompanying a table-specifying input string). The FTT controller 405 may further be coupled to a Command Generator component 430 which may, in one implementation, be configured to generate database manipulation commands, queries, data input and/or storage commands, and/or the like, such as based on tokens extracted from received input strings. For example, in one implementation, the Command Generator component 430 may be configured to receive parsed string tokens, such as from the Parser component 425, and generate a SQL Select command to query data from a FTT database and/or generate a SQL Insert Into command to enter attendant data into a FTT database. Implementations such as these are illustrated in further detail below. The FTT controller 405 may further be coupled to a Dynamic Syntax Generator component 435, which may, in one implementation, be configured to dynamically generate a syntax and/or strings configured with a dynamic syntax in response to user action. For example, in one implementation, the Dynamic Syntax Generator may engage a graphical user interface, such as may be provided to a client terminal via the Projection Server/Client Interface 410 and/or the User Interface 420, that is accessible by a user and that admits inputs indicative of an organizational structure, said inputs instructing the formation and/or organization of the dynamic syntax. The FTT controller 405 may further be coupled to a String Generator component 440, which may, in one implementation, be configured to generate strings in association with various inputs and/or stored data. For example, in one implementation, the String Generator 440 may be configured to generate strings based on organizational hierarchies generated by and/or with the Dynamic Syntax Generator 435. In another implementation, the String Generator 440 may be configured to generate strings matching data queries, such as may be submitted by a user, to see any and/or all syntax-configured strings that match the data query.

In one implementation, the FTT controller 405 may further be coupled to one or more databases configured to store and/or maintain FTT data. A Syntax database 445 may contain information pertaining to string token types and/or sequences, delimiters, string token lengths, syntax identifiers, dynamic syntax parameters, and/or the like. In some implementations, the FTT may compare received input strings with fields and/or records in the Syntax database 445 in order to verify formatting of the input string, assist in parsing the string, and/or the like.

Figure 5A:
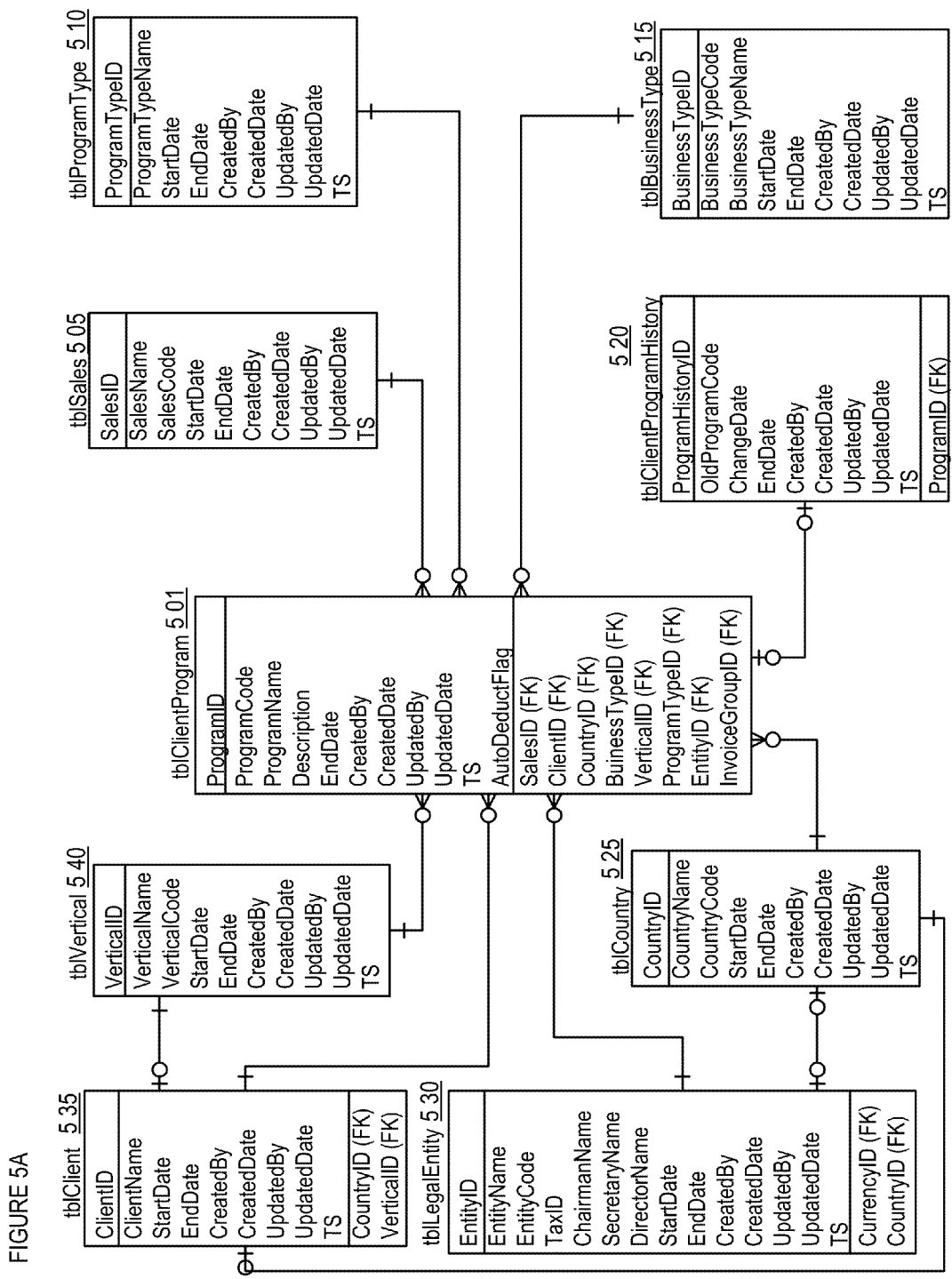
FIGS. 5A-5C show aspects of implementations of data models in one embodiment of FTT operation.
Figure 5B:
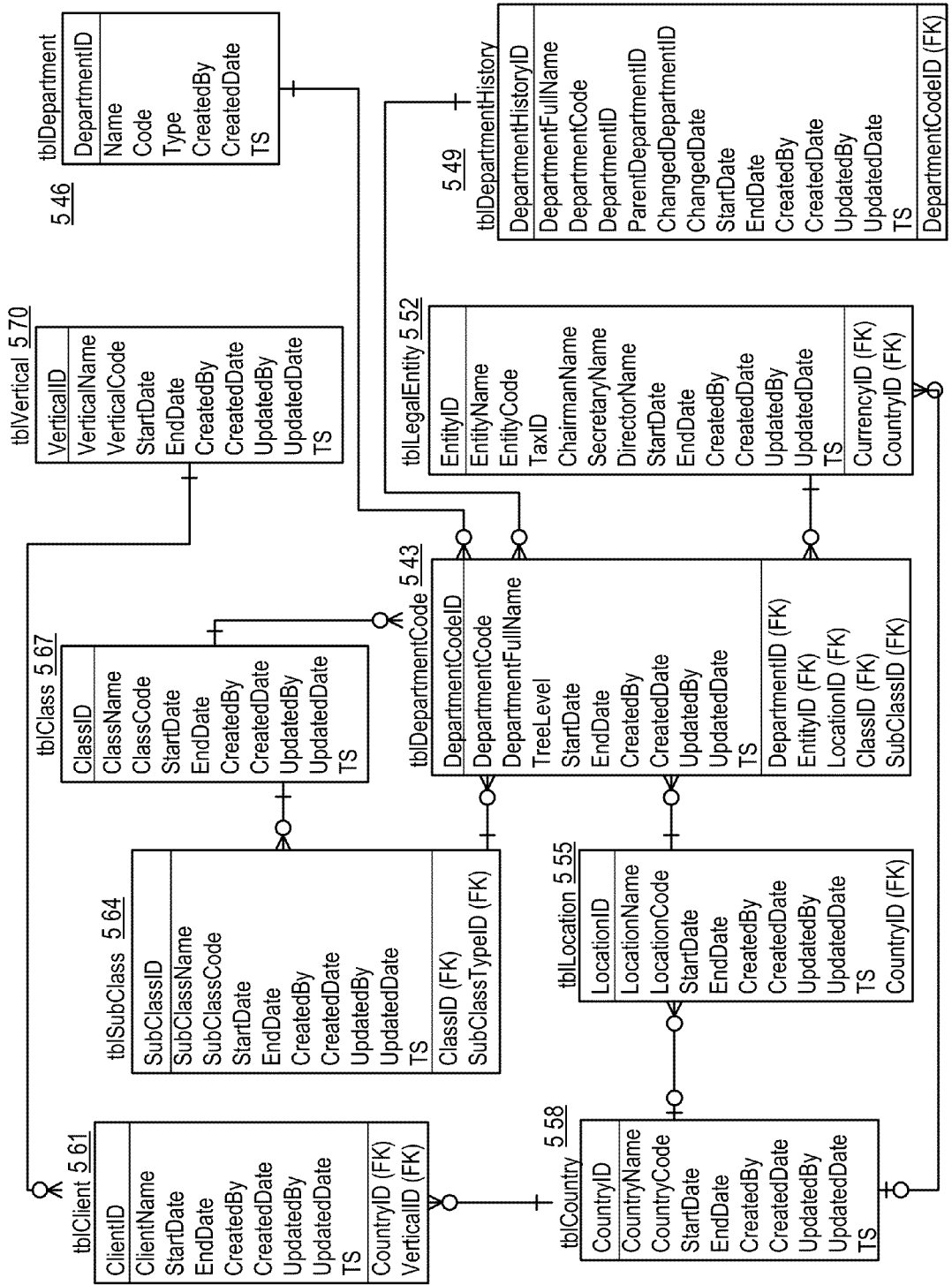
Figure 5C:
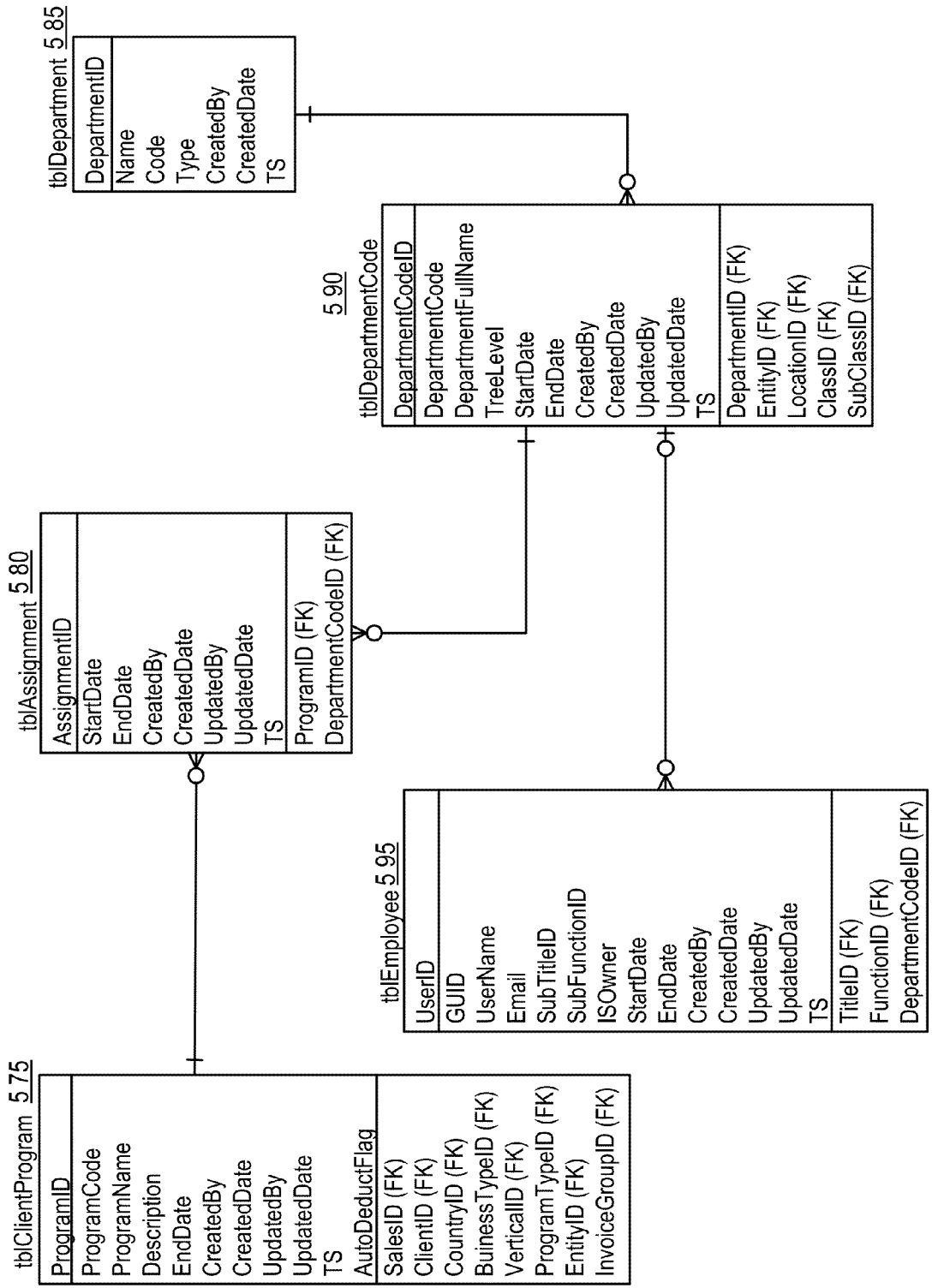

FIGS. 5A-5C show aspects of implementations of data models in one embodiment of FTT operation. The tables shown in FIGS. 5A-5C may, in one implementation, be stored in a central database such as that shown at 145 in FIG. 1 and accessible to the FTT via the central database interface 415 in FIG. 4.

FIG. 5A shows an implementation of a data model illustrating relationships among a group of database tables pertaining to Programs. A ClientProgram table 501 may include fields allowing specification of records pertaining to the organization of an enterprise's clients, the type(s) of work performed for them, and/or the like. In one implementation, a ClientProgram table 501 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The ClientProgram table 501 may be linked to a variety of other tables, including so-called atomic-level tables, via the foreign keys specified therein. For example, the ClientProgram table 501 may be linked to a Sales table 505, which may include fields allowing specification of records pertaining to sales made in association with a particular client, type of work performed for them, and/or the like. In one implementation, a Sales table 505 may include fields such as, but not limited to: SalesID, SalesName, SalesCode, StartDate, EndDate, CreatedBy, CreatedDate, UpdatedBy, UpdatedDate, TS, and/or the like. The ClientProgram table 501 may further be linked to a ProgramType table 510, which may include fields allowing specification of records pertaining to the types of work performed for clients. In one implementation, a ProgramType table 510 may include fields such as, but not limited to: ProgramTypeID, ProgramTypeName, StartDate, EndDate, CreatedBy, CreatedDate, UpdatedBy, UpdatedDate, TS, and/or the like. The ClientProgram table 501 may further be linked to a BusinessType table 515, which may include fields allowing specification of records pertaining to the types of businesses associated with clients, the types of business between an enterprise and a client, and/or the like. In one implementation, a BusinessType table 515 may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. The ClientProgram table 501 may further be linked to a ClientProgramHistory table 520, which may include fields allowing specification of records pertaining to historical and/or time-resolved client programs. In one implementation, a ClientProgramHistory table 520 may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. The ClientProgram table 501 may further be linked to a Country table 525, which may include fields allowing specification of records pertaining to countries. In one implementation, a Country table 525 may include fields such as, but not limited to: CountryID, CountryName, CountryCode, StartDate, EndDate, CreatedBy, CreatedDate, UpdatedBy, UpdatedDate, TS, and/or the like. The ClientProgram table 501 may further be linked to a LegalEntity table 530, which may include fields allowing specification of records pertaining to legal entity status, tax status, personnel and/or the like of enterprises, clients, and/or the like. In one implementation, a LegalEntity table 530 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The ClientProgram table 501 may further be linked to a Client table 535, which may include fields allowing specification of records pertaining to clients and/or client information. In one implementation, a Client table 535 may include fields such as, but not limited to: ClientID, ClientName, StartDate, EndDate, CreatedBy, CreatedDate, UpdatedBy, UpdatedDate, TS, CountryID (FK), VerticalID (FK), and/or the like. The ClientProgram table 501 may further be linked to a Vertical table 540, which may include fields allowing specification of records pertaining to market and/or industry categories, and/or the like. In one implementation, a Vertical table 540 may include fields such as, but not limited to: VerticalID, VerticalName, VerticalCode, StartDate, EndDate, CreatedBy, CreatedDate, UpdatedBy, UpdatedDate, TS, and/or the like.

In some implementations, links may exist between lower-level and/or atomic-level tables as well. For example, in the illustrated implementation, the Client table 535 is linked to the Country table 525 and to the Vertical table 540; and the LegalEntity table 530 is linked to the Country table 525. Some tables linked by foreign keys to tables shown in FIG. 5A have been omitted from illustration for the sake of clarity.

FIG. 5B shows an implementation of a data model illustrating relationships among a group of database tables pertaining to Departments. A DepartmentCode table 543 may include fields allowing specification of records pertaining to departments within an enterprise, the organization of the enterprise's departments, and/or the like. In one implementation, a DepartmentCode table 543 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. The DepartmentCode table 543 may be linked to a variety of other tables, including so-called atomic-level tables, via the foreign keys specified therein. For example, the DepartmentCode table 501 may be linked to a Department table 546, which may include fields allowing specification of records pertaining to departments within an enterprise, and/or the like. In one implementation, a Department table 546 may include fields such as, but not limited to: DepartmentID, Name, Code, Type, CreatedBy, CreatedDate, TS, and/or the like. The DepartmentCode table 543 may further be linked to a DepartmentHistory table 549, which may include fields allowing specification of records pertaining to the history of department assignments and/or characteristics, and/or the like. In one implementation, a DepartmentHistory table 549 may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. The DepartmentCode table 543 may further be linked to a LegalEntity table 552, which may include fields allowing specification of records pertaining to legal entity status, tax status, personnel and/or the like of enterprises, clients, and/or the like. In one implementation, a LegalEntity table 552 may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. The LegalEntity table 552 may, in turn, be linked to a Country table 558, which may include fields allowing specification of records pertaining to countries. In one implementation, a Country table 558 may include fields such as, but not limited to: CountryID, CountryName, CountryCode, StartDate, EndDate, CreatedBy, CreatedDate, UpdatedBy, UpdatedDate, TS, and/or the like. In the illustrated implementation, the country code may further be linked to a Client table 561, which may include fields allowing specification of records pertaining to clients and/or client information. In one implementation, a Client table 561 may include fields such as, but not limited to: ClientID, ClientName, StartDate, EndDate, CreatedBy, CreatedDate, UpdatedBy, UpdatedDate, TS, CountryID (FK), VerticalID (FK), and/or the like. The Client table 561, in turn, may be linked to a Vertical table 570, which may include fields allowing specification of records pertaining to market and/or industry categories, and/or the like. In one implementation, a Vertical table 570 may include fields such as, but not limited to: VerticalID, VerticalName, VerticalCode, StartDate, EndDate, CreatedBy, CreatedDate, UpdatedBy, UpdatedDate, TS, and/or the like. The DepartmentCode table 543 may further be linked to a Location table 555, which may include fields allowing specification of enterprise locations, and/or the like. In one implementation, a Location table 555 may include fields such as, but not limited to: LocationID, LocationName, LocationCode, StartDate, EndDate, CreatedBy, CreatedDate, UpdatedBy, UpdatedDate, TS, CountryID (FK), and/or the like. The Location table 555 may, in turn, be linked to the Country table 558. The DepartmentCode table 543 may further be linked to a Class table 567, which may include fields allowing specification of records pertaining to classes, such as accounting classes, associated with enterprises, departments, and/or the like. In one implementation, a Class table 567 may include fields such as, but not limited to: ClassID, ClassName, ClassCode, StartDate, EndDate, CreatedBy, CreatedDate, UpdatedBy, UpdatedDate, TS, and/or the like. The DepartmentCode table 543 may further be linked to a SubClass table 564, which may include fields allowing specification of records pertaining to subclasses, such as accounting subclasses, associated with enterprises, departments, and/or the like. In one implementation, a SubClass table 564 may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like.

In some implementations, links may exist between lower-level and/or atomic-level tables as well. For example, in the illustrated implementation, the Class table 567 is linked to the SubClass table 564. Some tables linked by foreign keys to tables shown in FIG. 5B have been omitted from illustration for the sake of clarity.

FIG. 5C shows an implementation of a data model illustrating relationships among a group of database tables pertaining to Assignments and Employees/Users. An Assignment table 580 may include fields allowing specification of records pertaining to assignments, such as within an enterprise, performed for or on behalf of a client, by a department, and/or the like. In one implementation, an Assignment table 580 may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. The Assignment table 580 may be linked to a variety of other tables, including so-called atomic-level tables, via the foreign keys specified therein. For example, the Assignment table 580 may be linked to a ClientProgram table 575, which may include fields allowing specification of records pertaining to the organization of an enterprise's clients, the type(s) of work performed for them, and/or the like. In one implementation, a ClientProgram table 575 may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. The Assignment Table 580 may further be linked to a Department Code table 590, which may include fields allowing specification of records pertaining to departments within an enterprise, the organization of the enterprise's departments, and/or the like. In one implementation, a DepartmentCode table 590 may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. In the illustrated implementation, the DepartmentCode table 590 is further linked to a Department table 585, which may include fields allowing specification of records pertaining to departments within an enterprise, and/or the like. In one implementation, a Department table 585 may include fields such as, but not limited to: DepartmentID, Name, Code, Type, CreatedBy, CreatedDate, TS, and/or the like.

An Employee table 595 may include fields allowing specification of records pertaining to user and/or employee attributes and/or characteristics, and/or the like. In one implementation, an Employee table 595 may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. Some tables linked by foreign keys to tables shown in FIG. 5C have been omitted from illustration for the sake of clarity.

Figure 6:
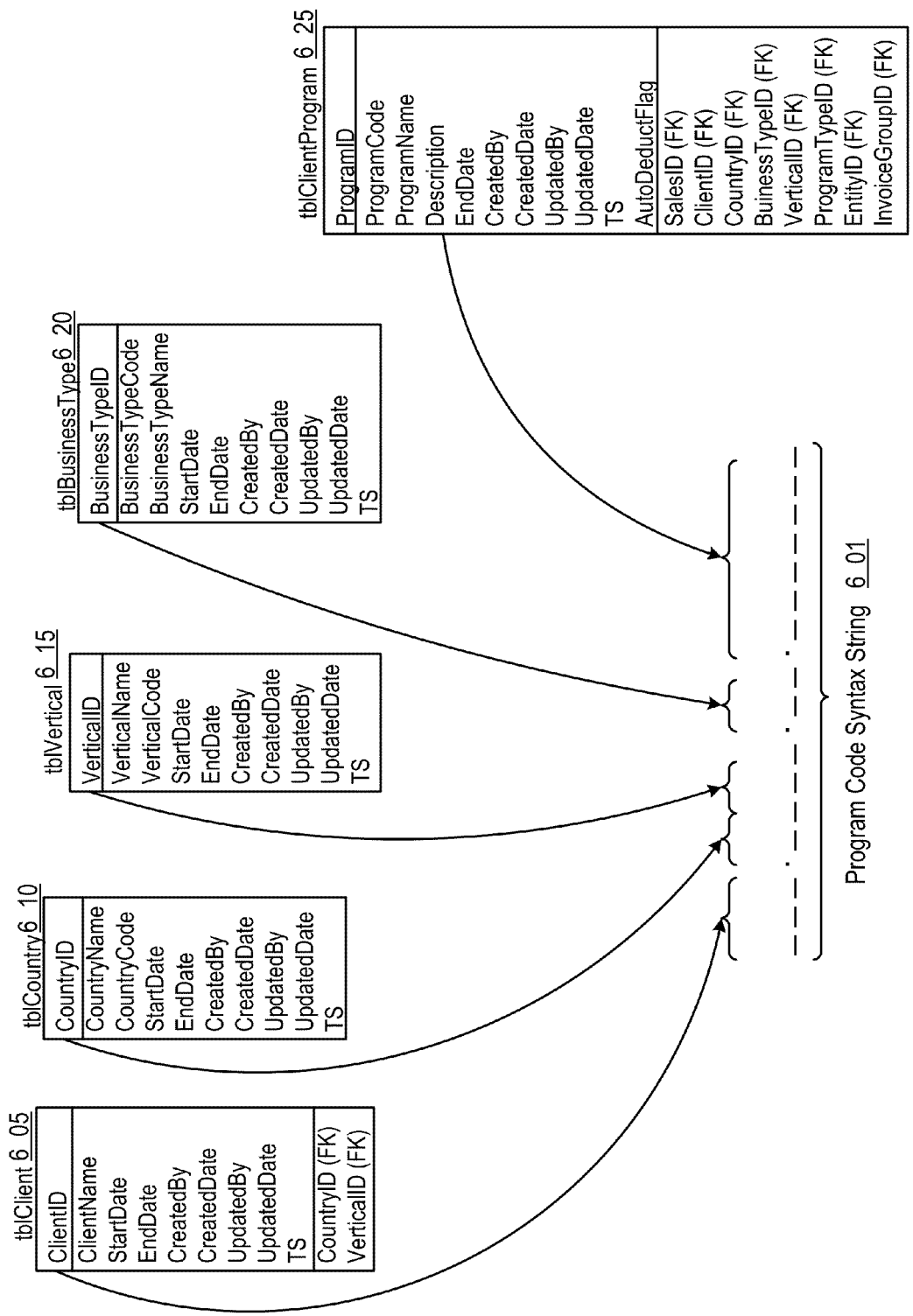
FIG. 6 shows an implementation of a table-tracking string syntax in one embodiment of FTT operation.

FIG. 6 shows an implementation of a table-tracking string syntax in one embodiment of FTT operation. In one embodiment, each token in a business grammar syntax 601 tracks to an individual table, e.g., FIG. 5A-C, 605-625. As such, any token used between grammar eliminators may be parsed and supplied as targets as part of an SQL (e.g., Select) command to a FTT database.

A string is shown at 601 that is configured in accordance with a table-tracking grammar syntax whereby delimited string tokens correlate with and/or correspond to tables in the database. For example, in the illustrated implementation, the string comprises a series of tokes delimited by periods, wherein each token admits a table identifier value corresponding to one of the indicated tables. The first token of the string at 601 corresponds to a Client table 605 and may, in one implementation, admit values for the ClientID field. The second token of the string at 601 corresponds to a Country table 610 and may, in one implementation, admit values for the CountryID field. The third token of the string at 601 corresponds to a Vertical table 615 and may, in one implementation, admit values for the VerticalID field. The fourth token of the string at 601 corresponds to a BusinessType table 620 and may, in one implementation, admit values for the BusinessTypeID field. In some implementations, the table-tracking string syntax may also include table fields other than table identifier fields. For example, while the fifth token of the string at 601 may be said to correspond to or correlate with a ClientProgram table 625, the token itself admits values for the Description field of that table.

In various implementations of a table-tracking string syntax, various punctuation marks, character, and/or the like (e.g., periods, commas, dashes, blank spaces, hash marks, dollar signs, asterisks, and/or the like and/or any combination or sequence thereof) may be used in different combinations and arrangements to delimit string tokens. For example, in one implementation, periods may be placed between pairs of string tokens (e.g., the period between the client and country tokens in the string at 601). In one implementation, every pair of string tokens is separated by delimiting punctuation, such as a period. In another implementation, one or more pairs of tokens may have alternative punctuation and/or characters delimiting them than other token pairs, and/or may have no delimiting punctuation and/or characters whatsoever. For example, the country token 610 and vertical token 615 in the string at 601 are not delimited by any additional characters or punctuation. In one implementation, a string interpreting component may have a pre-set token length stored for a given table-tracking syntax and may parse the string based, for example, on the number of characters at a certain point in the string, following a particular delimiter, and/or the like.

In some implementations, the table-tracking syntax may comprise a descriptive business grammar having string tokens that correspond to table fields determined and/or expected to have strong descriptive correlation with business properties and/or behaviors. For example, the implementation of a program code string syntax shown in FIG. 6 has string tokens corresponding to a client name, country, vertical (e.g., industry, company position in a supply chain, and/or the like), business type (e.g., nature of services provided to a client), and a client program description. Any of a wide variety of other tables and/or table fields may be correlated with string tokens in other implementations of descriptive business grammars. In one implementation, tables and/or table fields comprising a string syntax in a descriptive business grammar may be selected by a FTT administrator. In an alternative implementation, tables and/or table fields having strong descriptive correlation with business properties and/or behaviors may be determined systematically by selecting one or more business properties and/or behaviors of interest (e.g., size, revenue, common business rules, and/or the like) and performing a discriminant analysis, classification and/or regression tree analysis, and/or the like statistical analysis to select a subset of tables and/or table fields from a larger set, the subset having maximal correlation with the business properties and/or behaviors of interest.

In one implementation, a table-tracking string syntax may take a form that is static and pre-set, such that the number, arrangement, selection, and/or the like of string tokens is fixed and/or substantially the same for each instance of a string formed in accordance with the syntax. In another implementation, a table-tracking string syntax may be formed dynamically, such as based on user inputs, and different strings formed in accordance with the syntax may appear different, have a different number, selection, arrangement, and/or the like of tokens and/or the like. For example, hierarchical properties of a system (e.g., departments of an organization) may be indexed with a dynamic table-tracking string syntax having a selection and/or number of tokens representing a position of a given property within the hierarchy. FIG. 7 shows a schematic illustration of correlations between positions within an organizational hierarchy and corresponding strings configured with a dynamic, hierarchical table-tracking syntax in one embodiment of FTT operation. The organizational hierarchy 701 is configured as a tree depicting departments within an organization, with each node of the tree representing a descriptor or characteristic of a corresponding department, division, and/or the like. In turn, each displayed characteristic may correspond to a table, table identifier, table field, and/or the like in a database. The root node 710 corresponds to the organization depicted (XYZ Corp.) and may represent a table field and/or table identifier for, for example, a EntityID, EntityName, ClientID, ClientName, and/or the like. Also depicted in the figure are a series of so-called Department Codes 705 comprising dynamic, hierarchical table-tracking syntax configured strings correlated with nodes in the organizational hierarchy 701, wherein each token in the string corresponds to and/or correlates with one of the descriptors and/or characteristics of the organizational department represented at a given node of the organizational hierarchy tree 701. In one implementation, a department code configured with a dynamic, hierarchical table-tracking syntax may include any and/or a particular class of logical arrangements of descriptors, including but not limited to: function, sub-function, country, location, vertical, business type, client, team, and/or the like.

For example, the root node depicting the identity of the organization, XYZ Corp. 710, has a corresponding department code of "XYZ" 715. A sub-node emanating from the root note, such as the "Analytics" department shown at 720, may then have a corresponding department code with a root token as in 715, but with the addition of a new token (ANA) delimited from the root token to yield XYZ.ANA 725. The addition of further levels of hierarchy may add further tokens to the string syntax. Depending on the hierarchical arrangement of organizational descriptors in the organizational tree 701, different department codes 705 may be generated having tokens in similar positions in the strings which, nevertheless, correspond to different types of descriptors, different tables, different table identifiers, and/or the like. For example, in the illustrated implementation, the department code at 730, XYZ.MAR.US.LA, has a concluding token "LA" indicating a location of the department (i.e., in Los Angeles 735). On the other hand, the department code at 740, XYZ.OPS.CA.A, has a concluding token "A" that is also in the fourth position of the string but, here, indicates a team affiliation (i.e., Team A 745). In one implementation, the FTT may parse a dynamic, hierarchical table-tracking syntax configured string in a hierarchical manner, proceeding from a root token which may, in some implementations, always correspond to a particular table, table identifier, table field, and/or the like, and then progressively comparing subsequent string tokens to table fields and/or linked tables until matches are found permitting identification of the tables, table identifiers, table fields, and/or the like to which the string tokens correspond. As such, the number of delimiters may indicate the relative hierarchical position of a value, but the tokens within the delimiters may represent the types of categorization; this has the very powerful advantage allowing for orthogonal constructs of disparate data types within the grammar without excess duplication of descriptors and greater number of descriptive permutations; for example, it allows for the decoupling of business categories of information from accounting categories, while allowing permutations therebetween.

Figure 7A:
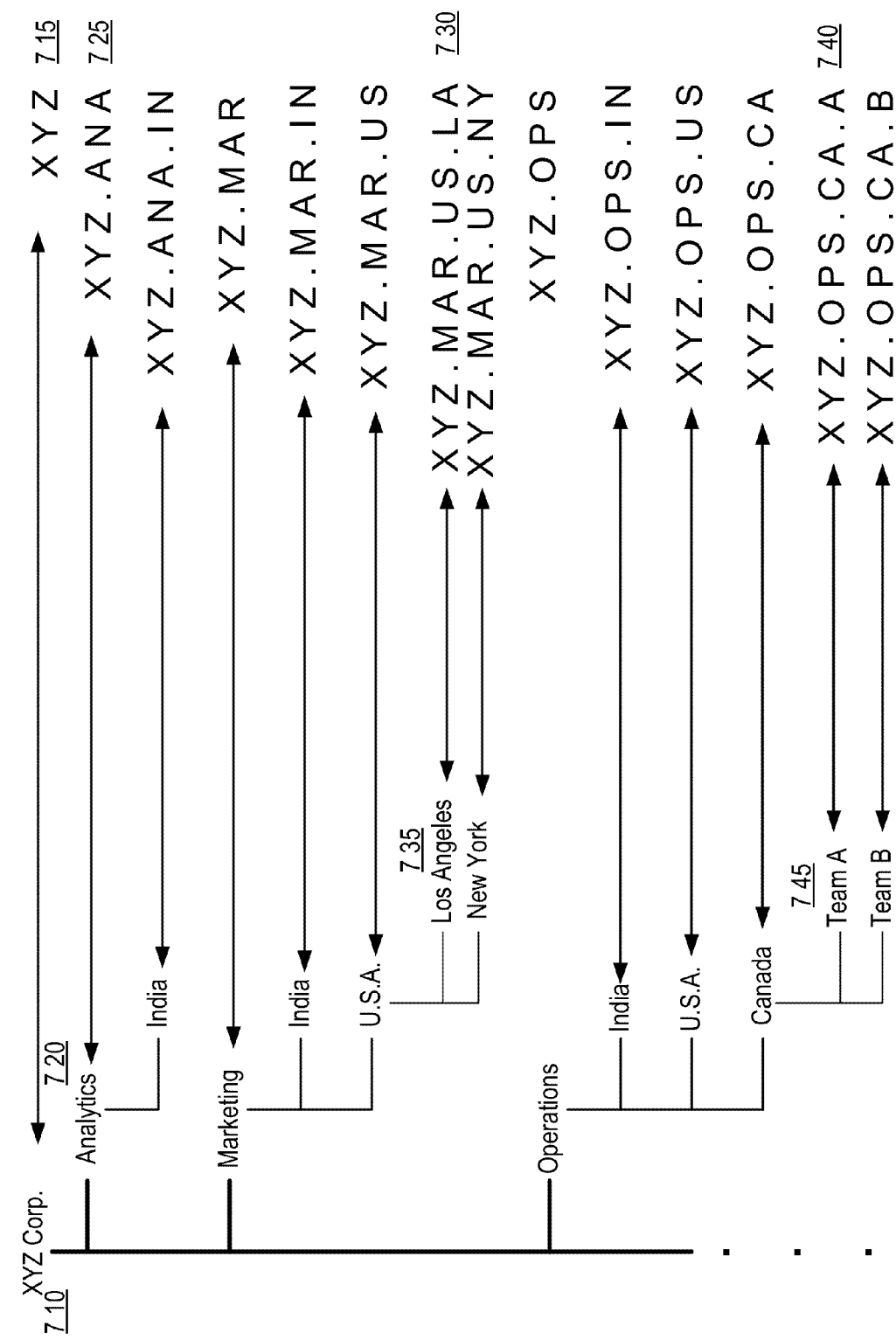
FIG. 7 shows a schematic illustration of correlations between positions within an organizational hierarchy and corresponding strings configured with a dynamic, hierarchical table-tracking syntax in one embodiment of FTT operation.
Figure 7B:
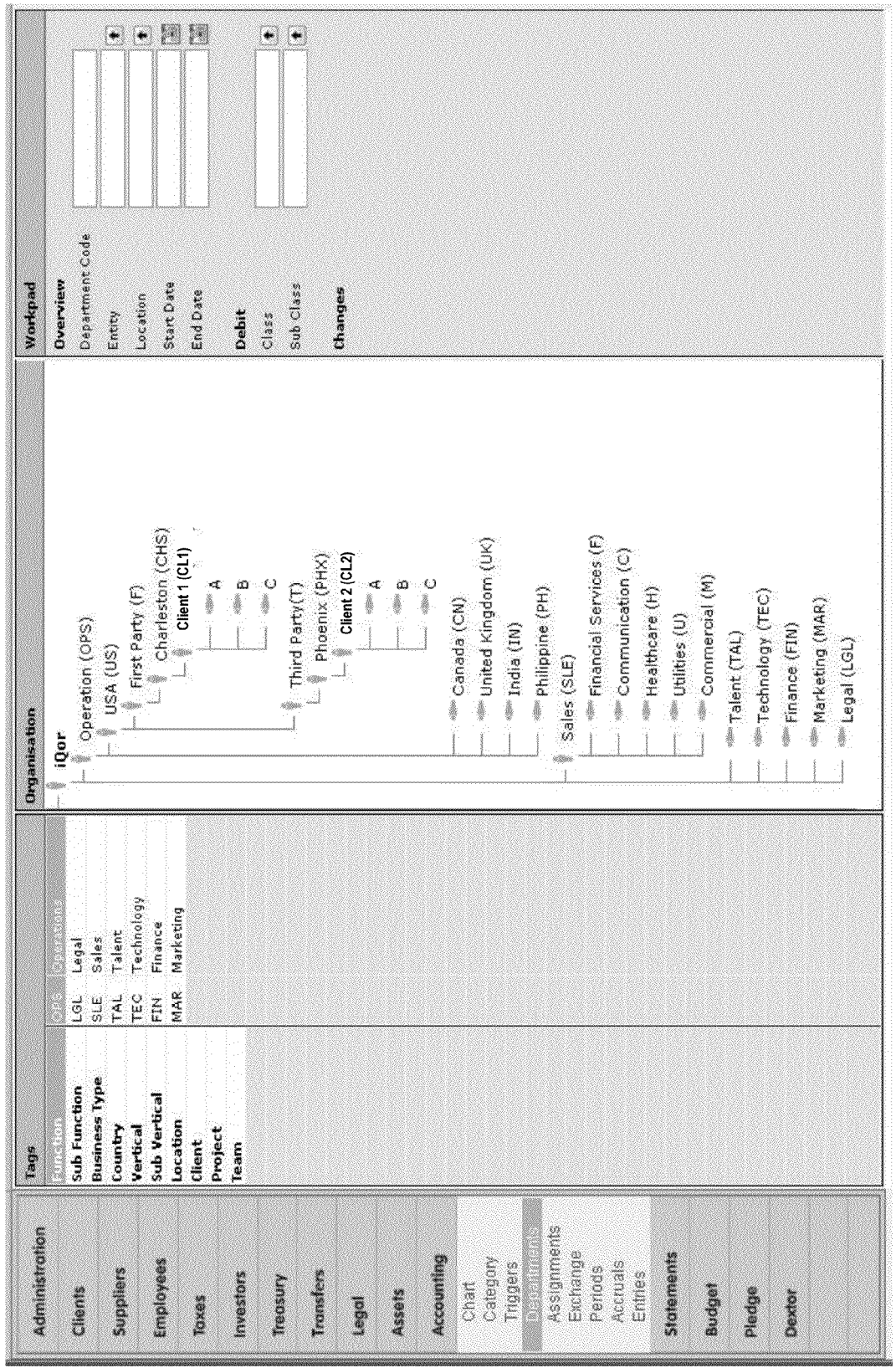

In one embodiment, the FTT may include a user interface facility similar in appearance to the schematic illustration shown in FIG. 7A permitting a graphical generation of a hierarchical organizational chart and corresponding dynamic, hierarchical table-tracking syntax configured strings, such as the department codes shown at 705 (see FIG. 7B illustrating an example UI screenshot). For example, such a user interface may include a plurality of organizational descriptors, such as function, sub-function, country, location, vertical, business type, client, team, and/or the like, that are configured as selectable interface elements. The organizational chart may then be generated by selecting the descriptors for association with different positions in the chart, causing new nodes to be created from those positions. In one implementation, each descriptor may be dragged and dropped from a bank of descriptors to a position on or near the chart, causing that descriptor to become a new node extending by a branch from the nearest node above it in the hierarchy. The FTT may also automatically generate a new department code corresponding to the new node by appending a token corresponding to the new node to the string corresponding to the next highest node in the chart from the new node.

Figure 8:
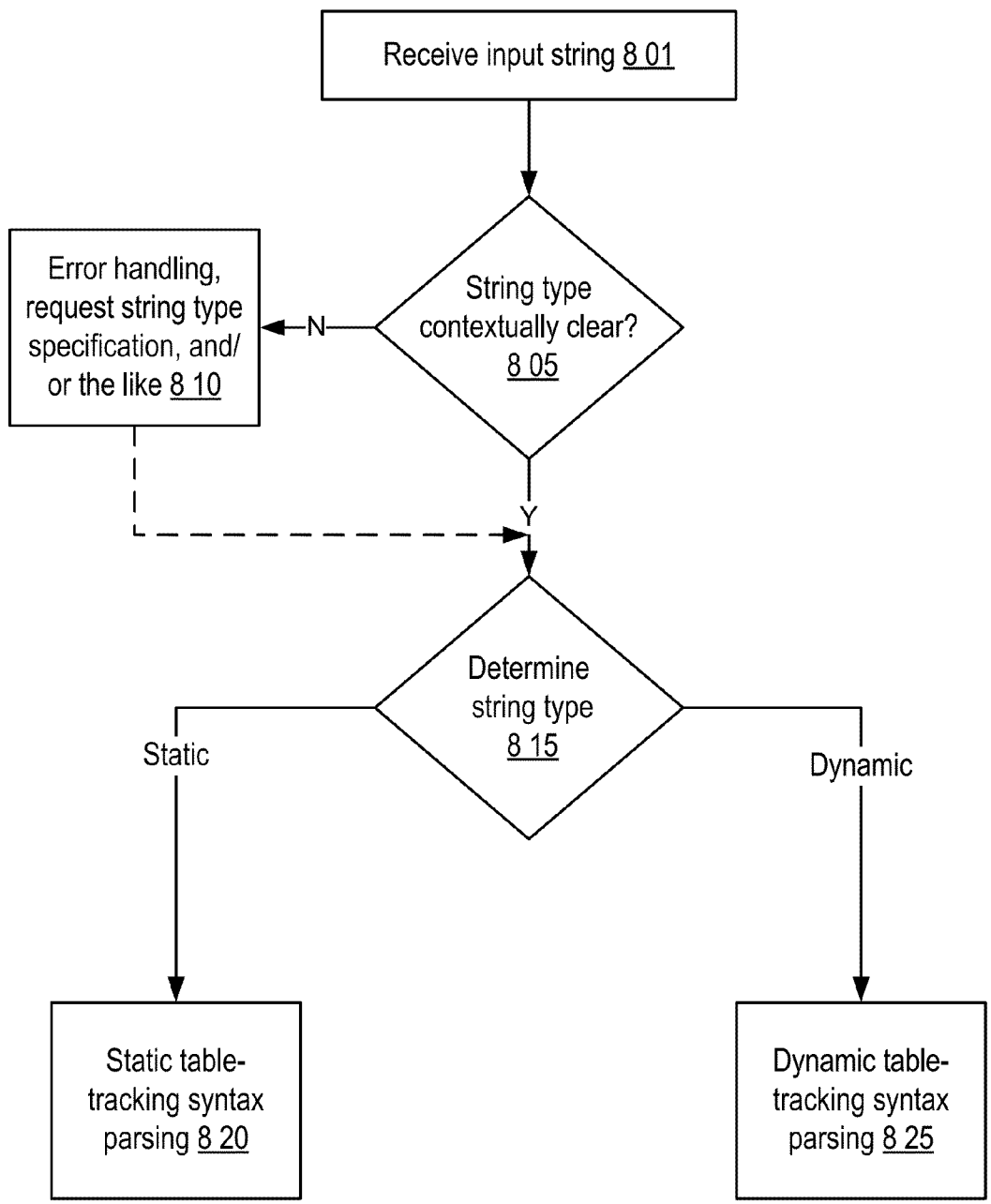
FIG. 8 shows an implementation of logic flow for string type discerning and parsing in one implementation of FTT operation.

FIG. 8 shows an implementation of logic flow for string type discerning and parsing in one implementation of FTT operation. The implementation illustrated in FIG. 8 may be employed, for example, in a circumstance wherein both static and dynamic table-tracking syntaxes are used and strings configured with either syntax may be received as inputs. The FTT may receive an input string 801, such as via a web interface, a text and/or command line input, data transfer from another FTT application and/or component, selection of input string tokens in a graphical user interface (e.g., from one or more pull-down menus), string tokens spoken into a microphone and analyzed with speech recognition software, a string scanned from a document and/or discerned from a photograph that is analyzed such as with optical character recognition (OCR), and/or the like. A determination may then be made as to whether the string type, associated table-tracking syntax and/or descriptive business grammar, and/or the like is clear from the context in which the string was input, and/or from the content of the string itself 805. For example, in one implementation, a string type may be identified from the application into which the string was input and/or the method of input and/or receipt of the input string. In another example, a string type may be identified from the length, composition, arrangement, content, and/or the like of the string itself. The input string may be compared to elements of a syntax database, which delineate the formal characteristics of a particular table-tracking syntax and allow for determination of whether a particular input string appears to be configured in accordance with the particular syntax. In one implementation, the FTT at 805 may determine whether sufficient indicia of string type exist to permit a determination of the string type. In one implementation, the FTT at 805 may only determine whether sufficient indicia exist to distinguish the string type and/or associated syntax between static table-tracking syntax and a dynamic table-tracking syntax.

If sufficient indicia do not exist to distinguish the type of string and/or syntax corresponding to an input string, the FTT may undertake an error handling process, request user specification of the string type, perform additional analysis on the input string to discern the type, and/or the like 810. If sufficient indicia are present at 805, the FTT may determine which string type and/or string syntax is associated with the input string, such as based on that indicia 815. In one implementation, the FTT may distinguish between a string configured in accordance with a static table-tracking index and with a dynamic table-tracking index. In the illustrated implementation, a static table-tracking syntax configured input string may then be subjected to a static table-tracking syntax parsing 820, and a dynamic table-tracking syntax configured input string may be subjected to a dynamic table-tracking syntax parsing 825.

Figure 9:
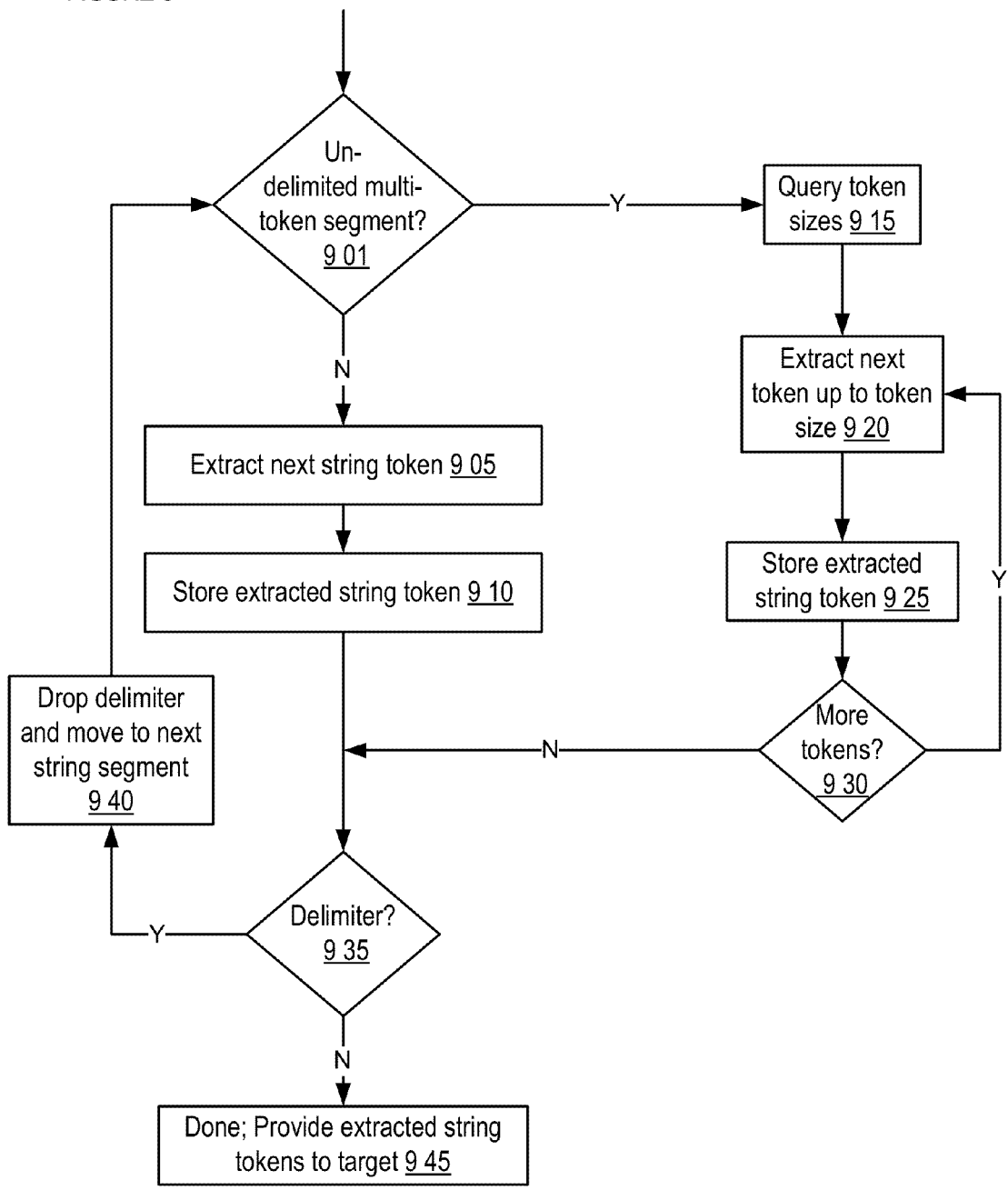
FIG. 9 shows an implementation of logic flow for static table-tracking syntax parsing in one embodiment of FTT operation.

FIG. 9 shows an implementation of logic flow for static table-tracking syntax parsing in one embodiment of FTT operation. A determination may be made as to whether a first segment of the received string and/or corresponding string syntax comprises a single token or an undelimited multi-token segment 901. In the latter case, the FTT may query a token size 915, such as from a syntax database that holds a list of table names, token sizes, and/or the like, and extract a next token from the undelimited multi-token segment based on the token size 920. In one implementation, a token size may be specified as part of the table-tracking syntax and/or descriptive business grammar. In another implementation, such as for a dynamic table-tracking syntax, a token size may be specified as a maximum number of characters for a table name corresponding to that token type. Extracted string tokens may be stored 925, and a determination made as to whether there are additional tokens in the undelimited multi-token segment 930, such as may be indicated by a syntax record in the syntax database. If so, the FTT may return to 920 to extract the next token in the segment.

If the FTT determines at 901 that the next segment in the string is not an undelimited multi-token segment, then the FTT may extract the whole segment as a string token 905 and store the extracted string token 910, such as in a database, in random access memory, and/or the like.

A determination may be made as to whether there exists a delimiter past the token or tokens previously extracted 935. If there is an additional delimiter, the FTT may drop the delimiter from the string and move to evaluate the next string segment 940. In an implementation where there is no trailing delimiter at the end of a string in a table-tracking syntax, determining that there are no delimiters at 935 may cause the FTT to conclude parsing the input string and/or to provide extracted string tokens to a target 945, such as an end user, target application, database table and/or record, display device, report, and/or the like.

Figure 10:
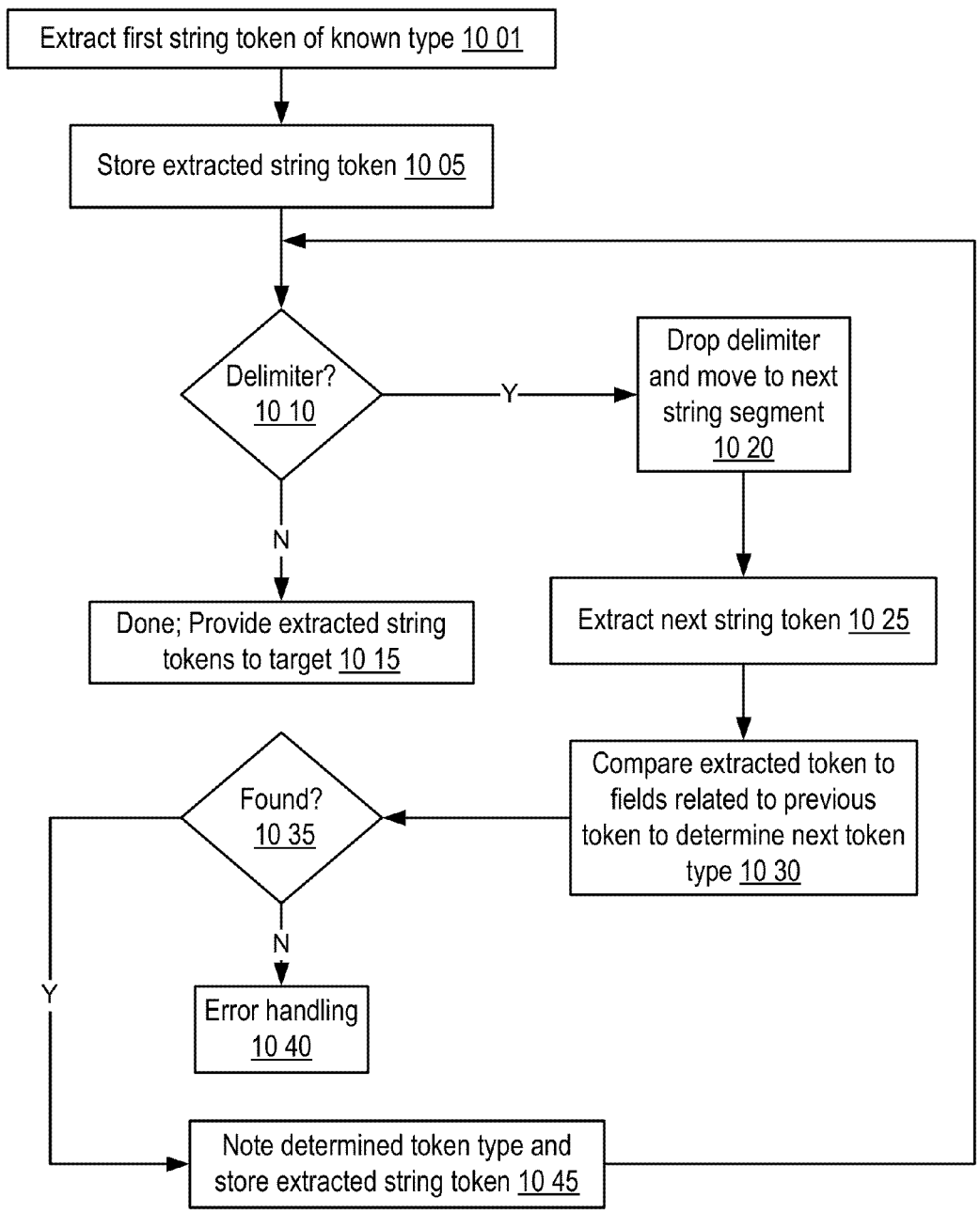
FIG. 10 shows an implementation of logic flow for parsing dynamic table-tracking syntax configured strings in one embodiment of FTT operation.

FIG. 10 shows an implementation of logic flow for parsing dynamic table-tracking syntax configured strings in one embodiment of FTT operation. A first string token of known type may be extracted 1001 and stored 1005. In one implementation, all dynamic table-tracking syntax configured strings may be configured with the same type of leading string token (e.g., an organization name). In another implementation, the token type of the leading string token may be discerned prior to parsing, such as via contextual indicia, such as how the string was submitted to the FTT, simultaneously running applications, other user inputs and/or instructions from other software modules, and/or the like.

A determination may then be made as to whether there exists a delimiter after the first extracted token 1010. If not, such as in the case of a single-token string configuration, then the FTT's parsing of the dynamic table-tracking syntax string may be concluded and/or the extracted string token provided to a target 1015. If a delimiter is found at 1010, the FTT may drop the delimiter from the input string and move to the next segment of the string 1020. The next string token may be extracted 1025 and compared with data fields and/or records of a table associated with the previously extracted token to determine a next token type 1030. A determination may be made as to whether a match to the token has been found 1035 and, if not, then an error handling procedure may be undertaken 1040, such as providing an error message to the user, requesting reentry of the input string, checking common typographical or spelling errors, and/or the like. If, on the other hand, a match is found to the next token, the determined token type may be noted and stored in association with the extracted token 1045, before returning to 1010 to check for a next delimiter in the string sequence.

In one embodiment, department codes may be parsed based on token positions relative to delimiting characters, and as such, provide the parsed values for use in SQL commands. For example, a rule may specify that all department codes having a particular token after the nth delimiting character are authorized to access a particular set of application files. A parsing routine may then count n delimiters and compare the immediately following token to the rule token to determine if the rule is applicable (e.g., whether a user associated with the department code is authorized to access the set of application files).

Figure 11:
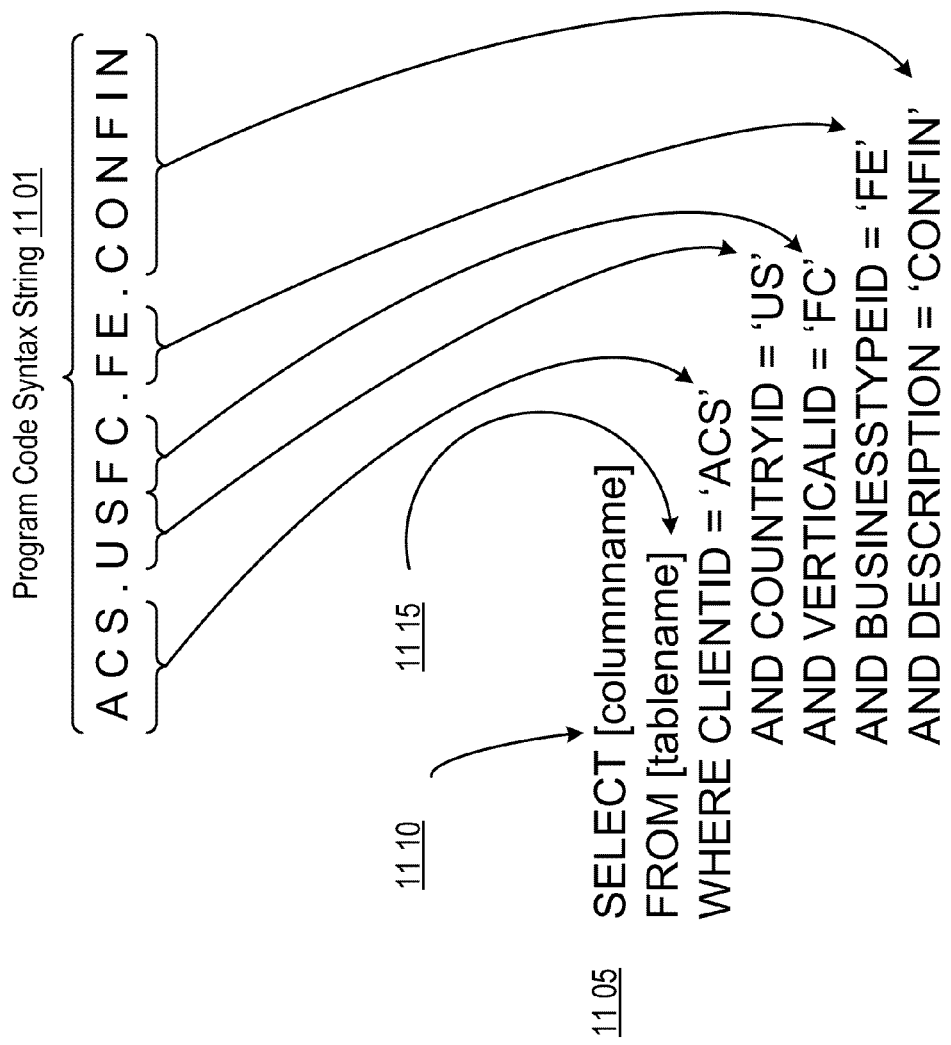
FIG. 11 provides a schematic illustration of an implementation of converting a table-tracking syntax configured string into a database query statement in one embodiment of FTT operation.

FIG. 11 provides a schematic illustration of an implementation of converting a table-tracking syntax configured string into a database query statement in one embodiment of FTT operation. The input string in the illustrated implementation 1101 is configured as a program code, having a first segment reflecting a client token, a second segment comprising an undelimited multi-token segment having a country token and a vertical token, a third segment reflecting a business type token, and a fourth segment reflecting a description token. The content of each token in a particular instance of a program code may be extracted and rearranged to form a SQL Select statement, such as that shown at 1105. In the illustrated implementation, the parsed string tokens are used to specify SQL Where search conditions, limiting the query to records having fields with matching values as those specified in the Where clauses. The Select statement 1105 also admits specification of a column name 1110 and table name 1115 from which the requested data should be selected. Thus, the Select statement at 1105 will select data from a column corresponding to "columnname" 1110 in a table corresponding to "tablename" 1115 for records in that table having a clientID="ACS", countryID="US", verticalID="FC", businesstypeID="FE", and description="CONFIN".

Figure 12:
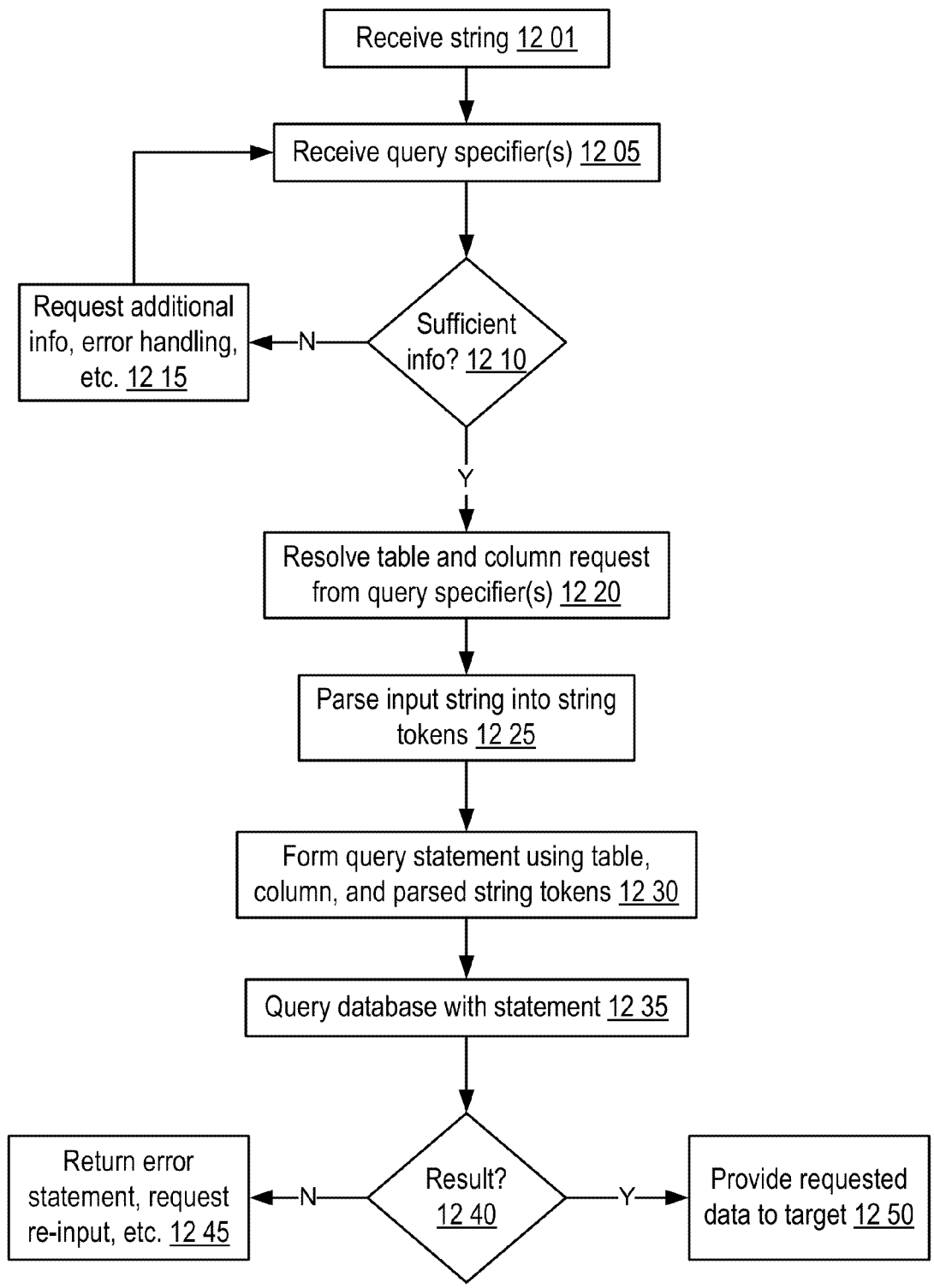
FIG. 12 shows an implementation of logic flow for forming a query statement based on an input string in one embodiment of FTT operation.

FIG. 12 shows an implementation of logic flow for forming a query statement based on an input string in one embodiment of FTT operation. A string is received at 1201, as well as any query specifiers 1205 which may comprise additional inputs that serve to provide further resolution and/or specificity related to a data request. For example, in one implementation, query specifiers 1205 may comprise information sufficient to identify at least one column name and/or table name in which requested data may be found. An example of a query specifier is a PLACEMENTMONTH of August 2008 submitted with a PROGRAMCODE of CL1.USMI.FP.HR to retrieve associated matching data.

A determination may be made as to whether sufficient query specifiers have been supplied to conduct a database query 1210. If not, then an error handling procedure may be undertaken, an error message returned, additional information may be requested from a user, and/or the like 1215. If sufficient query specifiers have been supplied, the FTT may resolve a table name and/or a column name based on the query specifiers 1220. For example, in one implementation, the query specifiers themselves may comprise a table name and/or a column name. The FTT may also parse the input string into one or more string tokens 1225. The query statement may then be formed as a combination of parsed string tokens and resolved table name and/or column name 1230, and said statement used to query the database 1235. A determination may be made as to whether one or more results are returned in response to the query 1240. If not, then an error handling procedure may be undertaken, an error message returned, reentry of query parameters requested, and/or the like 1245. Otherwise, if a result is obtained by the query, the result may be provided to a target 1250, such as to the requesting system, to a third party user, application, system, and/or the like 1250.

Figure 13:
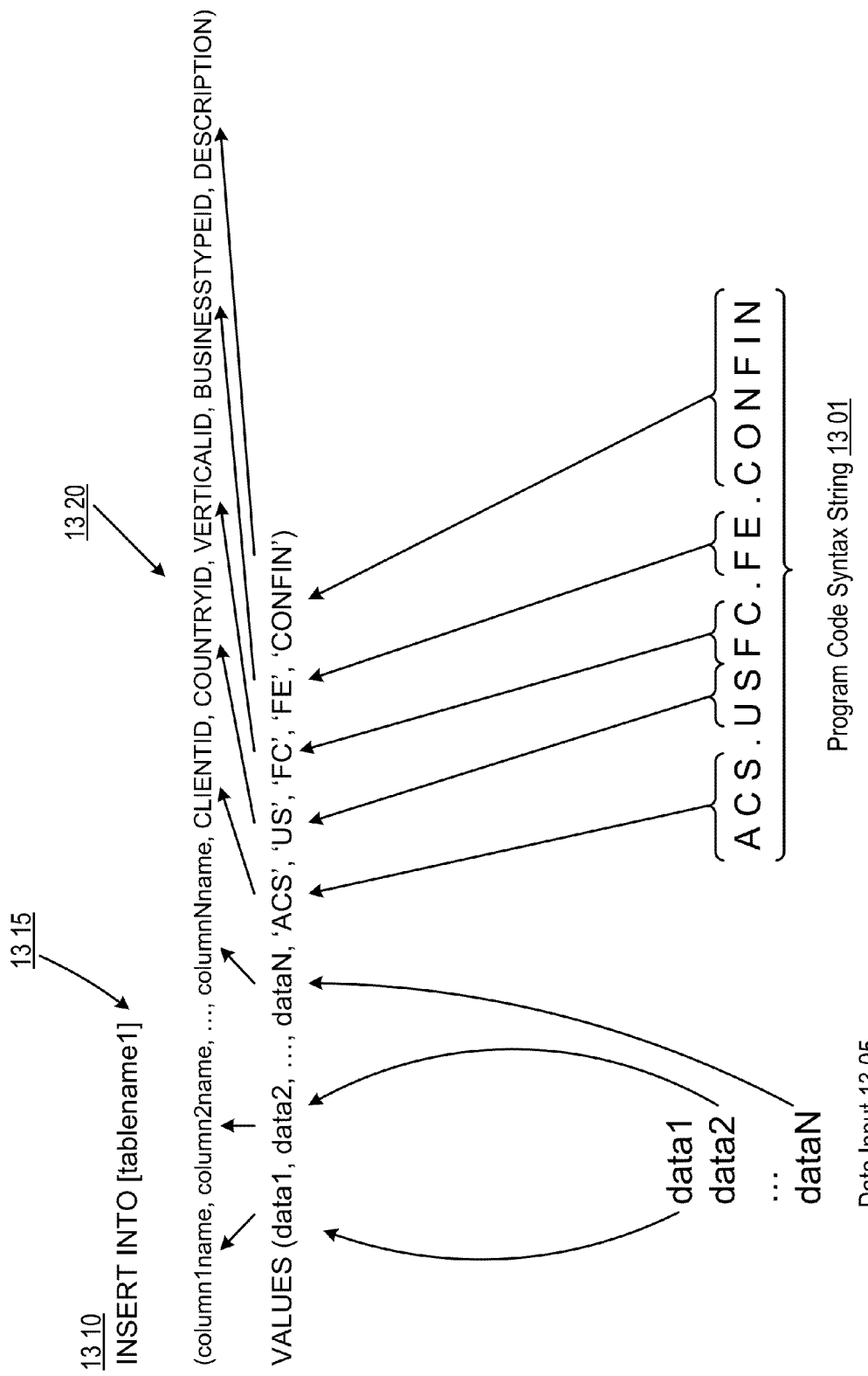
FIG. 13 provides a schematic illustration of an implementation of converting a table-tracking syntax configured string into a database input statement in one embodiment of FTT operation.

FIG. 13 provides a schematic illustration of an implementation of converting a table-tracking syntax configured string into a database input statement in one embodiment of FTT operation. In the illustrated implementation, a program code syntax configured string 1301 is provided to the FTT, along with a series of data inputs 1305. Tokens parsed from the input string, along with the data inputs, may be used to form a SQL Input statement such as that shown at 1310, where the data inputs and string tokens comprise values to populate fields in a database record. The illustrated Input statement may also include specification of one or more table names 1315, one or more column 1320, and/or the like, such as to identify a location in the database where the received data inputs should be entered. Therefore, in the illustrated implementation, data1 is slotted for input to columnname, data2 to column2name, and so forth, and "ACS" is slotted for input to the CLIENTID column, "US" to the COUNTRYID column, and so forth. The illustrated implementation is directed to circumstances where all of the input data is to be entered into a single table having accommodating fields. In some other implementations, the FTT may accommodate data inputs destined for different database tables, such as by discerning linking relationships between tables and generating appropriate JOIN statements for inclusion in a database transaction command statement such as that shown at 1301. In one implementation, a table name, column name, and/or the like to be included in the Input statement may be discernable based on a variety of different information sources, such as but not limited to a received string and/or parsed string tokens, a type and/or content of data inputs, a source of data inputs and/or input string (e.g., based on the identity of a submitting application), a user's data input permissions, and/or the like.

Figure 14:
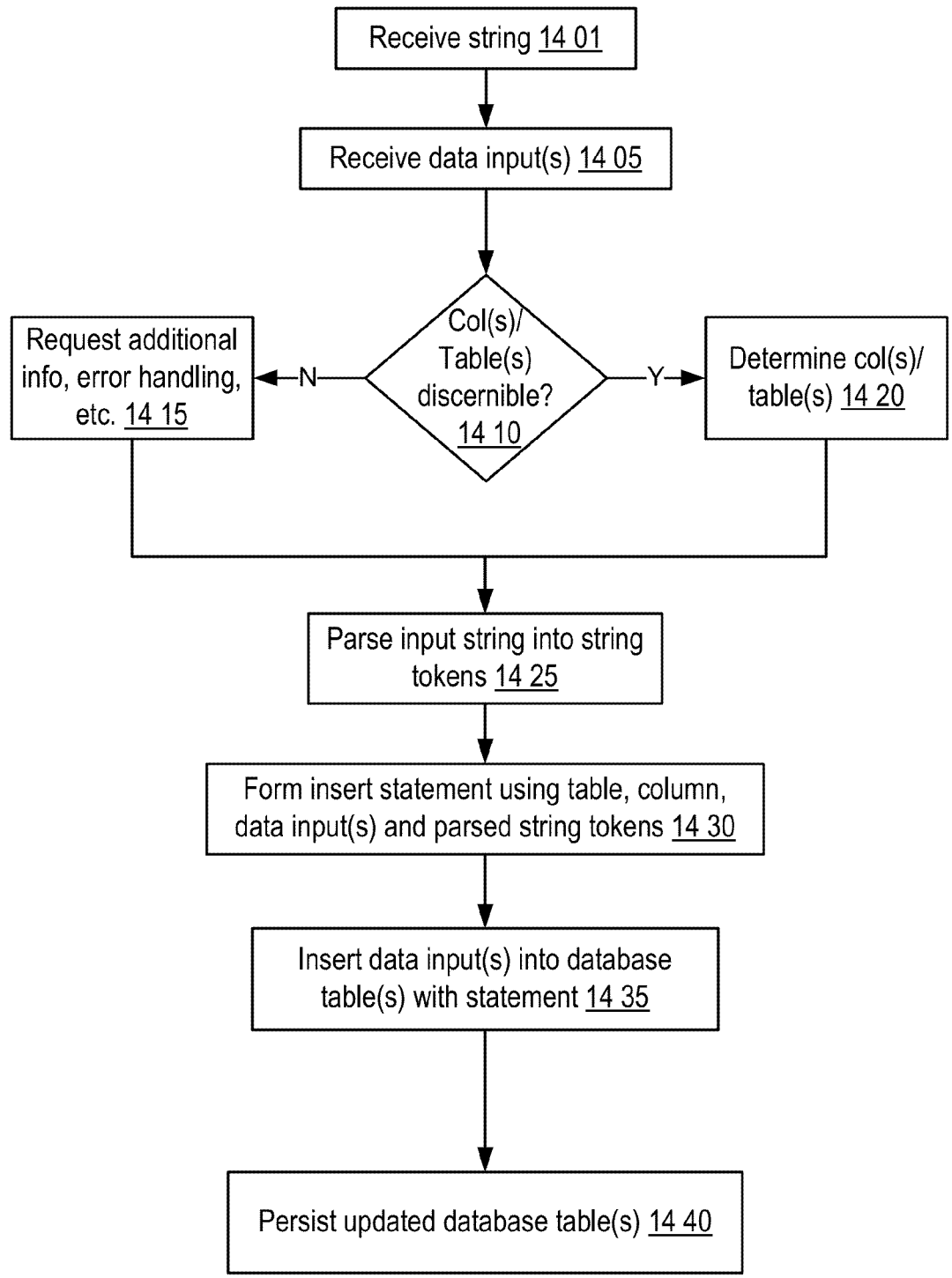
FIG. 14 shows an implementation of logic flow for forming a database input statement based on an input string in one embodiment of FTT operation.

FIG. 14 shows an implementation of logic flow for forming a database input statement based on an input string in one embodiment of FTT operation. An input string is received 1401, along with attendant data inputs 1405, which may represent data sought to be input to the database by a user, and may comprise data values, rules, reports, data collections, and/or the like inputs. A determination may be made as to whether a table name and/or column name are discernible 1410, such as based on the received string and/or data, a source of the received string and/or data (e.g., an application from which the string and data were received), a user profile and/or user permissions, and/or the like and/or any combination thereof. If a table name and/or column name are not discernible, the FTT may undertake an error handling procedure, request additional information from a user or requesting application, and/or the like 1415. Otherwise, the table name and/or column name may be determined from the provided information 1420. The FTT may then parse the input string into one or more string tokens 1425, and form an insert statement based on the parsed string tokens, the data inputs, and the table name and/or column name 1430. The data inputs may then be inserted into the database using the formed insert statement 1435, and the updated database tables may then be persisted 1440 for future use and/or reference.

Data Integration

Figure 15A:
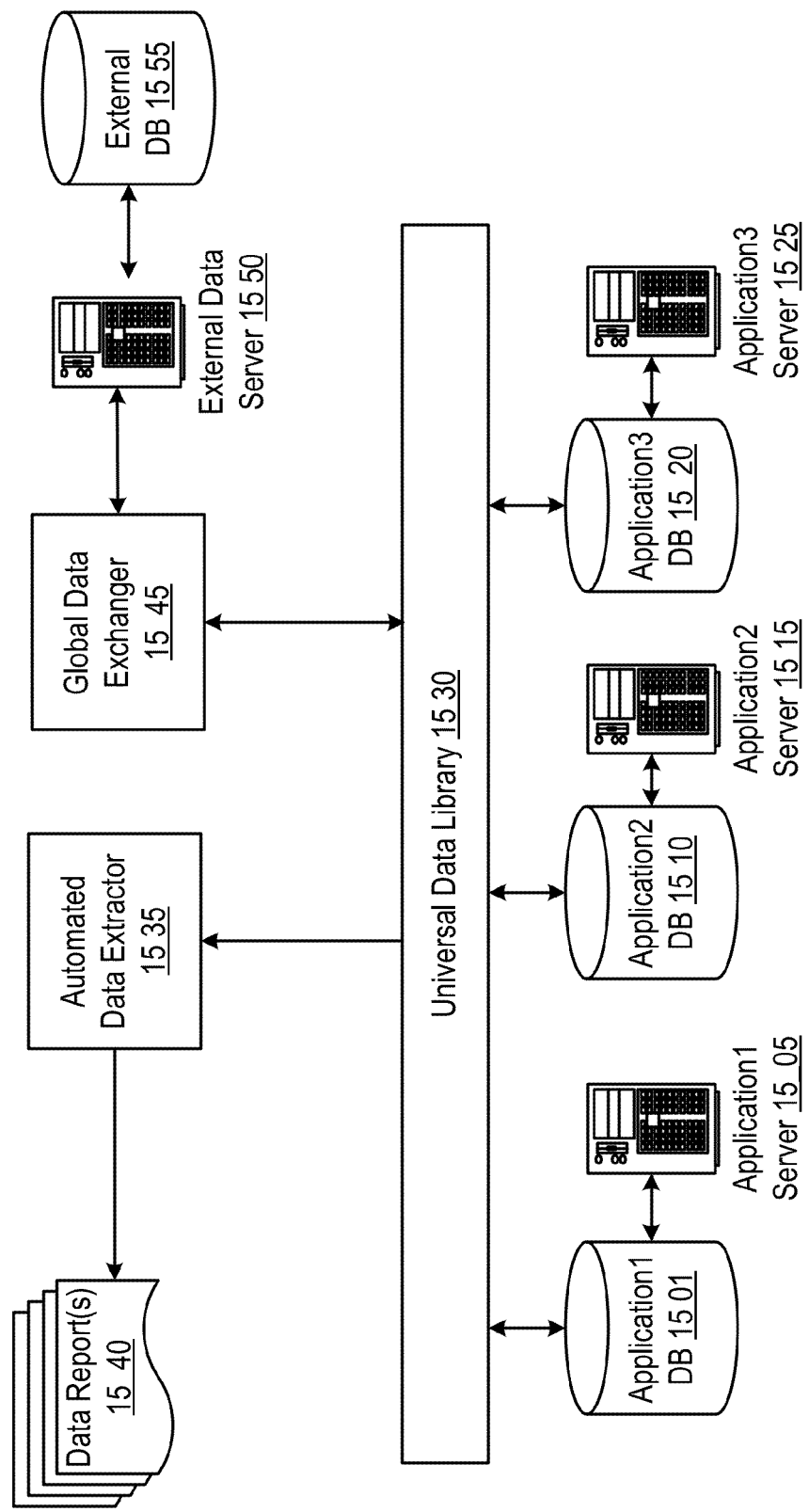
FIGS. 15A-B show an implementation of data flow between and among FTT system components in one embodiment of FTT operation.
Figure 15B:
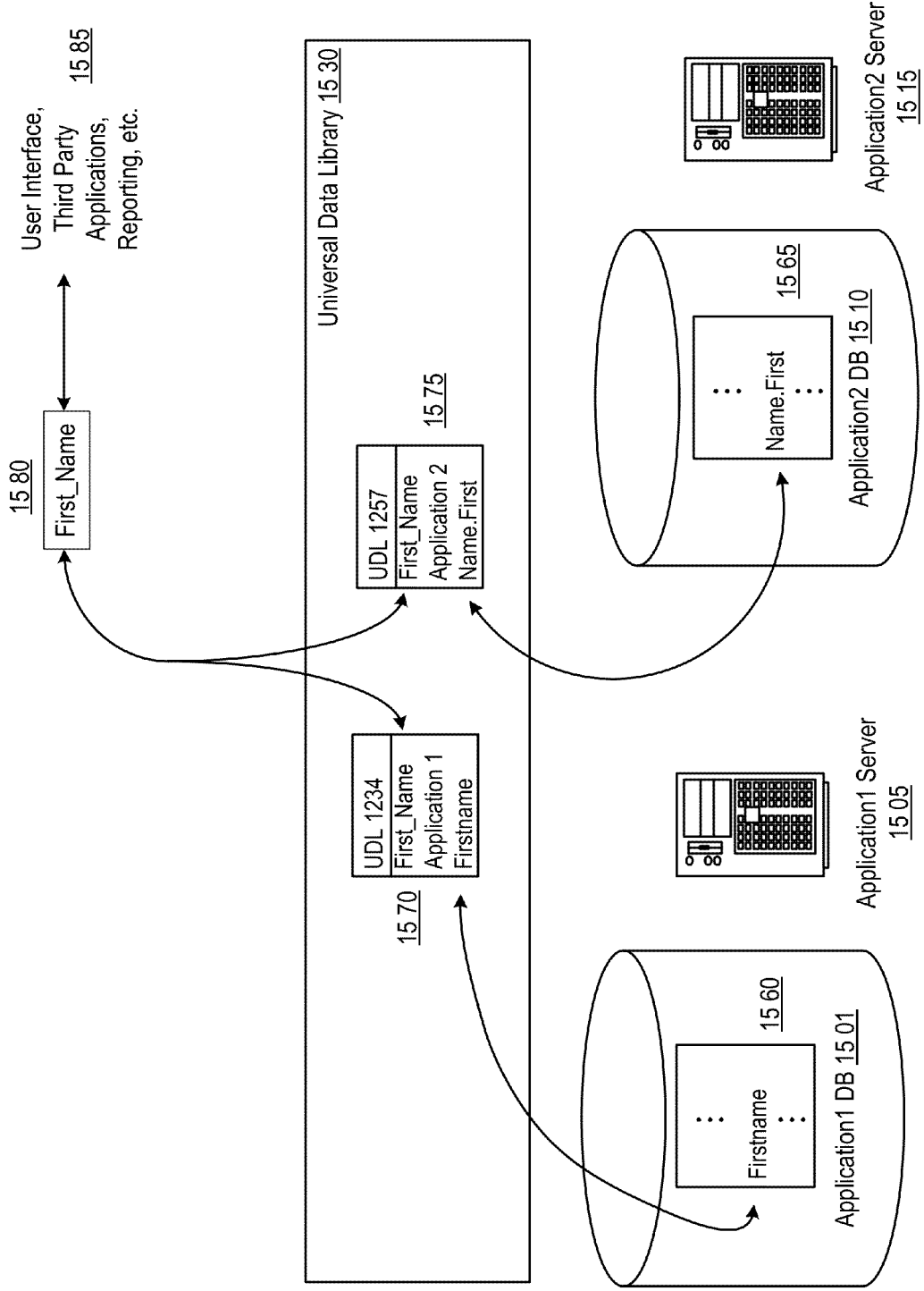

FIGS. 15A-B show an implementation of data flow between and among FTT system components in one embodiment of FTT operation. In FIG. 15A, plurality of application systems may exist, each having a respective application database (1501, 1510, 1520) and application server (1505, 1515, 1525). For example, an enterprise or organization may employ different applications for different enterprise goals or functions, such as a human resources application, a facilities application, a finance application, and/or the like. In some implementations, an enterprise may employ further databases that are independent of a specific application or specialized server system, such as for data storage or warehousing. A universal data library 1530 may be communicatively coupled to databases and/or application servers to provide and/or mediate access to data contained in the databases through the use of intermediate objects acting as universal variables. As described in further detail below, the universal variables contained in and managed by a universal data librarian system may provide object-oriented database access to users while masking the intricacies of database relational structure and the details of database query languages. Furthermore, judicious selection of universal variables allows common data types across otherwise disparate databases, including external data sources in some implementations, to be encapsulated within a relatively small set of universal variables and allows for effective integration of databases without the need for data warehousing practices. In some implementations, universal variables managed by the universal data librarian may be organized in accordance with a hierarchical schema, as described in further detail below.

In some implementations, the universal data library may be communicatively coupled with an automated data extractor 1535 configured to receive specification of report templates and/or to generate reports 1540 of values associated with universal variables. Report generation schedules, triggering conditions, and/or the like may likewise be specified as part of report template definition, and values included in the report may be draw in real-time and/or on a scheduled, periodic, or triggered basis, via the universal data librarian, from multiple otherwise disparate databases and/or data sources.

In some implementations, the universal data library may further be communicatively coupled with a global data exchanger 1545 configured to communicate with one or more internal or external databases and/or data sources to exchange data therewith. For example, the FTT may be coupled to one or more external data servers 1550 and/or external databases 1555 to receive data files therefrom and/or provide data files thereto. In one implementation, the FTT may be configured to retrieve one or more data files from an external data source (1550, 1555), such as on a scheduled, periodic, triggered, and/or the like basis; parse discrete data units from the file contents, wherein the parsing may depend on whether the file is fixed length, delimited, XML format, and/or the like; and associate the parsed data units with universal variables in accordance with a pre-defined specification. In some implementations, the FTT may further be configured to mediate exchanges of data between internal databases. For example, the FTT may be configured to draw data from a source database, such as on a scheduled, periodic, triggered, and/or the like basis, and to associate the drawn data with universal variables in accordance with a pre-defined specification. In both cases, association of sourced data with universal variables may cause the sourced data to be input in one or more internal databases based on associations between database tables and/or fields and universal variables, as defined within the universal data librarian.

In one implementation, the universal data librarian, global data exchanger, and/or FTT may be configured to reformat data, such as to place it in a condition of conformity with like data in a target database. For example, sourced date data may be in a MM/DD/YY format while target date data is stored in a DD/MM/YYYY format. One or more of the described systems may be configured to reformat data as needed or desired, in accordance with a pre-defined specification. In one implementation, the universal data librarian, automated data extractor, and/or FTT may be configured to combine data from one or more sources, such as by appending, arithmetic operation, and/or the like, into a single data value provided to a data target.

A schematic illustration of FTT operation in one example is provided in FIG. 15B. Here, two application databases 1501 and 1510, each attended by a respective application server (1505 and 1515), each have tables (1560 and 1565) containing fields related to a first name (labeled Firstname in table 1560 and Name.First in 1565). Each database is communicatively coupled to a universal data library 1530, which includes records specifying relationships between the fields in application databases and universal variables. In the illustrated example, a record 1570 specifies a relationship between the Firstname field in the application 1 database and the universal variable First_Name. Similarly, a record 1575 specifies a relationship between the Name.First field in the application 2 database and the universal variable First_Name. The universal variable First_Name 1580 and/or values thereof may then be provided to a user interface, third party application, external data target, report generator, and/or the like 1585. Though omitted for clarity, details pertaining to the location of fields in an application database, such as table names, foreign keys, and/or the like may also be included in universal data library records to facilitate location of desired data.

FIG. 16 shows an implementation of a user interface for universal variable allocation in one embodiment of FTT operation. The user interface shown in FIG. 16 allows a user to specify associations between universal variables and applications having database fields to which the variables are connected. In the illustrated implementation, universal variables are organized in accordance with a hierarchical structure comprising a family 1601, a subfamily 1605, and a field name 1610. Here, the family shown pertains to a "candidate", such as a candidate for a job opening. Subfamily designations provide further specificity as to the type of data that is being embodied in the universal variable, such as candidateidentifier, candidatename, candidateaddress, and/or the like. The field name then specifies the precise data embodied in the universal variable, such as candidatessn for a social security number, candidatebirthdate, candidatecity, and/or the like. The interface further allows for specification of a display name 1615 associated with the universal variable, such as may be used in display interfaces, used in reports, provided in integrated data manipulation and/or third party applications, and/or the like. The interface further allows for specification of any of a variety of universal variable types 1620. For example, types may include, but are not limited to: static (e.g., data that is likely to not change often or at all, such as a user social security number), dynamic (e.g., data that is expected to change at some time in the future or that is frequently updated, such as a number of tests taken by a user, a user password, and/or the like), restricted text (e.g., data that must conform to a particular format or limited number of input options, such as a state abbreviation, a gender, and/or the like), and/or the like. The interface may further allow for specification of a data category 1625, such as whether the data is private or publicly available.

The interface may further allow for specification of a function, reformatting, and/or the like to be applied to data associated with one or more universal variables 1630. For example, in the illustrated implementation, the CandidateName universal variable field is set as a concatenation of a firstname variable and a lastname variable. The interface may further allow for specification of one or more databases, applications, and/or the like with which a universal variable is to be associated 1635. In one implementation, by specifying an application in connection with a particular universal variable, a facility may be made available for a user to further specify a particular table and/or field within a database associated with that application to which the universal variable should be connected and/or mapped. Such further specification is described in further detail below. The interface may further admit specification of particular values for universal variables, such as a fixed value for particular variables and/or sets of restricted values to which future inputs and/or associations must be matched (e.g., a list of 50 state abbreviations to which any state input to a corresponding universal variable must conform).

Figure 17:
FIG. 17 shows another implementation of a user interface for universal variable allocation in one embodiment of FTT operation.

FIG. 17 shows another implementation of a user interface for universal variable allocation in one embodiment of FTT operation. The interface shown in FIG. 17 may, in one implementation, allow for specification of specific tables and/or fields in databases, such as may be associated with particular software applications, to which specified universal variables are to be connected and/or mapped. A list of available, selectable applications and/or databases is provided at 1701. Selection of a particular application and/or database may cause a list of connected universal variables to be provided 1705. In one implementation, the list of universal variables shown 1705 in connection with a selected application or database 1701 is based on specifications made via the interface of FIG. 16. Each listed universal variable name at 1705 may then have one or more fields from tables in a database connected with the application and/or database specified at 1701, such as in the interface area shown at 1715. In one implementation, the interface may further allow for specification of one or more functions, reformatting, and/or the like to be applied to field values as they are associated with universal variables 1710. For example, a particular database may store an account value in US cents instead of US dollars, which may be the typical unit for the corresponding account value universal variable. The interface at 1715 would allow the database account value to be divided by 100 before association with the universal variable for the account.

An example implementation of hierarchically arranged universal variables is provided in Appendix A for one embodiment of FTT operation. Each universal variable includes family and subfamily designation, and is further characterized by a field name. Variable families may specify high-level categories to which particular universal variables belong and/or are associated. In the implementation illustrated in Appendix A, the families include Consumer, Account, Payment, Letter, Call, Product, Consumer Credit, Candidate, Employee, Plans, Forms, Supplier, Program, Employee, Government, Investor, Entity, and/or the like. Subfamilies may provide further detail as to the nature of the particular universal variable, and the field name provides yet further detail to unambiguously designate the type of data to be associated with that universal variables. Universal variables, such as may be organized hierarchically, with families, subfamilies, field names, and/or the like, may be selected, in some implementations, to maximize the extent to which the variables can be mapped to and/or otherwise associated with enterprise and/or third party data and/or database tables and/or table fields. For example, in one implementation, universal variables may comprise business objects, wherein the selection, naming, and organization of the universal variables is designed to facilitate understanding of the variables in a business context and/or by those skilled in business who may otherwise have little or no knowledge of database design or management. By mapping table fields from the underlying databases to such business object universal variables, the FTT may facilitate manipulation of the data relevant to business managers without the need for assistance from database administrators and/or any other database manipulation experts. The selection of universal variables illustrated in Appendix A will hereinafter be referred to as a business descriptive set of universal variables.

In an alternative implementation, a universal variable hierarchy may follow a business grammar construct, where each segment of the hierarchy follows a business grammar segment or token type (e.g., client name, followed by country, followed by vertical, followed by business type, followed by client program, in an implementation wherein the hierarchy follows a program code grammar).

In another embodiment, the hierarchy may itself be stored in the FTT database; e.g., where an object oriented database may be used to establish entity-relationships between a superclass entity and its constituent subclasses, and its eventual field entries. In one embodiment, each of the XML and/or data entries may be read into the user interface table column headings. Thus, when a user creates and/or edits values in the user interface, appropriate records and/or XML entries are pushed into the hierarchy data structure.

Figure 18:
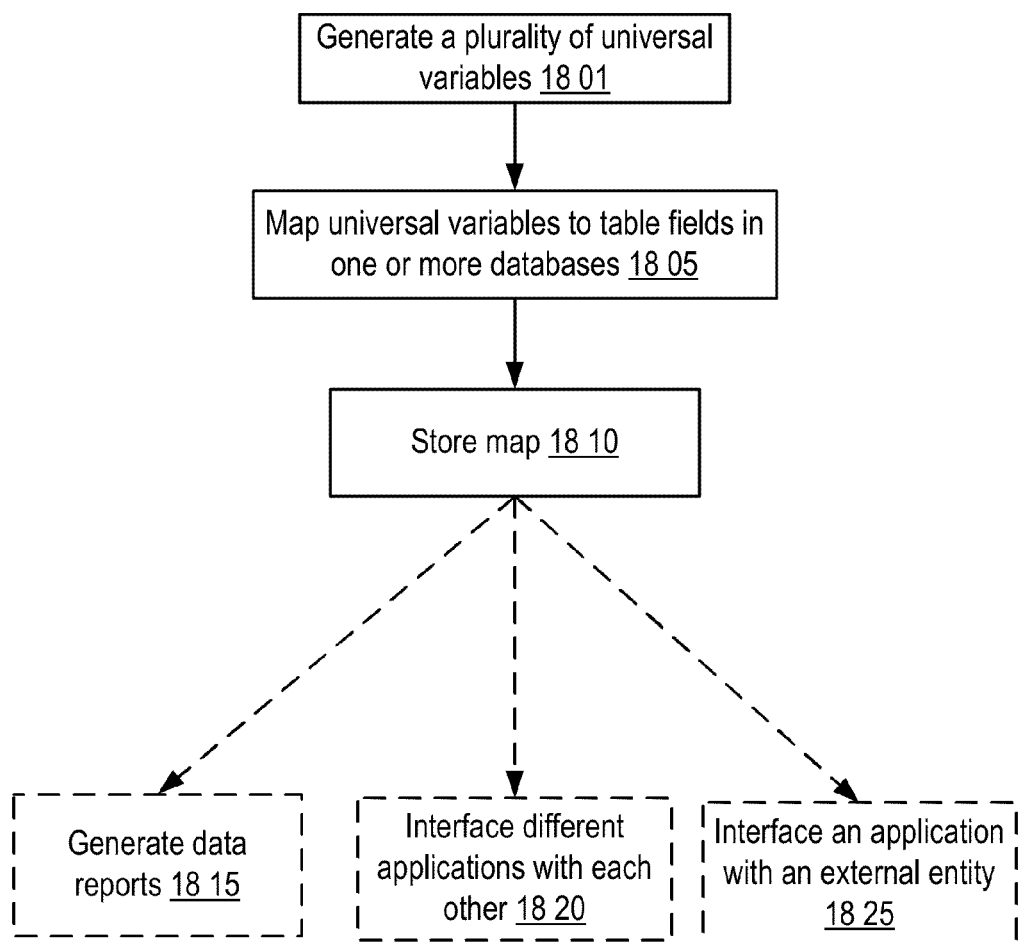
FIG. 18 shows an implementation of overall logic flow for a universal data library in one embodiment of FTT operation.

FIG. 18 shows an implementation of overall logic flow for a universal data library in one embodiment of FTT operation. A plurality of universal variables may be generated at 1801. In one implementation, universal variables may be organized in accordance with a hierarchical schema, such as may include a variable families, subfamilies, and fields. In one implementation, the universal variables may be selected and/or specified to represent business objects and/or with an eye to maximizing applicability of the variables across multiple entities, databases, clients, companies, and/or the like. The generated universal variables may then be mapped and/or otherwise connected to table fields in one or more databases 1805, and the mapping stored 1810, such as in a universal data library database. The universal variables, stored in the universal data library and managed by a universal data librarian, may then be used for a wide variety of different activities. For example, data reports may be generated 1815, whereby a user specifies data to be included in the report using universal variables, as well as a data layout in some implementations, and the data to be included in the reports is automatically extracted from the appropriate sources based on the mapping of universal variables to database tables and fields. In another example, different applications and/or databases having different data, table, and field labeling, database structure, data formatting, and/or the like, may be interfaced and/or integrated with each other 1820, whereby data updates in one database are automatically ported to corresponding fields in the interfaced database. This would allow, for example, data input from one application to update a database associated with a different application. In another example, an application and/or local database may be interfaced with an external entity and/or database 1825, whereby data updates by the local application and/or in the local database may be automatically provided to the external entity and/or database, and/or updates at the external entity and/or database may be automatically provided to the local database. These and other aspects and applications of the universal variables will be described in further detail below.

In one embodiment, the universal data librarian and/or other components described herein may connect to internal and/or external databases by means of one or more database adapters, such as but not limited to ODBC, JDBC, ADO.NET, OLEDB, and/or the like.

Figure 19:
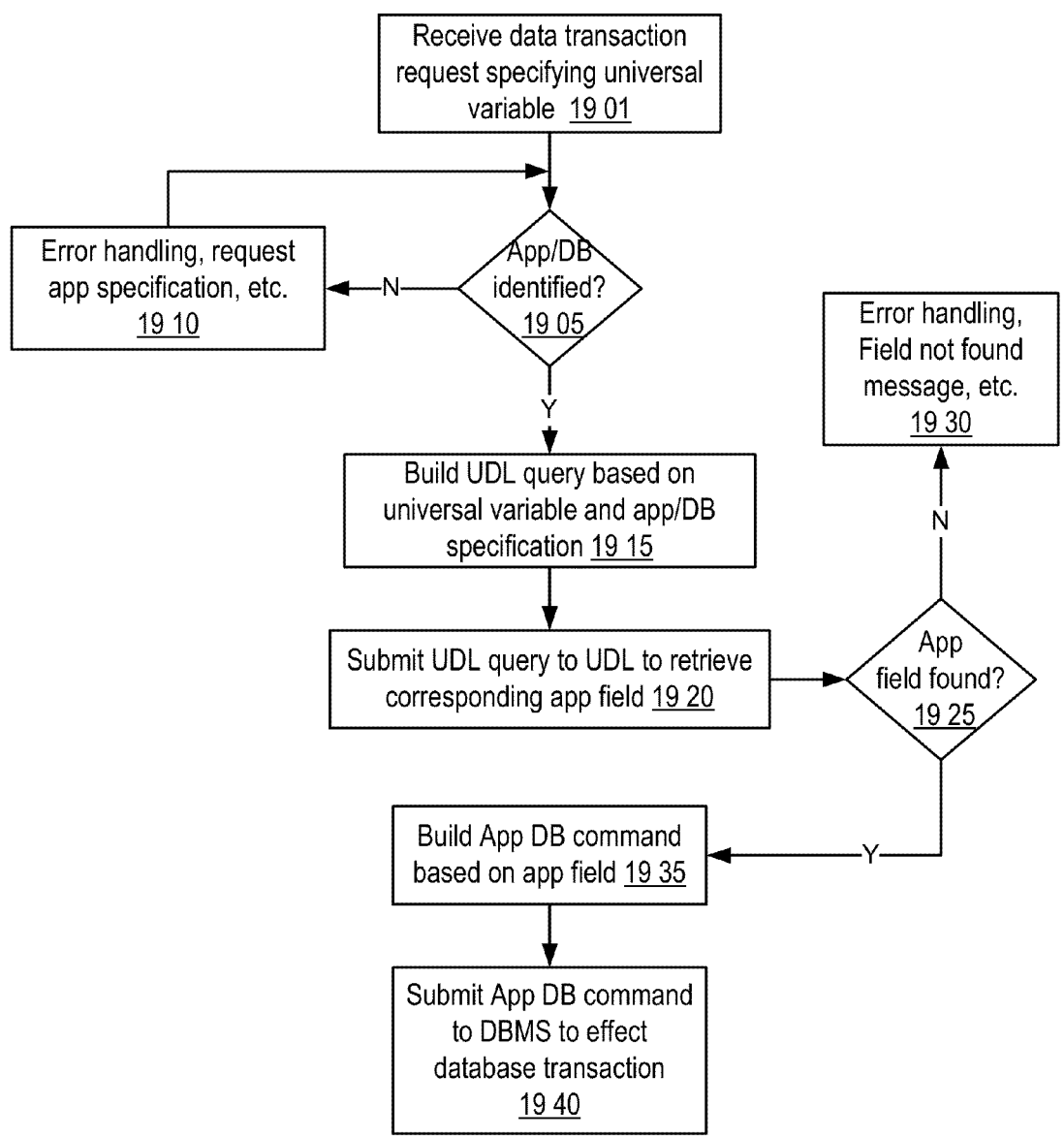
FIG. 19 shows an implementation of logic flow for connecting universal variable commands to application database commands in one embodiment of FTT operation.

FIG. 19 shows an implementation of logic flow for connecting universal variable commands to application database commands in one embodiment of FTT operation. A data transaction request, such as a request to input data, a data query, and/or the like, that specifies at least one universal variable is received 1901, and a determination is made as to whether a particular application, application database, other database, and/or the like has been identified or is identifiable in association with the request 1905. For example, in one implementation, a user may include an application and/or database specification in the request. In another example, an application and/or database may be contextually discerned based on the type of request, type of data queried, type of input, application used to generate the request, user identifier, and/or the like. For example, the FTT may compare a user identifier of a requesting user with a record of application and/or database identifiers associated with that user and/or for which the user is authorized to discern a database from which to query the requested data. In one implementation, a database registration table may be used as a repository for all database tables with which the FTT has come into contact, and the FTT may query such a table to (a) provide a user with a list of targets, (b) use a program specified parameter to match and/or specify a database, (c) use terms in the request to match best to a database entry, and/or the like.

If at least one database for the request cannot be identified, an error handling procedure may be undertaken 1910, such as providing an error message to the user, requesting specificity as to the application and/or database to which the request is directed, and/or the like. Otherwise, a universal data library query may be generated 1915 based on the specified one or more universal variables and the specified and/or discerned application and/or database.

In one implementation, business grammar tokens may be connected to and/or otherwise associated with particular universal variables which, in turn, may be linked to table fields in local and/or remote databases. A query or other database transaction leveraging a business grammar string may, then, be employed to access and/or transact data with table fields in either local or remote databases, using universal variables as intermediaries in construction of, for example, SQL commands. This query may be submitted to the universal data librarian 1920 to determine one or more table fields in the specified database, and/or a database associated with the specified application, to which the specified universal variable corresponds. A determination may be made as to whether the associated field exists in the target database, whether the field has some data values stored in association with it, and/or the like 1925 and, if not, another error handling procedure may be undertaken 1930, such as providing an error message to the user. In one implementation, determination of whether an associated field exists may be accomplished by evaluating a database management system response to a query submission (e.g., whether the desired data is retrieved, or whether an error message is returned from the database management system). Otherwise, a database command may be generated for the target database based on the identified one or more fields and the original user request 1935. The database command may, in various implementations and/or uses, comprise a query, an input, a data transfer, a data reformatting, an update, and/or the like. The generated command may then be submitted to the target database to effect the desired transaction 1940.

Figure 20:
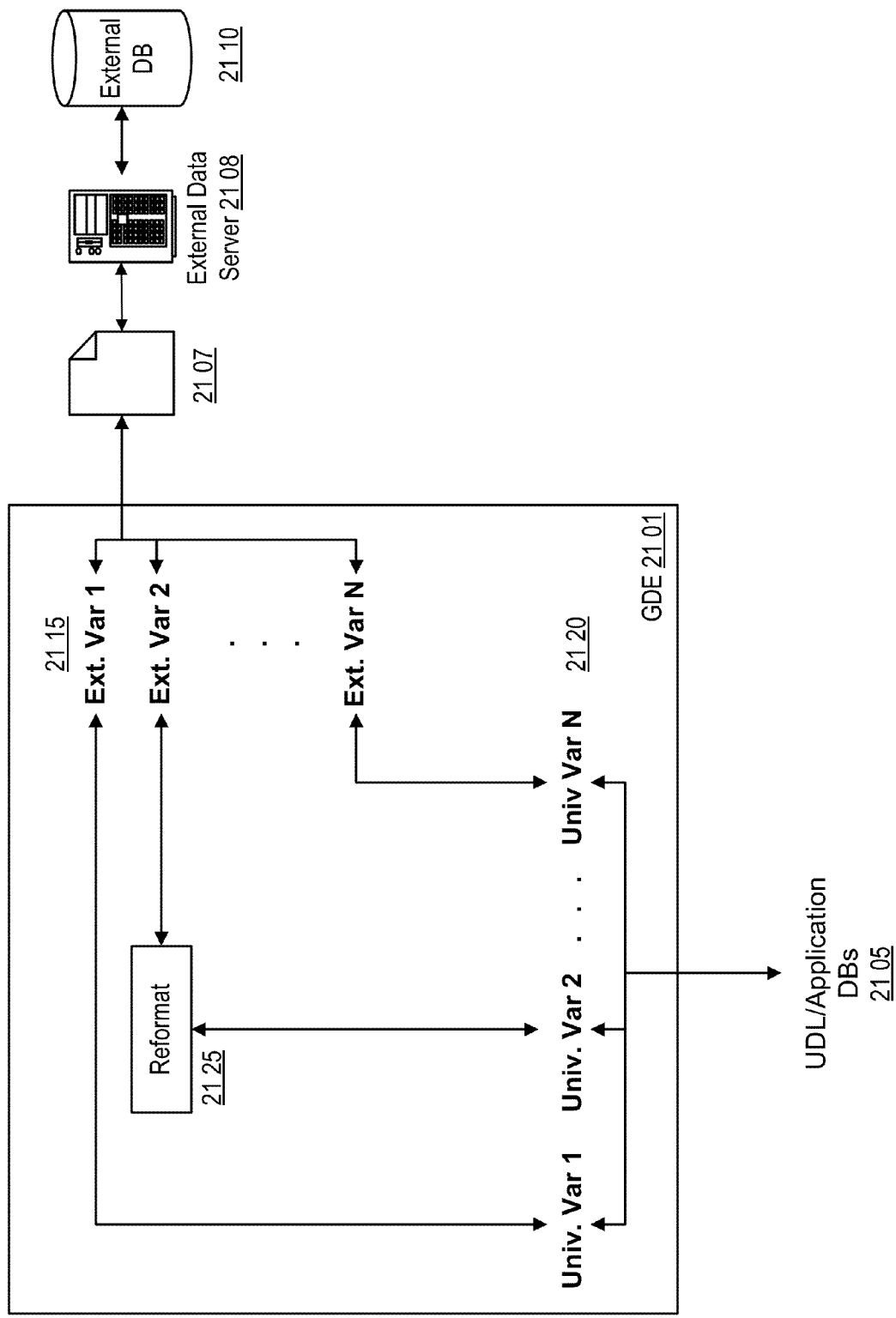
FIGS. 20 and 21 show implementations of data flow for interfacing universal variables to external database fields in one embodiment of FTT operation.
Figure 21:
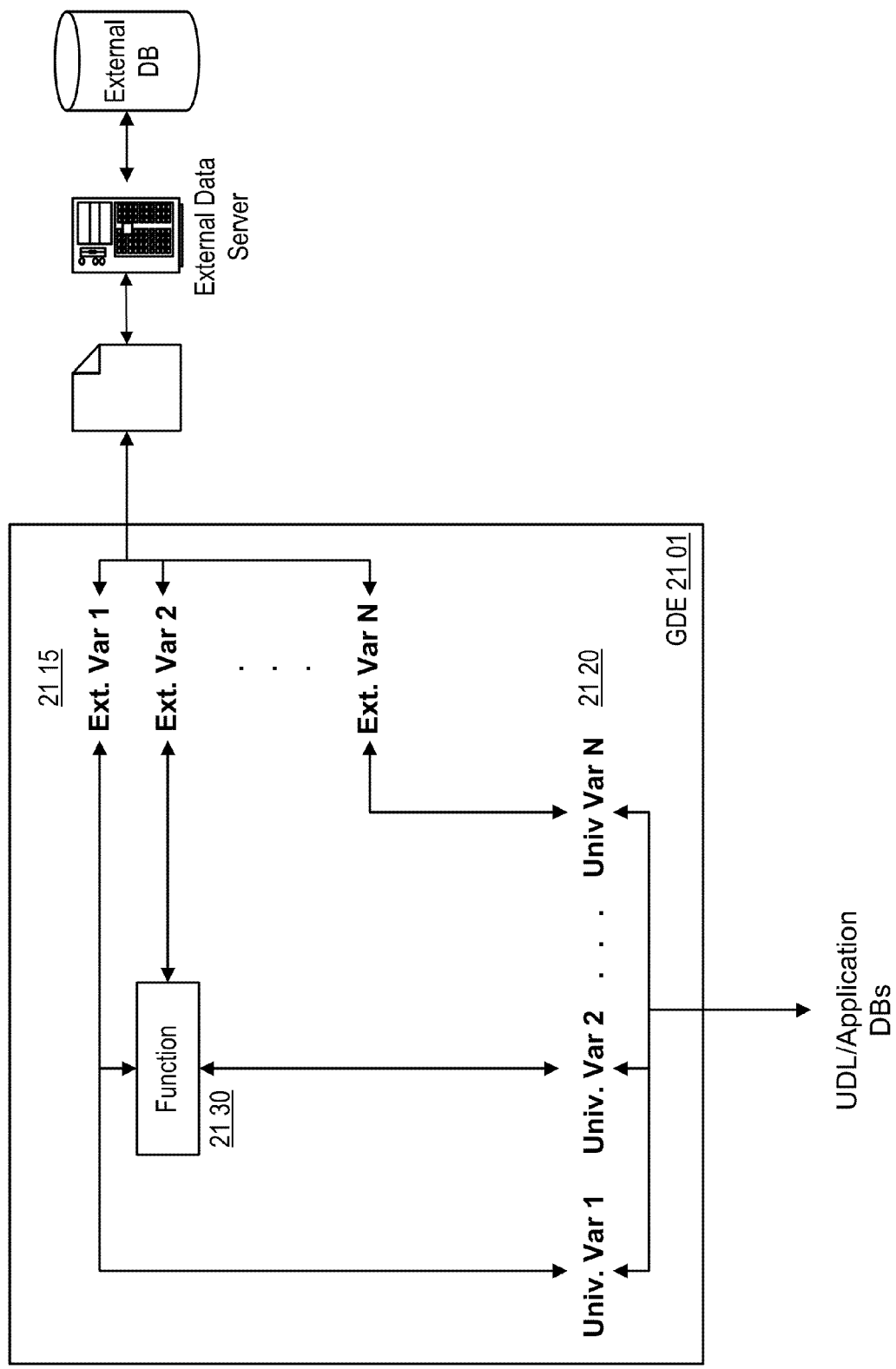

FIGS. 20 and 21 show implementations of data flow for interfacing universal variables to external database fields in one embodiment of FTT operation. In FIG. 20, the FTT is shown as a connecting interface between a universal data librarian and/or application databases and an external data server 2108, external database 2110, and/or the like. In the illustrated implementation, the external data server 2108 may generate a data file 2107 based on data contained in the external database 2110. The data file 2107 may be configured in accordance with a variety of formats and/or protocols, such as but not limited to fixed-length, delimited, extensible markup language (XML), and/or the like. In one implementation, the file may be stored in a pre-specified location and accessed by the FTT, such as on a scheduled, periodic, triggered, and/or the like basis. In an alternative implementation, the file may be pushed to the FTT as desired by the external data server 2108. The data in the file may be parsed by the FTT into values for a plurality of external data variables 2115. How the data is parsed from the file may depend on the format and/or protocol with which the file is configured and is discussed at greater length below. The FTT may access a mapping to determine which universal variables 2120 correspond to which external variables and/or external variable values 2115 parsed from the input file 2107. In some implementations, the FTT may apply reformatting instructions 2125 to one or more external variable values 2115 prior to storage of those values in association with the corresponding one or more universal variables 2101. Illustrative examples of reformatting instructions include conversion of a Julian formatted date into its Gregorian formatted equivalent; extraction of a first name from any of a variety of different name formats (e.g., First Middle Last, Last First, Last First Middle, etc.); conversion of data present in binary-coded decimal to ordinary decimal representation; and/or the like.

Once the external values are associated with universal variables, the values may be stored in an appropriate database, provided to a local application, and/or the like 2105.

In some implementations, the reverse procedure may also be implemented by the FTT, whereby data values stored in a local database 2105 and associated with universal variables 2101 are provided as values for external variables 2115 and configured as an output file 2107 for provision to an external data server 2108 and/or external database 2110. In some implementations, the output file 2107 may be configured as a report, which may be provided for viewing on a display device, for printing, and/or the like. In some implementations, the formatting instructions 2125 may be reversible and applied to either external variable values or reversibly to universal variable values.

The data exchange illustrated in FIG. 21 is similar to that shown in FIG. 20, except that instead of reformatting a single external variable 2115 and/or universal variable 2120 value, the FTT 2101 may apply a function 2130 to combine values associated with more than one of the variables to yield the appropriate associations. For example, the function may specify that Universal Variable 1 is equal to External Variable 1, while Universal Variable 2 is equal to a sum of External Variable 1 and External Variable 2. This example function is reversible, since External Variable 1 and External Variable 2 could be recovered from Universal Variable 1 and Universal Variable 2 (i.e., External Variable 1=Universal Variable 1, and External Variable 2=Universal Variable 2−Universal Variable 1). Any mathematical operation, calculation, computation, data manipulation, reformatting, and/or the like may be applied to data by the FTT, as desired in various implementations or embodiments of FTT operation.

In some implementations, the FTT 2101 in FIGS. 20 and 21 may be provided at the local side 2105 with a limited subset of universal variable inputs, a file containing universal variable inputs and/or pointers to universal variables, and/or the like. This may allow for isolation of data received from an external source and/or generation of universal variable collections for particular functions or implementations of FTT embodiments. For example, in one implementation, a universal payment file may be generated locally, containing a set of universal variables that are expected to be relevant to any bank payment transaction. The FTT may then have particular mappings set up for particular banks whereby each mapping selects a subset of universal variables from the universal payment file that is relevant to and/or desired by the particular bank to which payment information is being provided. For example, a domestic wire transaction in the U.S. may only use a routing number and account number, while an international wire may instead, or in addition, require a Society for Worldwide Interbank Financial Transaction (SWIFT) code, intermediary bank information and account number, and/or the like.

Figure 22C:
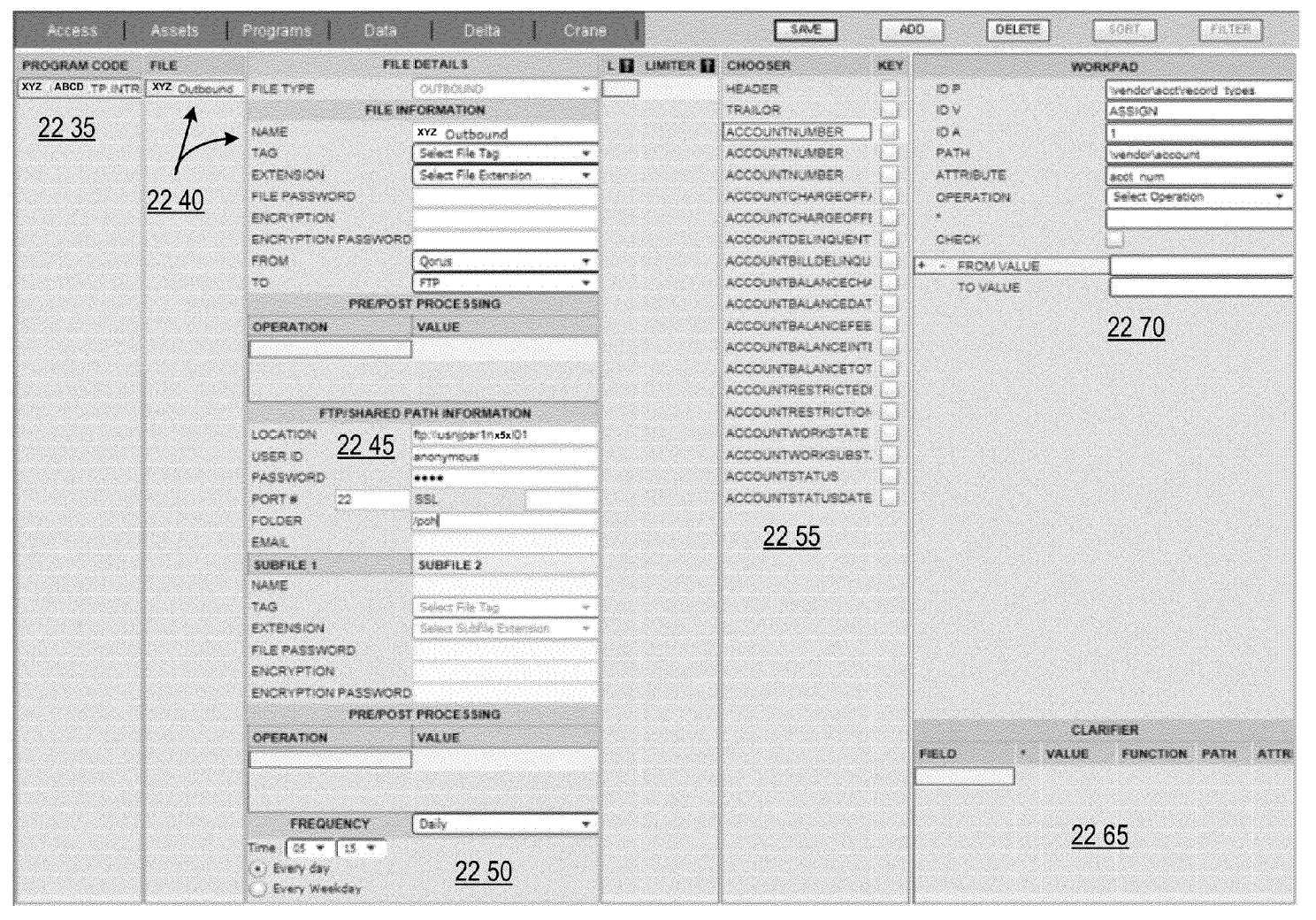

FIGS. 22A-C show implementations of a user interface for data exchange specification in one embodiment of FTT operation. In FIG. 22A, a user may specify parameters associated with a data exchange with one or more external data sources. For example, the interface may admit specification of a program code 2201, such as may specify characteristics of a program, project, work order, and/or the like. Program codes are described in further detail above. Specification of a program code may cause received data to be stored in association with the program code and/or in association with data corresponding to one or more tokens specified in the program code. The interface may further admit specification of a filename 2205, such as may correspond to a file received from or sent to the external data source. In some implementations, the interface may further admit specification of a filename for a local file input. Additional file information may also be specified, such as a file type 2210 (e.g., inbound, outbound, and/or the like), file format, and a variety of other file information 2215, which may include a file extension and/or associated reader application, file passwords, encryption key, decompression tool, file source (e.g., file transfer protocol [FTP]), file target (e.g., database to which the file and/or data contained therein should be provided), file tags, and/or the like. In an example wherein the file source is an FTP source, the interface may further admit specification of a variety of FTP information 2220, such as an FTP server address, a folder therein, a login and/or password, port number, secure sockets layer information, other security information, and/or the like. The interface may further include facilities for specifying one or more schedules, triggering conditions, and/or the like for causing data to be exchanged between the universal variables and the target. For example, these specified values may be exported as comma delimited values which are to be read by a cron job that feeds them as parameters to various programs.

In one implementation, an FTP cron entry may take a form similar to the following example:

Source: ftp.xyz.com 22 Folder: /inbound/placement Frequency: Daily at 5 AM.

In another example, a user may specify a periodic schedule (e.g., a specified time of each day) at which the FTT is to pull a file from (or push a file to) an external data target. In another example, a user may specify a triggering condition (e.g., a data update, a user request or other user action, occurrence of an automated part of a process, and/or the like), the occurrence of which triggers a FTT mediated data exchange between the universal variables and the target. The scheduled and/or triggered data exchange may also apply to data exchanges between local databases mapped to universal variables. For example, a user may specify that, at a specified time every day, particular fields in local database 1 corresponding to the universal variables should be updated with data in fields in local database 2 associated with those same universal variables. In some implementations, a user may specify a time-variable and/or trigger-variable frequency of effectuating transactions. For example, if a new external source has just been added and the data from that source is expected to be updated frequently in an initial period, the transaction schedule for that source may be set to a twice-daily frequency for the first week, followed by a once-daily update for the following two weeks, and a weekly update thereafter. Transaction frequencies may also be automatically varied based on the detected occurrence of specified triggers. For example, the FTT may monitor a stock market index, such as the Dow Jones Industrial Average, and may be configured to increase transaction frequencies related to market data when a slope of the monitored index exceeds a specified threshold and to decrease the transaction frequency when the slope of the monitored index drops back below the specified threshold.

The interface may further provide a listing of selectable universal variables for association, such as via a drag-and-drop interface mechanism, with parsed components of an external data file (such as may be received from an external source or may be destined for transmission to an external target). An example of such a listing of selectable universal variables is shown at 2225 in FIG. 22B. In one implementation, a universal variable may be dragged and dropped to an association area of the interface, wherein the universal variable may be mapped to and/or otherwise associated with a specified portion of the external file. For example, in one implementation, the external file may be configured as a fixed-length file and one or more universal variables may be associated with one or more portions of the fixed-length file as specified by the position of the data within that file. In another implementation, the external file may be configured as a delimited file and one or more universal variables may be associated with one or more portions of the delimited file as specified by how the data is delimited within the file. In another implementation, the external file may be configured as an XML file and one or more universal variables may be associated with one or more portions of the XML file as specified by the XML tags setting off data within the file.

FIG. 22C shows another implementation of a user interface for specifying parameters associated with a data exchange with one or more external data sources. The interface may include a variety of different parameter specification fields and/or field areas, such as but not limited to: a program code area 2235 for entering one or more strings structured in accordance with a table tracking syntax and/or a descriptive business grammar; filename and detail information area 2240; data exchange counterparty address and detail information area 2245; scheduling information area 2250; universal variable selection listing area 2255, such as may, in one implementation, be configured with a drag-and-drop facility (e.g., employing Silverlight code and language libararies); clarifier specification area 2265 for refining data retrieval results; workpad area 2270 for entering data processing and/or analytical instructions; and/or the like.

An implementation of an XML data exchange specification resulting from inputs to interfaces such as those shown in examples of FIGS. 22A-C may take a form similar to the following example:

```
<vendor vendor_id='irmcocap'>
<account acct_num="1001221235" bid="1" sid="2" action_dt="2009-10-07">
  <record_types>
    <record_type>ASSIGN</record_type>
  </record_types>
  <vendor_assignment_detail>
    <screen_name>JOE SHREE</screen_name>
    <day_phone_quality_score>10</day_phone_quality_score>
    <night_phone_quality_score>01</night_phone_quality_score>
    <pi_code>3916</pi_code>
    <pi_title>AOL</pi_title>
    <usage1>0</usage1>
    <usage2>0</usage2>
    <usage3>0</usage3>
    <usage4>0</usage4>
    <usage5>0</usage5>
    <usage6>0</usage6>
    <usage7>0</usage7>
    <usage8>0</usage8>
    <last_4_mon_fee>0</last_4_mon_fee>
    <last_4_mon_roaming>0</last_4_mon_roaming>
    <last_4_mon_commsurch>0</last_4_mon_commsurch>
  </vendor_assignment_detail>
  <contact_name>
    <first_name>JOE</first_name>
    <last_name>SHREE</last_name>
  </contact_name>
  <address>
    <street1>100 XYZ ST </street1>
    <street2> </street2>
    <city>XYZ CITY </city>
    <state>NJ</state>
    <zip>00000-0000</zip>
  </address>
  <phone>
    <day_phone>2222222222</day_phone>
    <evening_phone>2222222222</evening_phone>
  </phone>
  <acct_osb_amount>10360</acct_osb_amount>
  <member_misc_details>
    <current_pm_id>4</current_pm_id>
    <cancel_dt>2009-06-22</cancel_dt>
    <registration_dt>1999-11-26</registration_dt>
    <special_instr> </special_instr>
    <member_status_indicator> </member_status_indicator>
  </member_misc_details>
  <letter details>
    <letter_id> </letter_id>
    <letter_due_days>0</letter_due_days>
  </letter details>
  <payment_chargeback_details>
    <last_payment_dt> </last_payment_dt>
    <last_payment_amount>0</last_payment_amount>
    <last_chargeback_code> </last_chargeback_code>
    <last_chargeback_amount>0</last_chargeback_amount>
    <last_chargeback_dt> </last_chargeback_dt>
    <old_delinquent_charge_dt>2009-02-27</old_delinquent_charge_dt>
  </payment_chargeback_details>
  <special_codes/>
  <line_item_transactions>
    <transaction>
      <charge_id>0000000000000</charge_id>
      <line_item>1</line_item>
      <line_item_desc>TWX*AOL SERVICE </line_item_desc>
      <pm_id>4</pm_id>
      <osb_amount>10360</osb_amount>
      <placement_dt>2009-10-07</placement_dt>
    </transaction>
  </line_item_transactions>
</account>
<account acct_num="000000000" bid="1" sid="2" action_dt="2009-10-07">
</vendor>
```

Other file configurations and parsing specifiers may be employed within various implementations of FTT embodiments.

Figure 23:
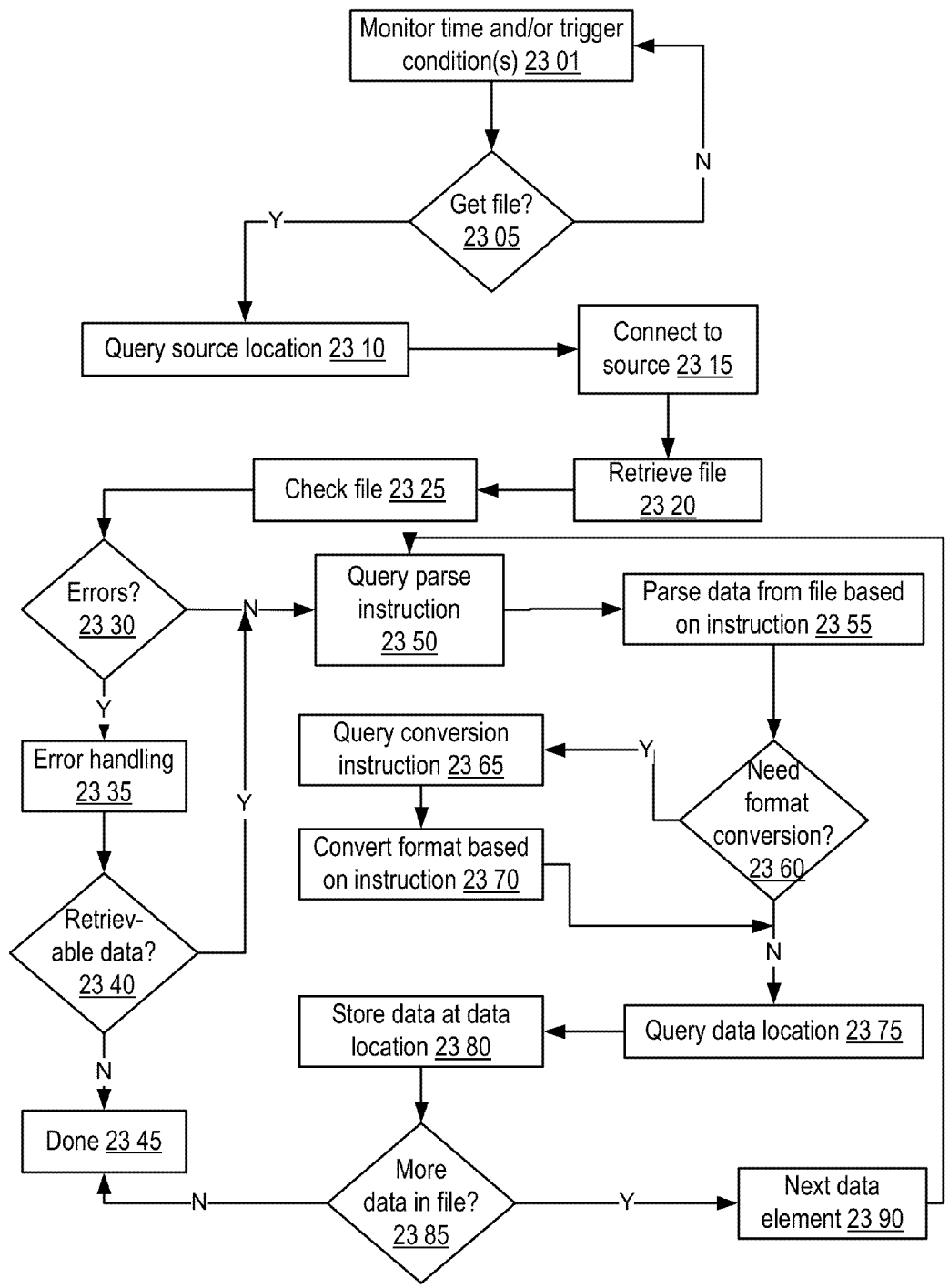
FIG. 23 shows an implementation of logic flow for data exchange in one embodiment of FTT operation.

FIG. 23 shows an implementation of logic flow for data exchange in one embodiment of FIT operation. The example illustrated in FIG. 23 is directed to receipt of a file from a data source and provision of data therein to fields associated with the universal variables. It is to be understood that the FTT may also be configured for the reverse process, generation of a file, report, and/or the like and provision to a target based on data contained in fields mapped to the universal variables (see, e.g., FIGS. 27 and 28). The FTT may further be configured, in some implementations, for exchange of data from fields in one database that are associated with the universal variables to fields in another database that are also associated with the universal variables (see, e.g., FIG. 26). In the implementation illustrated in FIG. 23, the FTT may monitor time in relation to a specified schedule and/or one or more specified triggering conditions 2301 to determine whether or not to effectuate a specified data exchange 2305. If not, the FTT may continue to monitor until the specified time and/or conditions indicate that an exchange is to occur. Once the exchange is triggered, the FTT may query the location of a data source 2310 (e.g., the address of an FTP server, such as specified at 2220 in FIG. 22A), such as from a mapping record in a database. The FTT may then connect to the source using the queried address 2315 and retrieve a file 2320 contained therein. In one implementation, the FTT may retrieve every file contained in a specified target location 23 (e.g., any file stored on the server, any file contained in a specified subfolder, and/or the like). In another implementation, the FTT may retrieve only a file having a filename matching a name specified in a mapping record associated with the data exchange.

In one implementation, the FTT may perform an initial check of the file to ensure that it does not have any clear problems or errors. For example, the FTT may check that the file has at least a minimum file size (e.g., not a null file), is configured in accordance with an expected format, does not exhibit any characteristics of a virus or other undesired file, and/or the like. If errors or other problems are detected 2330, an error handling procedure may be undertaken 2335, such as providing an error message to a specified recipient (e.g., an administrator of the data source), attempting to repair the file, attempting to extract any salvageable data from the file, and/or the like. A determination may be made as to whether there is any retrievable data in the file 2340, such as following an attempted repair at 2335, and, if not, then the process may conclude 2345. Otherwise, if data can be retrieved from the file, the FTT may query a parse instruction from a mapping record associated with the transaction 2350. The parsing instruction may, for example, specify a position of data in the file for a fixed-length file, a number of delimiters setting off data in the file for a delimited file, an XML tag setting off the data in an XML file, and/or the like. Based on the parsing instruction, the FTT may parse data from the file 2355. A determination may then be made as to whether any reformatting of the data is needed or desired 2360, such as may be specified in the mapping record. For example, the convention for formatting of dates may be different in the file than for the universal variable to which the date is to be connected, so a conversion of format may be desired before associating the file data with the universal variable and/or table fields connected thereto in local databases. If conversion is desired, then a conversion instruction may be queried from the mapping record 2365, and the particular data converted and/or reformatted in accordance with that instruction 2370. The FTT may then query a data location associated with the mapping to which the data from the file is to be provided 2375, such as may be directed by a universal variable specified in the mapping record. For example, the data location may be a field in a table in a database mapped to the universal variable to which the data from the file is connected. The data parsed from the file may then be stored at the data location 2380, and a determination made as to whether there is any further data in the file to be extracted 2385. If so, information associated with the next data element may be queried from the mapping record associated with the transaction 2390, and the FTT may return to 2350 to parse that next data from the file. Otherwise, the transaction may be concluded 2345.

Figure 24:
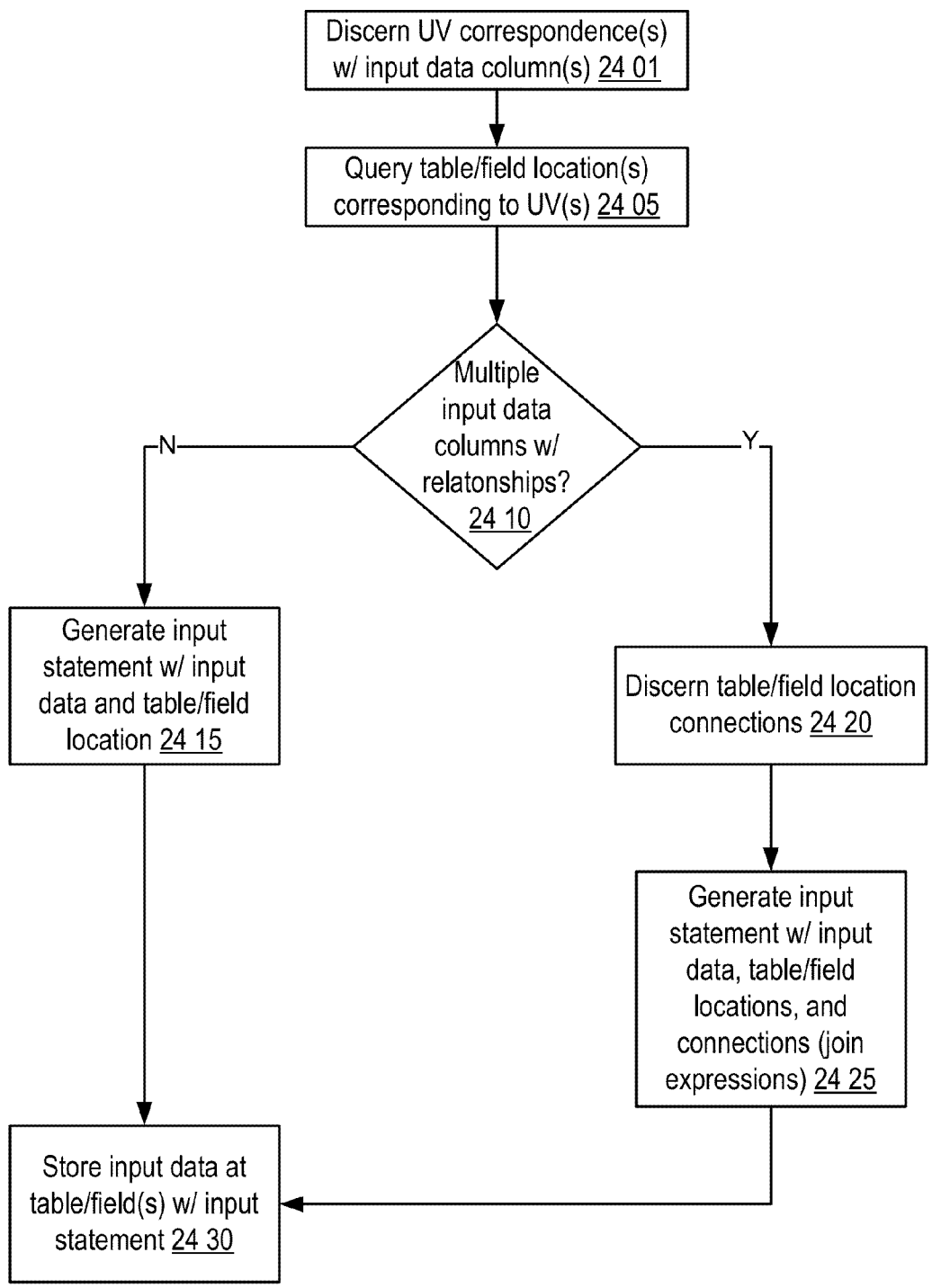
FIG. 24 shows an implementation of logic flow for database input statement generation in one embodiment of FTT operation.

FIG. 24 shows an implementation of logic flow for database input statement generation in one embodiment of FTT operation. The logic flow shown in 24 may, in some implementations, be provided as a further detail of the storage of data at 2375 and 2380 in FIG. 23. In some circumstances, data provided in an external file may be provided as a single column of data or may be provided as multiple columns that are independent of each other (i.e., wherein the data in a given row of one column has no relationship to data in a corresponding row of any other column). On the other hand, in some circumstances, data provided in an external file may comprise multiple columns having fixed relationships to each other. An example of this latter circumstance may be a file containing a column of customer names and a second column of customer accounts, wherein exactly one account corresponds to each customer name. The flow in FIG. 24 serves to distinguish between these two circumstances and to handle each appropriately. The FTT may discern universal variable correspondences to input data columns 2401 and to query the databases and/or table/field locations associated thereto 2405, such as via a mapping record and/or records for universal variables stored in a universal data library. A determination may then be made as to whether there are multiple data columns having fixed relationships to each other in the input data file 2410. In one implementation, this determination may be made by querying a specification of a multi-column file with fixed relationships in a mapping record. In another implementation, the FTT may automatically determine whether columns have a fixed relationship to each other, such as by comparing column headers to values in a table indicating columns that are likely to be related (e.g., "name" and "account" may be associated in such a record, so columns having these words their headers may be automatically determined to have a fixed relationship).

If there are not multiple columns, or if there are multiple columns but no fixed relationship therebetween, the FTT may generate input statements, such as SQL Input statements, with the input data (which may, in some implementations, be arranged in multiple independent columns) and the corresponding table/field locations 2415 to save the data from the file at those locations 2430. In some implementations, a SQL statement generated as described above may take a form similar to the following example:

insert into tblAccountHdr
(ClientAccountNumber ,ProgramID ,Created-Date ,TS ,Created-By)
select tblAccountHdr_ClientAccountNumber ,ProgramID ,getdate( ) ,'633976851390226187' ,'311'
from
(select t1.tblAccountHdr_ClientAccountNumber__1__0 as tblAccountHdr_ClientAccountNumber ,t2.ProgramID
From ##iQorFileMapping_fdfde5fb3c8c03411f3be8a3cd7c6953edcf2 t1
inner join tblProgram t2 on t2.ProgramCode=t1.tblProgram_ProgramCode__1__1
WHERE t1.tblAccountHdr_ClientAccountNumber__1__0 is not null
Except
Select ClientAccountNumber ,ProgramID
from tblAccountHdr ) b
|Q|Parent
insert into tblPhoneNumber (PhoneTypeCode ,PhoneNumber ,PhoneSource ,PhoneSubSource ,AccountID ,EffectiveDate ,CreatedDate ,TS ,CreatedBy )
   select tblPhoneNumber_PhoneTypeCode ,tblPhoneNumber_PhoneNumber ,tblPhoneNumber_PhoneSource ,tblPhoneNumber_PhoneSubSource ,AccountID ,get-date( ) ,get-date( ) ,'6339768513905386754','311'
   from
   (select t1.tblPhoneNumber_PhoneTypeCode_5_0 as tblPhoneNumber_PhoneTypeCode , case
      when len(ltrim(rtrim(t1.tblPhoneNumber_PhoneNumber_6_0))) > 0 and
      isnumeric(ltrim(rtrim(t1.tblPhoneNumber_PhoneNumber_6_0))) = 1
      then convert(decimal(20,0),ltrim(rtrim(t1.tblPhoneNumber_PhoneNumber_6_0)))
      when len(ltrim(rtrim(t1.tblPhoneNumber_PhoneNumber_6_0))) = 0 and isnumeric(ltrim(rtrim(t1.tblPhoneNumber_PhoneNumber_6_0))) = 0
      then 0
      else ltrim(rtrim(t1.tblPhoneNumber_PhoneNumber_6_0)) end as
      tblPhoneNumber_PhoneNumber
   ,t1.tblPhoneNumber_PhoneSource_9_0 as
      tblPhoneNumber_PhoneSource
   ,t1.tblPhoneNumber_PhoneSubSource_10_0 as
      tblPhoneNumber_PhoneSubSource ,t3.AccountID
   from
   ##iQorFileMapping_fdfde5fb3c8c03411f3be8a3cd7c6953edcsf2 t1
      inner join tblProgram t2
      on t2.ProgramCode=t1.tblProgram_ProgramCode_1_1
      inner join tblAccountHdr t3
      on t3.ClientAccountNumber =
   t1.tblAccountHdr_ClientAccountNumber_1_0 and
      t3.ProgramID=t2.ProgramID WHERE
   t1.tblPhoneNumber_PhoneTypeCode_5_0 is not
      null AND t1.tblPhoneNumber_PhoneNumber_6_0 is not
   null AND
      t1.tblPhoneNumber_PhoneSource_9_0 is not null AND
      t1.tblPhoneNumber_PhoneSubSource_10_0 is not
   null )b If, on the other hand, the FTT determines that there are multiple columns with a fixed relationship between them at 2410, then it may seek to discern relationships between table/field locations to which the columns in the file correspond 2420. For example, the file may include a column for customer_name, which is connected to a universal variable CustomerName, and a column for customer_account, which is connected to a universal variable CustomerAccount. Each universal variable is, in turn, mapped to table fields within one or more databases, such as a customer name field and a customer account field. In order to build a command to port the file data to those fields, the FTT may seek to determine the relationship between the customer name field and the customer account field. If these fields are in the same table in the same database, a direct Input statement may be employed. However if, for example, the fields exist in different tables within a database, the Input statement may be supplemented with a Join clause, such as a SQL Join clause, to reflect the connection between the tables and the data provided thereto. By inputting the data with the Join clause, the connection between the customer name information and the customer account information will be preserved for future access. Further detail as to how the relationship between table fields is determined is provided below. Once the relationship is established, the FTT may generate an Input statement with the file data, the table/field locations, and any necessary or desired Join clauses 2425, and may store the data with the generated statement 2430.

Figure 25:
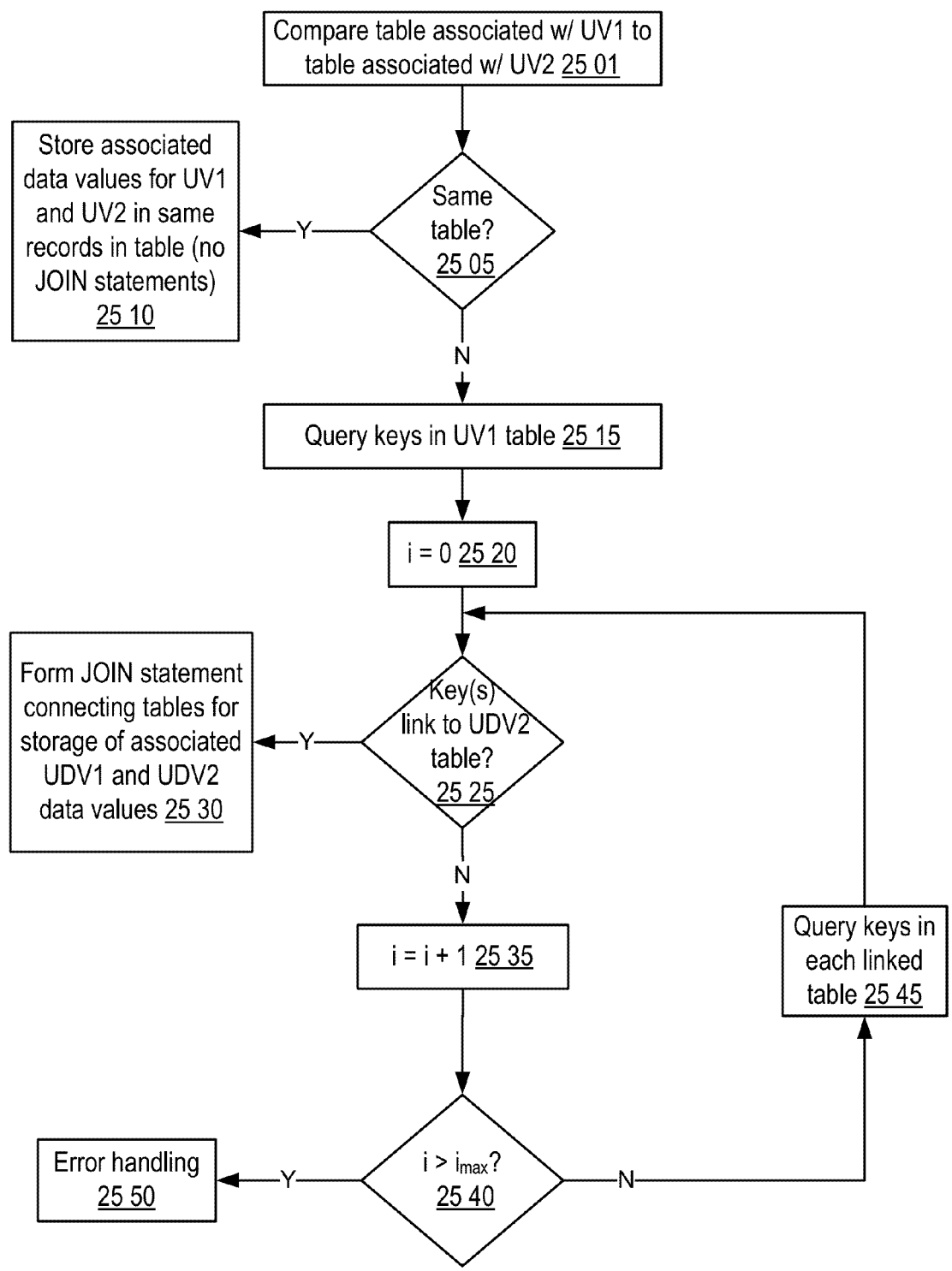
FIG. 25 shows an implementation of logic flow for determining data relationships in one embodiment of FTT operation.

FIG. 25 shows an implementation of logic flow for determining data relationships in one embodiment of FTT operation. The example illustrated in FIG. 25 is directed primarily to an implementation discerning a relationship between two related data columns. It should be understood, however, that the flow can be generalized to discern relationships between any desired number of data columns, such as to assist in generation of Join clauses for database transaction commands. The FTT may compare a first table field associated with a first universal variable (which, in turn, may be associated with a first column of an input file) and a second table field associated with a second universal variable (which, in turn, may be associated with a second column of an input file) 2501. A determination may be made as to whether the first table field and second table field are fields within a single table 2505. For example, the FTT may check whether the fields are in tables having the same name and in existing in the same database. If the fields are in the same table, the FTT may generate a database command to store the values in the same table, wherein the command may not include any Join clauses 2510. If the fields are not in the same table, the FTT may query keys contained in the table associated with the first universal variable 2515 and a counter may be initialized 2520. The FTT may then determine whether at least one of the keys in the table corresponding to the first universal variable connects to a table associated with the second universal variable 2525. If so, the FTT may form a Join clause for inclusion in a database command for storing the data values in association with the first and second universal variables, wherein the Join clause explicitly connects the tables associated with each universal variable 2530. Otherwise, if no direct connection can be discerned between the tables associated with the first and second universal variables, then the counter may be incremented 2535, and a determination made as to whether the counter exceeds a pre-set maximum value 2540. If not, then the FTT may query keys contained in each table directly connected to the table corresponding to the first universal data variable, or to whatever the last round of tables checked at 2525 were, and repeat the determination of whether any of those keys link to the table corresponding to the second universal variable (2525-2540). When the counter exceeds the maximum, the flow may be exited and/or an error handling procedure may be undertaken 2550, such as providing an error message to a user and/or administrator indicating that the distance between the tables corresponding to the first and second universal variables is too great to be established, and/or the like.

FIG. 26 shows an implementation of a user interface for database integration in one embodiment of FTT operation. The interface shown in FIG. 26 may, in one implementation, be employed to specify connections between table fields in different databases, such as local databases and/or separate databases connected to different enterprise software applications. The interface may, in one implementation, admit specification of one or more universal variables 2601, as well as an identifier of a source database 2605 and of a target database 2610. The interface may further admit specification of a frequency, schedule, triggering condition, and/or the like 2615, which may set how often the data in a field in the source database that is associated with the universal variable is provided to corresponding field in the target database. In one implementation, a default schedule may be implemented when no other scheduling and/or triggering specification is provided, such as one time only, once per day, once per week, and/or the like. The interface areas at 2620, 2625 and 2630 may further admit additional limitations, specifications, operations, and/or the like for the data transactions specified in the interface. In one implementation, a user may specify information to limit the data associated with a universal variable that is passed from the source database to the target database. For example, a user may specify values for a second table field and/or universal variable to limit data for the first universal variable to only those values associated with the specified values for the second universal variable and/or table field (e.g., only provide account information or male customers). The interface may further admit specification of reformatting instructions and/or one or more functions and/or operations (e.g., mathematical calculations) to be performed on one or more data values extracted from the source before providing the processed data to the target.

Figure 27B:
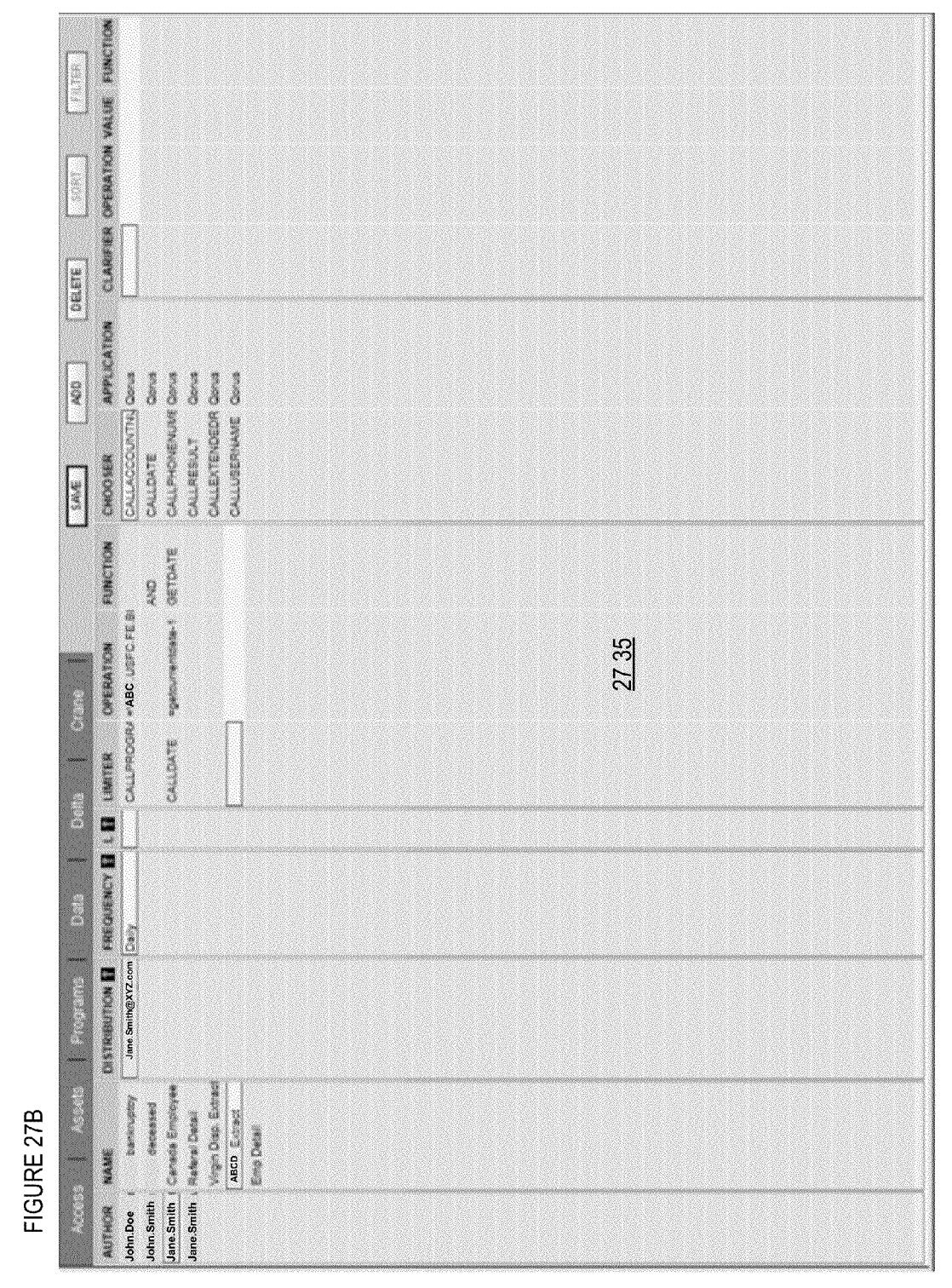

FIGS. 27A-C show implementations of a user interface for report generation and generated reports in one embodiment of FTT operation. The interface in FIG. 27A may, in various implementations, admit input of report specifications, including a selection of data to be included (such as may be specified in terms of universal variables), data layout, desired or required manipulations of data, scheduling and/or triggering of report generation and/or output, and/or the like. In one implementation, the interface may admit specification of an author of a particular report generation template 2701, as well as a name identifying the template 2705, a distribution list and/or other target information for the report 2710 (e.g., a list of e-mail addresses, an FTP server address, a location on a file system, and/or the like), a report generation frequency (and/or, in various implementations, a schedule, triggering condition or event, and/or the like), and/or the like. The interface may further admit selection of any of the full set or some subset of universal variables, such as via a drag-and-drop mechanism. Selected universal variables, shown at 2725 in the figure, may be limited as to the particular database from which their associated data is to be drawn, and may further be limited in a variety of other ways. For example, the illustrated implementation admits entry of so-called Limiters 2720, specifying desired values for particular universal variables, program codes and/or code tokens, department codes and/or code tokens, and/or the like. Here, the data retrieved for a report is limited to those data associated with a PROGRAM-CODE of CL1.USMI.FP.HR and a PLACEMENTMONTH of August 2008. The interface may further admit additional limitations on the data included in the report, such as by the so-called Clarifiers shown at 2730. Clarifiers may, in one implementation, limit the data based on specified relationships between universal variables (e.g., "DIALED-DATE >=PLACEMENTDATE", "CALLRESULT=PROMISE", and/or the like).

Another implementation of a report parameter specification interface is shown at 2735 in FIG. 27B, with report parameter fields filled. FIG. 27C displays an example of a report generated by the inputs shown in FIG. 27B. The report is configured as a spreadsheet file and includes columns corresponding to extracted data such as call account number 2740, call user name 2745, call phone number 2750, call result 2755, extended result 2760 (which may, in one implementation, include additional information to refine the call result information), call date and/or time 2765, and/or the like.

In one implementation, Silverlight code, general Silverlight language libraries, and/or the like may be used to generate the tables and column presentation in HTML format. The tables may be comprised of text fields, and appropriate calls to the libraries may be made to pass information via drag and drop.

In various implementations, a report may be generated for output as a physical document (e.g., a printout), an electronic document, a structured data file (e.g., fixed length, delimited, XML, and/or the like), one or more database records, a user interface display, and/or the like.

Figure 28:
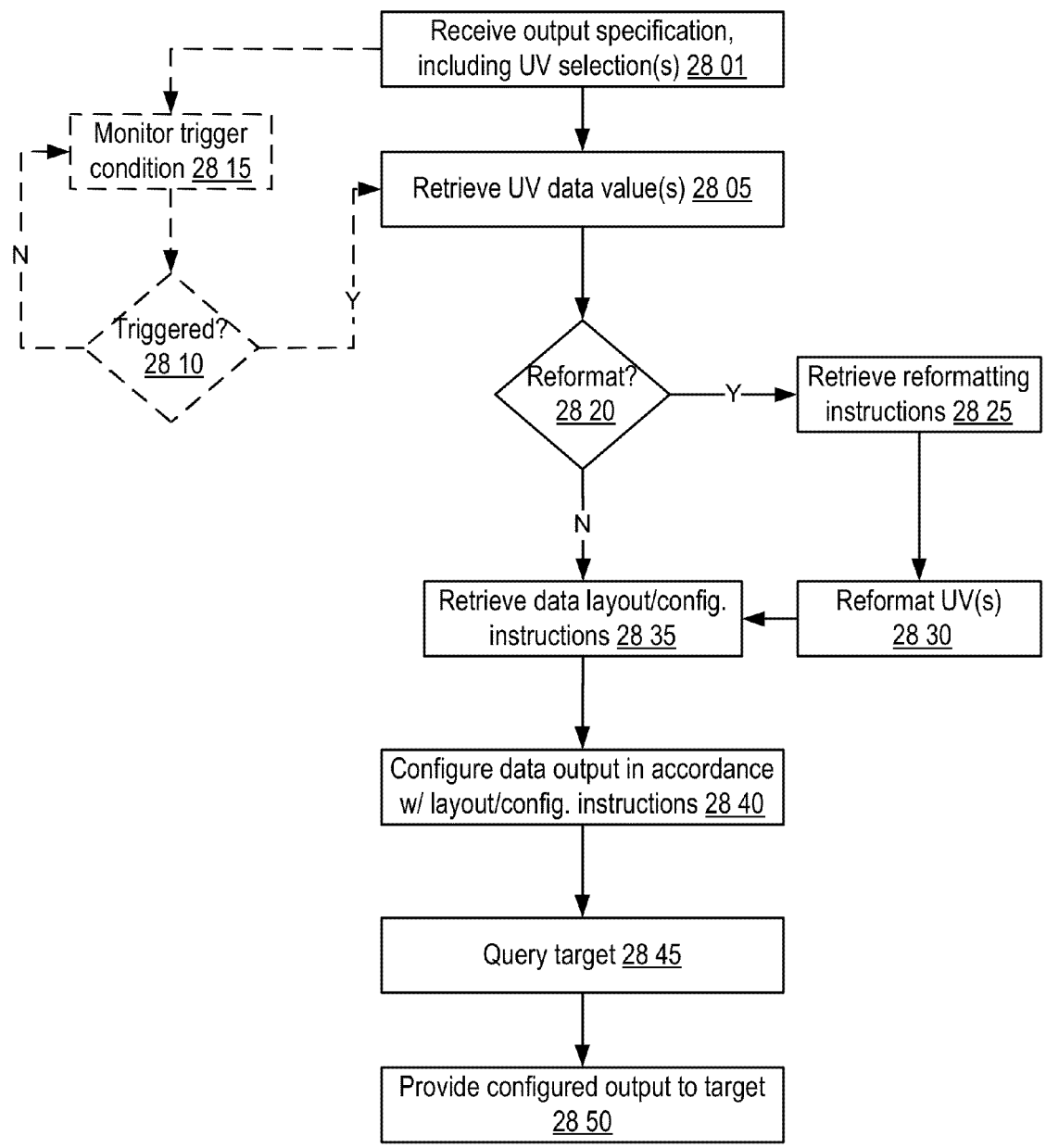
FIG. 28 shows an implementation of logic flow for report generation in one embodiment of FTT operation.

FIG. 28 shows an implementation of logic flow for report generation in one embodiment of FTT operation. A report output specification, such as may define a report template and may include a selection of universal variables, may be received 2801, such as via a report generation user interface. Based on the universal variables specified in the report output specification, data values associated with selected universal variables may then be retrieved from the sources containing those values 2805. In one implementation, data values in contained in table fields in remote databases that are associated with universal variables may first be pulled into one or more cache and/or local databases, and/or used to update table fields in local databases, before being retrieved for report generation. In an alternative implementation, no intermediate pulling of data values occurs, and the data is read directly from the remote database prior to inclusion in the report. In one implementation, such as when a report specification includes scheduling information, periodicity, triggering conditions, and/or the like, those triggering conditions, a clock, and/or the like may be monitored 2815 to determine when a report is to be generated, when the data for the report is to be sampled, and/or the like. A determination may be made as to whether or not report generation, data sampling, and/or the like has been triggered 2810 before proceeding to retrieve the requisite data for the report 2805.

A determination may be made as to whether any of the retrieved data is to be reformatted, modified, functionally combined with one or more other data values, and/or the like prior to inclusion in the report 2820. If so, the reformatting instructions may be retrieved 2825, such as by querying them from a report generation template record, and those instructions may then be applied to one or more selected universal variables and/or universal variable values 2830. In one implementation, a set of data layout and/or configuration instructions may also be retrieved 2835, such as from a report specification template record. Data layout and/or configuration instructions may, for example, include specifications of the arrangement and/or order of data; font, text size, text color, and/or other typographical characteristics of the data; titles, headers, borders, margins, table formats, charts, graphics, and/or the like for inclusion with the data; and/or the like. The retrieved data may then be configured in accordance with the retrieved layout and/or configuration instructions 2840.

A report target may then be queried 2845, such as from a report generation template record. A report target may, in various implementations, be selected from any of a wide variety of different possibilities, such as a display interface, a printer, a local or remote database and/or data server, an electronic file and/or document format (e.g., portable document format, spreadsheet, word processing document, and/or the like), and/or the like. The configured report may then be provided to the target 2850. In some implementations, a schedule, triggering condition, and/or the like may monitored to determine when the report should be provided to the target. In one implementation, the schedule, triggering condition and/or the like for provision of a report to a target may be separate and distinct from a schedule, triggering condition, and/or the like for report generation and/or data querying for inclusion in a report.

In some implementations, the FTT may be integrated as part of the system architecture illustrated in FIG. 1 and may interact with any or all of the other system components described with reference thereto. For example, in one implementation, the FTT may be provided at the authentication/control server 135 and/or at the data server 140 to mediate interactions with data stored in one or more central databases 145. Mediated interactions may include interactions with external and/or third party data sources or targets, projection servers 115, thin clients 105 and/or other network terminal devices, and/or the like.

Data Classification

Figure 29:
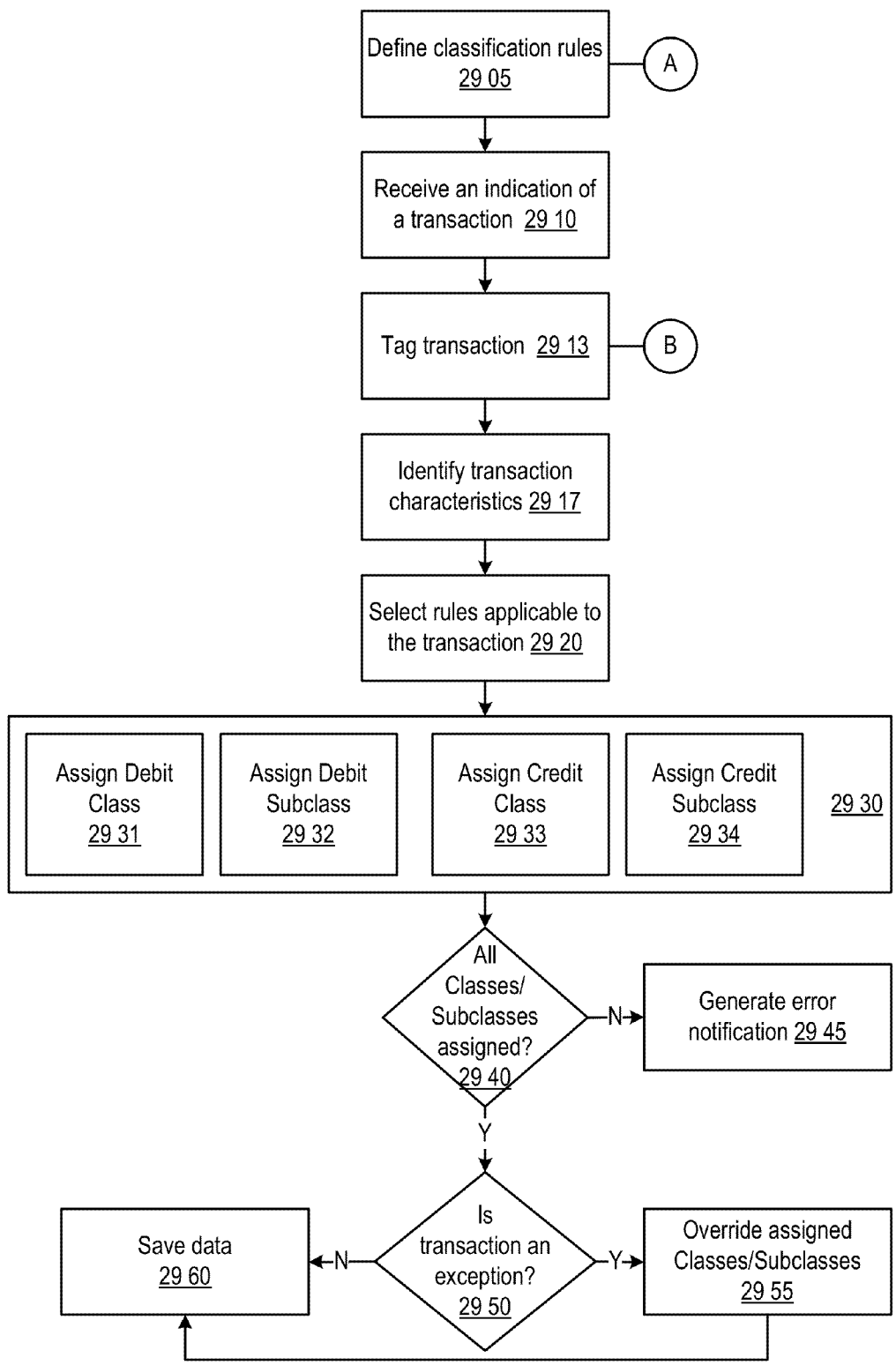
FIG. 29 is of a logic flow diagram illustrating assigning Credit/Debit Class/Subclass in one embodiment of the FT.

FIG. 29 is of a logic flow diagram illustrating assigning Credit/Debit Class/Subclass in one embodiment of the FTT. In FIG. 29, classification rules are established at 2905. Further details regarding establishing classification rules are provided later in the specification (see FIG. 30). At 2910, an indication of a transaction is received. A transaction may be paying a bill, depositing received payment, placing an order, receiving an order, receiving an approval to pay the invoice, paying salary to an employee, reimbursing an employee, paying taxes, receiving a tax refund, purchasing investments, selling investment, signing a contract, and/or the like. In one embodiment, an indication of a transaction may be received by having (e.g., a human) operator enter the transaction. For example, the operator may receive a paper invoice statement. The operator may then enter details from the invoice identifying the transaction into an application screen having inputs, such as input boxes, select boxes, date selectors, and/or the like, that allow a software application to capture such details. The operator may use a mouse, a keyboard, a microphone, a scanner, a camera, a video camera, an optical character recognition (OCR) device, and/or the like, to input the information.

In another embodiment, an indication of a transaction may be received by having a software application program automatically enter the transaction. For example, an application program may receive an invoice, such as via an email attachment, a file uploaded to a predetermined directory, an XML feed, and/or the like. The application program may then scan, parse, data mine and/or the like the received invoice to capture details identifying the transaction. In one implementation, the application program may use OCR to scan and capture this information. For example, the invoice may have a predetermined format and the application may OCR predetermined regions of the invoice document for details identifying the transaction. In one embodiment, the open source OCRopus OCR package may be employed to OCR documents. Once OCR conversion takes place, the document may be searched (e.g., via grep or string matching) for unique identifying keywords. In another implementation, the invoice may be in an XML format and the application program may parse the XML to capture this information. In one implementation, the XML request may take on the following form:

<XML>
  <INVOICE>
    <PAYORNAME>Company_1_ID</PAYORNAME>
    <PAYEENAME>Company_2_ID</PAYEENAME>
    <PAYMENTAMOUNTTOTAL>$1,000,000</PAYMENTAMOUNTTOTAL>
    <PAYMENTDATE>12/09/2009</PAYMENTDATE>
  </INVOICE>
</XML>

The application program may parse the XML request based on tags, such as by using the Perl m// operator, to find predetermined tags containing details identifying the transaction.

In yet another embodiment, an indication of a transaction may be received by the use of triggers, event schedulers, job schedulers, and/or the like, that cause transaction execution. In one implementation, a temporal trigger may be set to pay interest to investors every month. On the last day of the month, the temporal trigger may cause the payment to be made and may notify a software application program regarding this transaction. For example, temporal triggers may be employed by using the event scheduler present in MySQL. In one implementation, a temporal trigger may take on the following form:

CREATE EVENT PayInvestors
ON SCHEDULE EVERY 1 MONTH
DO . . . /* SQL Code that causes payment to be made and an indication of a transaction to be sent (such as via an update to a database table that causes execution of a database trigger) */

In another implementation, a job scheduler, such as the Cron application on UNIX, may be used to schedule payment to investors and to send an indication of a transaction.

At 2913, the transaction may be tagged with rule-based and other additional transaction characteristics. Further details regarding tagging transactions are provided later in the specification (see FIG. 31).

At 2917, transaction characteristics describing the transaction are identified. Examples of transaction characteristics may include transaction type, transaction frequency, transaction amount, transaction date, department code, program code, entity, payee, payor, location, country, business type, team, business category, business subcategory, employee id, employee title, payment method, bank account number, bank routing number, SWIFT code, IBAN, investment instrument, investor, and/or the like. In one implementation, transaction characteristics may be accessed using universal variables.

In one embodiment, transaction characteristics may be stored in a database and linked to transactions, such as via a primary key. In one implementation, identifying transaction characteristics may involve using a SELECT SQL query to retrieve transaction characteristics from a database. For example, the SQL query may take on the following form:

SELECT t.TransactionType
FROM TransactionCharacteristicsTable t
WHERE t.TransactionID='current_transaction_ID'

In another implementation, a table-tracking syntax configured string may be used to identify transaction characteristics. For example, a table-tracking syntax configured string may be used to streamline constructing the WHERE part of the SQL query by identifying a transaction.

In another embodiment, transaction characteristics may be embedded in XML data stored in an XML data file. In one implementation, an application program may parse the XML data file based on tags, to find predetermined tags containing transaction characteristics.

FTT selects rules applicable to the transaction at 2920. Selection of rules may be implemented in a variety of ways. In one implementation, selecting a rule may involve returning a Credit/Debit Class/Subclass indicated by the rule to be applicable to the transaction based on transaction characteristics. In another implementation, selecting a rule may involve returning a representation of the rule and using it during the assignment 2930. In one embodiment, rules assigning Credit and/or Debit Subclass may also depend on the Credit and/or Debit Class.

In one embodiment, rules may be stored in a database and accessed using a SQL query. In one implementation the SQL query may return multiple rules based on one or more transaction characteristics and may take on the following form:

```
SELECT r.Rule
FROM TransactionRulesTable r
WHERE
(r.TransactionCharacteristic1='current_transaction_characteristic1' AND
    r.TransactionCharacteristic2='current_transaction_characteristic2')
```

In another implementation, each SQL query may select a single rule, and multiple SQL queries may be run to select multiple rules. For example, four SQL queries may be run to select rules for each of the following: Credit Class, Credit Subclass, Debit Class, Debit Subclass.

In another implementation, a table-tracking syntax configured string may be used to select rules. For example, a table-tracking syntax configured string may be used to streamline constructing the WHERE part of the SQL query by identifying transaction characteristics.

In another embodiment, rules may be stored in one or more configuration files. In one implementation, a configuration file may have a row defining a Credit/Debit Class/Subclass for various unique combinations of transaction characteristics. For example, a configuration file may have the following format:

```
((Characteristic1_Value1 OR Characteristic1_Value2)
    AND Characteristic2_Value1) → CreditClass1
Characteristic1_Value3 AND Characteristic3_Value3 → CreditClass2
```

Applicable rules may be selected by iterating through the rows of the configuration file and matching transaction characteristics of the transaction to the data in the configuration file.

At 2930, Debit Class 2931 and/or Debit Subclass 2932, and/or Credit Class 2933 and/or Credit Subclass 2934 may be assigned to the transaction. In one embodiment, these assignments may be based on rules selected at 2920. For example, the selected rules may indicate that the transaction should be assigned to Debit Class: Asset, Debit Subclass: Receivables-Invoiced, Credit Class: Revenue, Credit Subclass: Fees. In one implementation, the assignment may be done using one or more SQL statements and may take on the following form:

```
UPDATE Transactions
SET DebitClass = 'Asset'
WHERE TransactionID = 'current_transaction_ID'
```

In another implementation, the assignment may be done using a table-tracking syntax configured string. For example, a table-tracking syntax configured string may be used to streamline constructing the WHERE part of the SQL query by identifying a transaction.

In another embodiment, such assignment may occur in combination with rule selection 2920. For example, a machine learning method, such as a neural network, clustering, and/or the like, may be used to select applicable rules. In one implementation, a neural network may be trained, such as by using the backpropagation technique, to assign Credit/Debit Class/Subclass based on transaction characteristics. The transaction characteristics of the current transaction may be given as inputs to the neural network. The neural network may select the applicable Credit and/or Debit Class and/or Subclass, and assign them to the transaction. For example, the assignment may be done by updating values in a file, or by executing a SQL statement and/or using a table-tracking syntax configured string, as shown above.

FTT may check whether all Classes/Subclasses have been assigned at 2940. If not, FTT may generate an error notification at 2945. In one embodiment, an error notification may be generated during processing 2920 and/or 2930 if an applicable rule cannot be found for all Classes/Subclasses and/or if all Classes/Subclasses are not assigned. In one implementation, the error notification may be generated by throwing a C++ exception, such as via the C++"try/catch" block and "throw" keyword. FTT may alert a user regarding the exception, such as via the user interface, and await user instructions. In another implementation, FTT may generate an error notification and continue execution without waiting for user instructions. For example, FTT may record an error notification, such as in a log file and/or by sending an email to a user, and continue processing other transactions.

FTT may check whether a transaction is an exception to the general Classes/Subclasses classification rules at 2950. If it is, the assigned Classes/Subclasses may be overridden at 2955. In one embodiment, an operator may check and override assigned Classes/Subclasses if the transaction has been classified incorrectly. In another embodiment, the assigned Classes/Subclasses may be checked against a file containing a list of transactions that are exceptions to the general rules and overridden with correct Classes/Subclasses.

Data may be saved at 2960. In one embodiment, data may be saved in a database using universal variables. In one implementation, data may be saved any time changes have been made. In another implementation, data may be saved when all changes to the data have been made.

Figure 30:
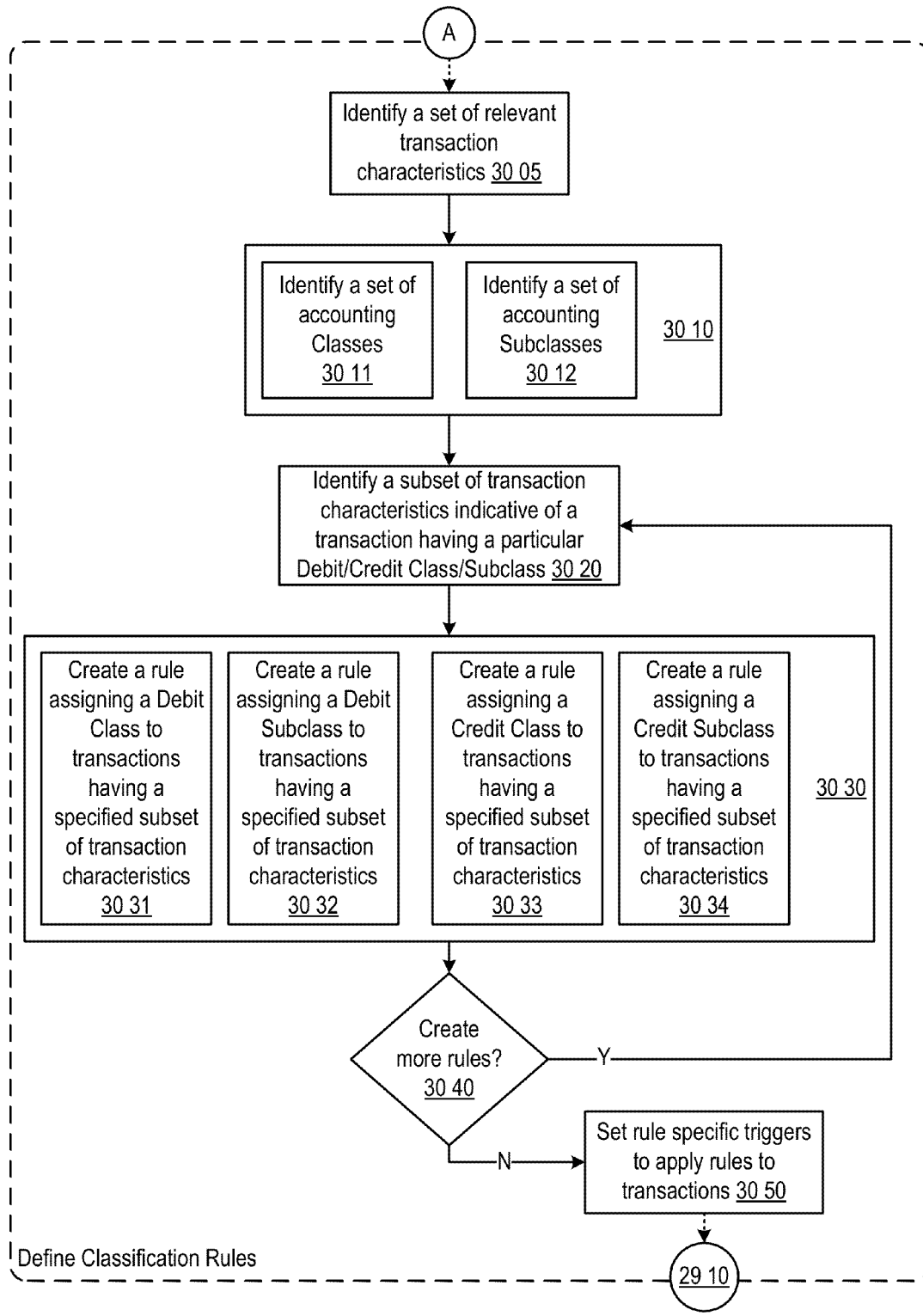
FIG. 30 is of a logic flow diagram illustrating defining classification rules in one embodiment of the FT.

FIG. 30 is of a logic flow diagram illustrating establishing classification rules in one embodiment of the FTT. In FIG. 30, a set of relevant transaction characteristics is identified at 3005. Examples of relevant transaction characteristics were discussed above (see FIG. 29). At 3010, accounting Classes 3011 and accounting Subclasses 3012 are identified. For example, accounting Classes may include Assets, Liabilities, Equity, Revenue, Expense, and/or the like. For example, Assets Subclasses may include Cash, Client Cash, Restricted Cash, Receivables—Invoiced, Receivables—Uninvoiced, Prepaid Compensation, Prepaid Payables, Prepaid Taxes, Network, Hardware, Software—Purchased, Software—Developed, Property, Depreciation, Goodwill, Investment, and/or the like. For example, Liabilities Subclasses may include Client Cash, Payables—Billed, Payables—Unbilled, Accrued Compensation, Accrued Taxes, Accrued Interest, Debt—Short Term, Debt—Current Portion, Debt—Long Term, Capital Leases, and/or the like. For example, Equity Subclasses may include Common Stock, Preferred Stock, Additional Paid-in Capital, Retained Earnings, and/or the like. For example, Revenue Subclasses may include Fees, Commissions, Non-Client, Write-offs, and/or the like. For example, Expense Subclasses may include Program, Center, Corporate, Interest, Taxes, Depreciation, Gain/Loss, and/or the like. In one implementation, an operator may enter accounting Classes/Subclasses into a database used by FTT, such as via a graphical user interface. In another implementation, accounting Classes/Subclasses may be entered into a database used by FTT by parsing a configuration file containing a list of Accounting Classes/Subclasses. For example, the configuration file may take on the following form:

```
Class: Assets
Subclass: Cash
Subclass: Depreciation
Class: Liabilities
Subclass: Payables
Subclass: Accrued Taxes
```

At 3020, a subset of transaction characteristics indicative of a transaction having a particular Debt/Credit Class/Subclass is identified. In one embodiment, an operator may identify such subset of transaction characteristics using accounting knowledge. In another embodiment, a neural network may be trained to identify such subsets by using the back-propagation technique.

Figure 33:
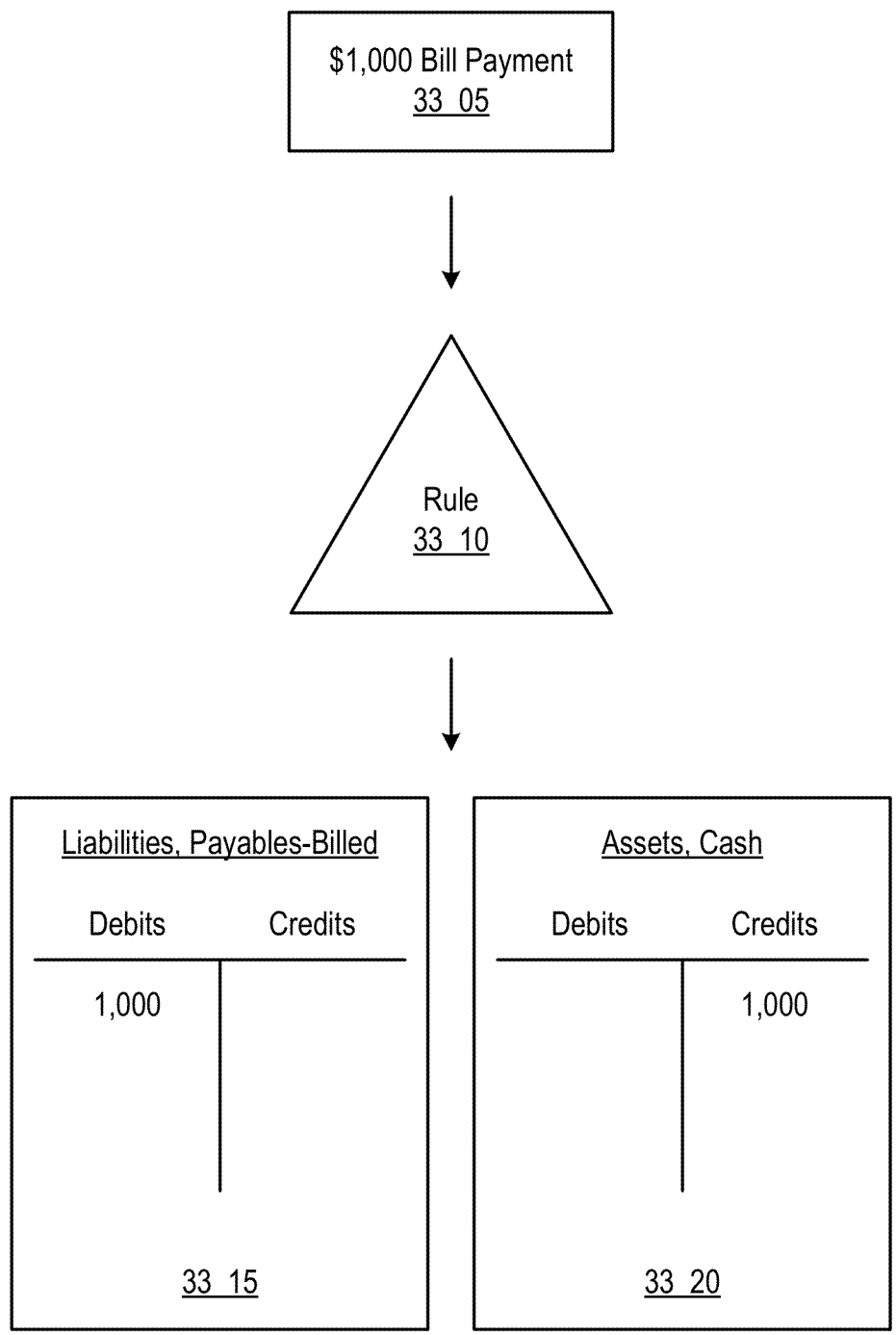
FIG. 33 is of a logic flow diagram illustrating application of a rule to a transaction in one embodiment of the FTT.

At 3030, one or more rules may be created assigning Debt Class 3031 and/or Debt Subclass 3032 and/or Credit Class 3033 and/or Credit Subclass 3034 to transactions having a specified subset of transaction characteristics. Rules may be thought of as conditional statements about what conditions should create what accounting entries. In one implementation, rules may be constructed based on universal variables. In one implementation, a table-tracking syntax configured string may be used to streamline construction of rules. In one embodiment, rules may be created by defining conditions associated with a transaction. For example, as illustrated in FIG. 33, a rule may indicate that a transaction that involves paying a bill should be assigned Debit Class: Liabilities, Debit Subclass: Payables-Billed, Credit Class: Assets, Credit Subclass: Cash, and may take on the following form:

TransactionType: BillPayment→(DebitClass: Liabilities AND DebitSubclass:
Payables-Billed AND CreditClass: Assets AND Credit-Subclass: Cash)

Figure 34A:
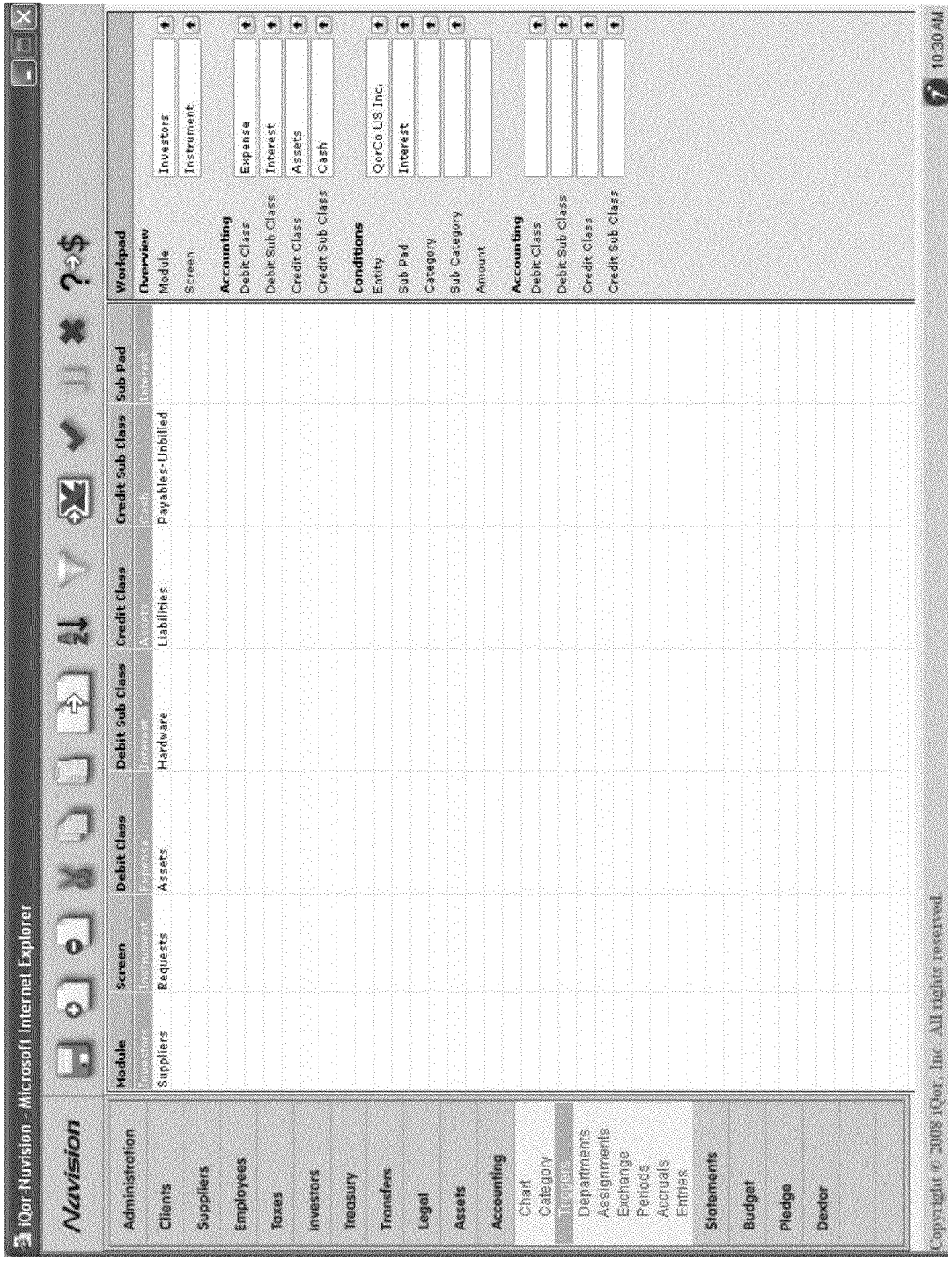
FIGS. 34A-B show implementations of a user interface for creating rules associated with a module and the resulting user interface of the module in one embodiment of FTT operation.
Figure 34B:
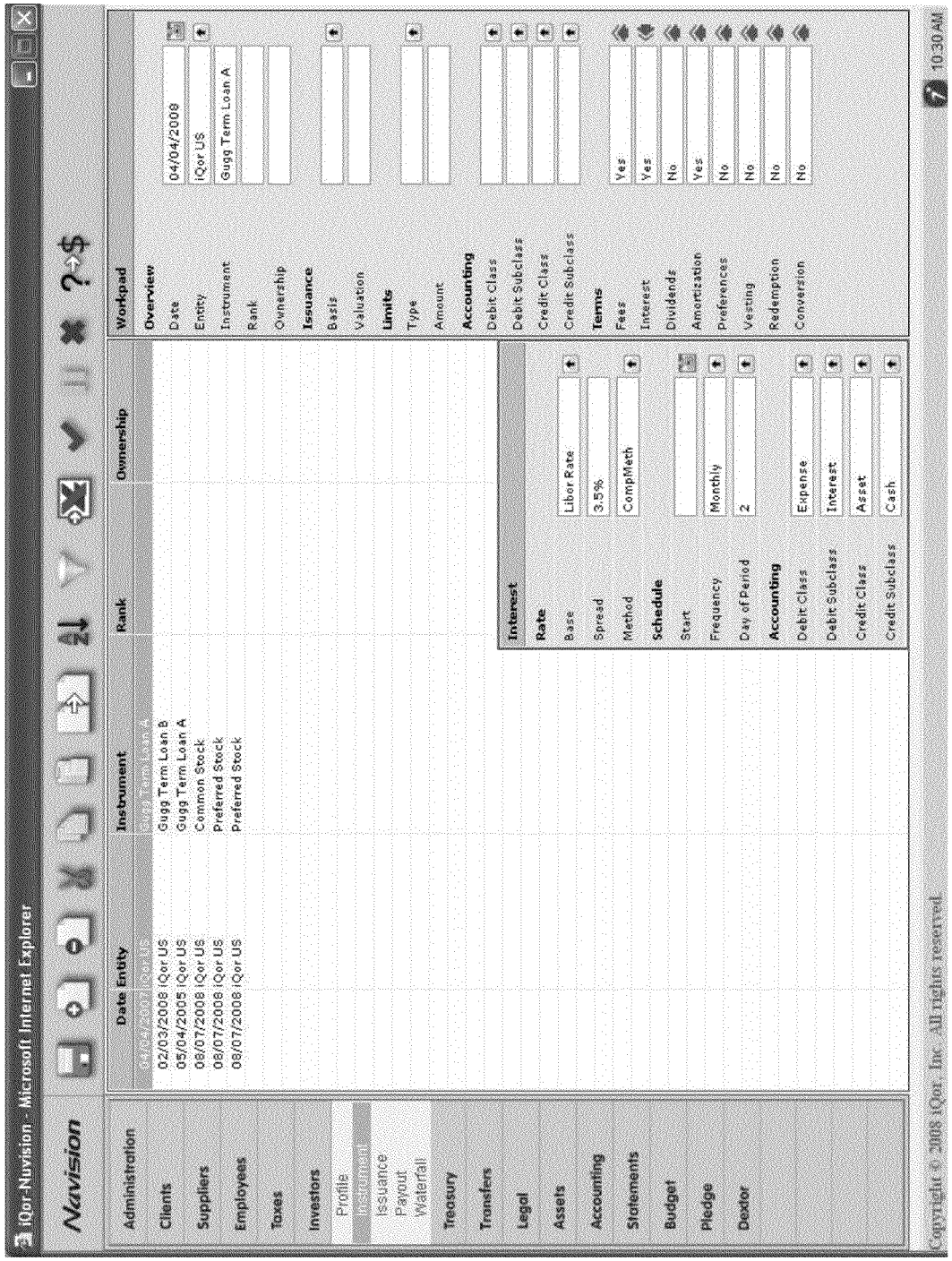

Upon occurrence of a transaction 3305 that involves paying a $1,000 bill and which has BillPayment as TransactionType, the above rule 3310 may be used to make double entry accounting entries debiting 3315 Liabilities, Payables-Billed and crediting 3320 Assets, Cash. In another embodiment, rules may be created by defining conditions associated with module, screen, and/or the like of the FTT. For example, a rule may indicate that all transactions entered through Module: Investors, Screen: Instrument, Sub Pad: Interest having a specified Entity value should be assigned Debit Class: Expense, Debit Subclass: Interest, Credit Class: Assets, Credit Subclass: Cash. As illustrated in FIG. 34A, an operator may specify such a rule using a GUI. FIG. 34B illustrates the effect of the rule on Module: Investors, Screen: Instrument, Sub Pad: Interest which defaults to Debit Class: Expense, Debit Subclass: Interest, Credit Class: Assets, Credit Subclass: Cash. In yet another embodiment, rules may be created by having a trained neural network that automatically classifies transactions based on transaction characteristics.

In one embodiment, one subset of transaction characteristics may be used to create rules for all of the following: Credit Class, Credit Subclass, Debit Class, Debit Subclass. In another embodiment, a subset of transaction characteristics may be used to create rules for only some of Debit/Credit Class/Subclass. For example, one subset of transaction characteristics may be used to create rules for Debit Class, Credit Class, and Credit Subclass, and a second subset of transaction characteristics may be used to create a rule for Debit Subclass. In one embodiment, rules may be created based on transaction characteristics input using descriptive business grammar. In another embodiment, the rules may comprise a table-tracking syntax configured string.

If more rules should be created 3040, FTT may proceed to 3020 to identify another subset of transaction characteristics and to 3030 to create more rules. Otherwise, one or more rule specific triggers may be set to apply created rules to transactions 3050. In one embodiment, a trigger may take the form of executable instructions that apply rules to transactions. For example, the created rules may be placed in a location, such as a database or a configuration file, accessed by C++ program code to retrieve applicable rules. In another embodiment, a trigger may be set by changing a configuration file specifying which rules to apply on a specific module, screen, and/or the like of the FTT. In one embodiment, a trigger may be set to apply created rules to existing transactions.

Figure 31:
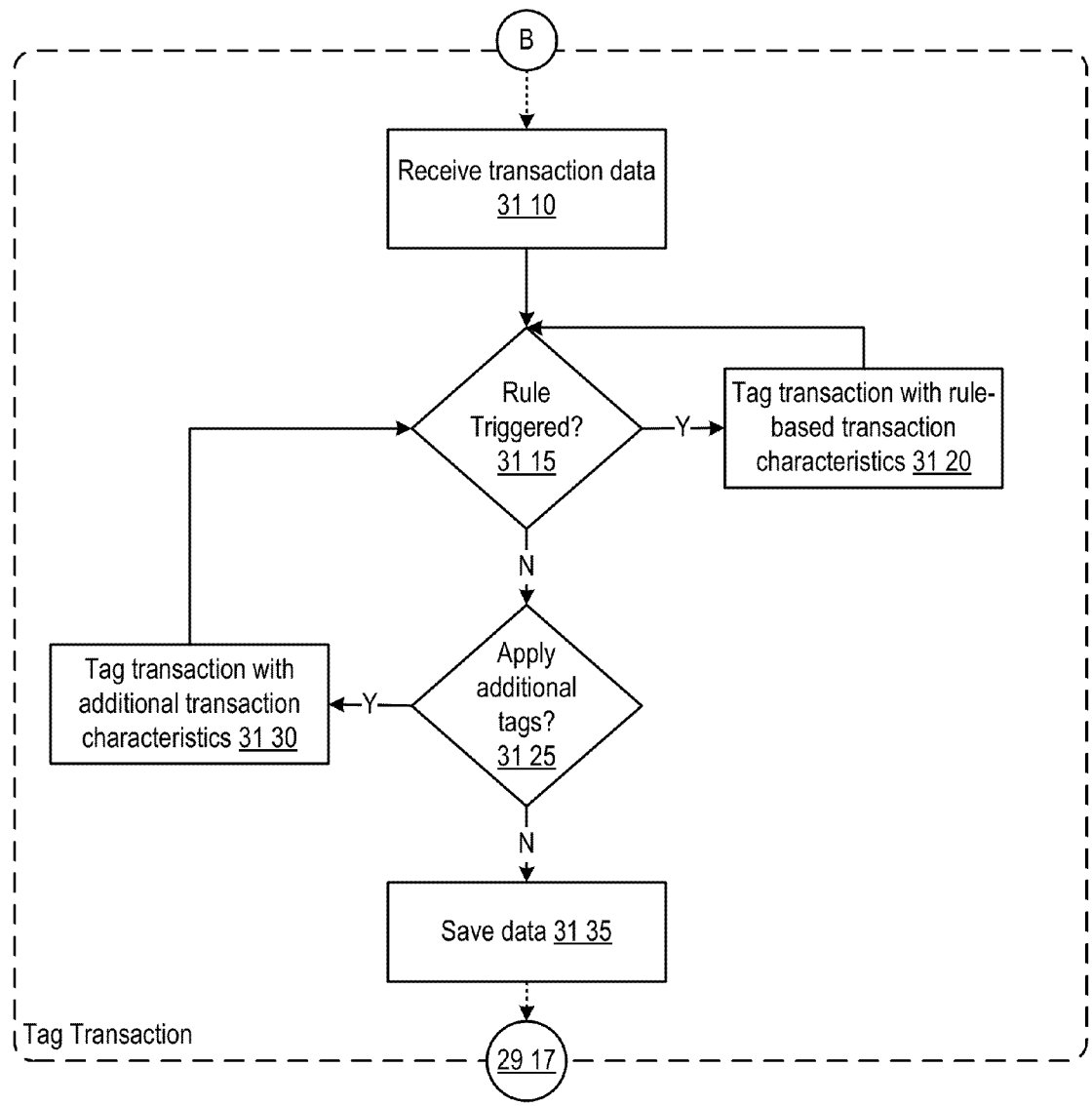
FIG. 31 is of a logic flow diagram illustrating tagging transactions with rule-based and other additional transaction characteristics in one embodiment of the FTT.

FIG. 31 is of a logic flow diagram illustrating tagging transactions with rule-based and other additional transaction characteristics in one embodiment of the FTT. In FIG. 31, transaction data is received at 3110, such as along with an indication of a transaction. In one embodiment, a unique identifier identifying the transaction and linking to data describing the transaction may be received. In another embodiment, data describing the transaction may be received. In one implementation, data may be received using universal variables. For example, received transaction data may be stored in a database table:

INSERT INTO transaction_table_1
VALUES ('UserID', 'ExpenseAmount')
/* SQL Code that inserts transaction data into the table (e.g. UserID of an employee who incurred an expense, ExpenseAmount, etc.) */

At 3115, a determination may be made whether any contextual rule for applying rule-based transaction characteristics is triggered by the transaction. In one embodiment, a contextual rule may be implemented as a database trigger that executes when a transaction is added to a database table storing transaction data. In one implementation, the trigger may take on the following form:

CREATE TRIGGER trigger_1
AFTER INSERT ON transaction_table_1
/* SQL Code that causes rule-based transaction characteristics to be applied to a record containing or linked to the transaction (e.g. DepartmentCodeID of a department associated with the user's UserID is assigned to the transaction) */

In another embodiment, a contextual rule may be implemented as a Perl program that executes upon receipt of an XML feed containing data including transaction characteristics.

If a contextual rule is triggered, transactions may be tagged with rule-based transaction characteristics at 3120. In one embodiment, such tagging may be based on transaction characteristics specified in transaction data. In one implementation, specified transaction characteristics may be used as part of the SQL code, in a database trigger, that causes rule-based transaction characteristics to be applied to a database record containing and/or linked to the transaction. In another implementation, specified transaction characteristics may be used as inputs to a Perl program trigger that causes rule-based transaction characteristics to be applied to an XML record containing or linked to the transaction.

For example, a transaction indicating an expense incurred by an employee is received. Transaction data may be analyzed, parsed, data mined, and/or the like to retrieve specified transaction characteristics, such as the user ID of the employee. For example, universal variables may be used to retrieve specified transaction characteristics. In one implementation, the user ID may be specified as the UserID field of the tblEmployee database table. The transaction may be tagged with a rule-based transaction characteristic, such as the department code. In one implementation, the transaction may be tagged with the department code by using a SQL SELECT statement to retrieve DepartmentCodeID associated with the user's UserID and assigning the DepartmentCodeID to the transaction.

In one embodiment, tagging a transaction with a rule-based transaction characteristic may trigger another contextual rule and result in other rule-based transaction characteristics being applied to the transaction. For example, assigning a DepartmentCodeID to the transaction may trigger another contextual rule that may tag the transaction with another transaction characteristic, such as location. In one implementation, the transaction may be tagged with location by using a SQL SELECT statement to retrieve the LocationID associated with the department's DepartmentCodeID in the tblDepartmentCode database table and assigning the LocationID to the transaction.

At 3125, a determination may be made whether the transaction should be tagged with additional transaction characteristics. In one embodiment, FTT may prompt an operator whether the operator wishes to apply additional transaction characteristics. If so, the transaction may be tagged with additional transaction characteristics at 3130. In one embodiment, the operator may enter additional transaction characteristics through the FTT user interface. For example, the operator may tag a transaction with the PayeeID of the payee associated with the transaction. In another embodiment, the operator may use one or more SQL queries to apply additional transaction characteristics. In one implementation, a table-tracking syntax configured string and/or descriptive business grammar may be used by the operator to streamline applying additional transaction characteristics. In one embodiment, additional transaction characteristics entered by the operator may trigger another contextual rule and result in other rule-based transaction characteristics being applied to the transaction.

Data may be saved at 3135. In one embodiment, data may be saved in a database using universal variables. In one implementation, data may be saved any time a transaction is tagged with a transaction characteristic. In another implementation, data may be saved when a transaction is tagged with all transaction characteristics.

Figure 32:
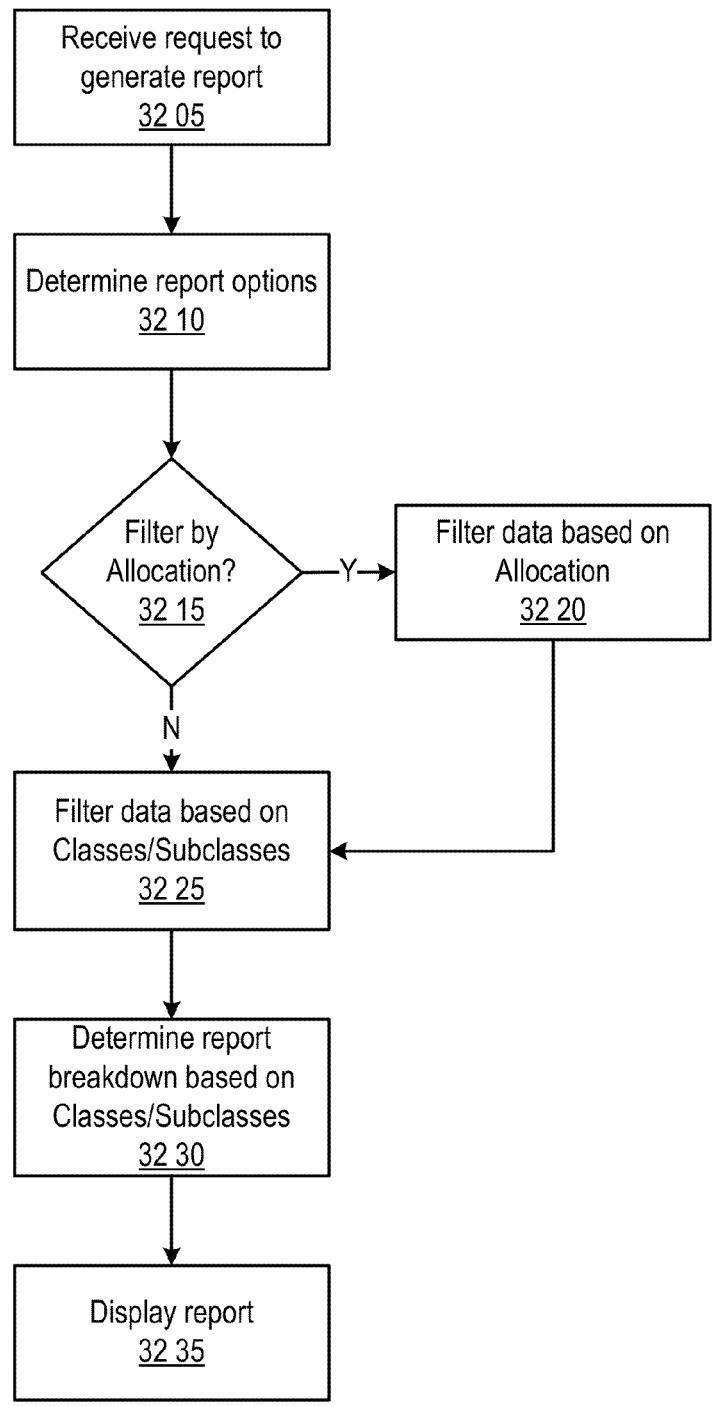
FIG. 32 is of a logic flow diagram illustrating generating a report in one embodiment of the FTT.

FIG. 32 is of a logic flow diagram illustrating generating a report in one embodiment of the FTT. In FIG. 32, a request to generate a report may be received at 3205. In one embodiment, an accounting statement such as a Balance Sheet, an Income Statement, a Cash Flow Statement, and/or the like may be requested. In another embodiment, a custom made report based on accounting Classes/Subclasses, such as Balances for each included Class/Subclass, may be requested. The use of accounting Classes/Subclasses to classify transactions orthogonally with respect to allocating transactions to business Categories/Subcategories and/or groupings simplifies generating such reports for an Entity or for a business unit of an Entity. In one embodiment, this simplification is attained by reducing the complexity of logical statements used to obtain data regarding transactions having specified accounting Classes/Subclasses, and/or regarding allocation of transactions having specified accounting Classes/Subclasses to business units. In another embodiment, this simplification is attained by reducing the complexity of logical statements used to perform calculations used in the generation of reports. In one implementation, a table-tracking syntax configured string and/or descriptive business grammar and/or universal variables may be used to streamline generation of reports. For example, a table-tracking syntax configured string, such as OPS.AST, may be used to request a report of all Assets associated with Operations department. Orthogonality of Business Categories (e.g. DepratmentID OPS of Operations) and Accounting Classes (e.g. AccountingClassID AST of Assets) allows the table-tracking syntax configured string in this example to be uncomplicated.

In one embodiment, a request to generate a report may take on the form of a user opening a report page in FTT using the user interface. For example, a user may click on a user interface element identifying a report, such as a Balance Sheet link. In another embodiment, a job scheduler, such as the Cron application on UNIX, may be used to schedule automatic report generation by programmatically passing parameters to another component (e.g., piping to another process, instantiating another component program, calling a C(++) function, and/or the like).

In one embodiment, a report may be thought of as a plurality of rules that define which data to display and/or how to display it based on accounting Classes/Subclasses. In one implementation, a report may comprise a configuration file that lists Classes/Subclasses that should be displayed and/or provides report configuration details. For example, a configuration file may take on the following form:

BEGIN ASSETS
BEGIN Current Assets
Assets: Cash
Assets: Receivables — Invoiced
Assets: Receivables — Uninvoiced
END Current Assets
BEGIN Fixed Assets
Assets: Hardware
Assets: Network
END Fixed Assets
END ASSETS In this example, the configuration file specifies that various Assets Subclasses should be displayed. These Subclasses are organized under ASSETS heading with Current Assets and Fixed Assets subheadings. The Assets Subclasses to be listed under each subheading are specified in the "Class: Subclass" format inside the BEGIN/END block of the subheading. The configuration file may be parsed programmatically, such as by using the Perl m// operator, to determine how the report should be constructed. In another implementation, one or more tables in a SQL database may be used to store report configuration details.

At 3210, report options may be determined. In one embodiment, report options may include default values to be used in creating a report. In another embodiment, report options may include user defined values. In one implementation, report options may include visual and/or data configuration settings. For example, visual configuration settings may include font information, color information, screen resolution, and/or the like. For example, data configuration settings may include Time Period (Year, Quarter, Month, Custom Range, and/or the like), Entity, expand/collapse settings, and/or the like. In one example, template CSS/HTML forms may be used for report output as fed via the SQL database based on configuration settings specified by default or defined by a user.

At 3215 a determination may be made whether report data should be filtered by allocation. In one embodiment, allocation may describe how transactions should be allocated among various business Categories and/or Subcategories. In another embodiment, allocation may describe how transactions should be allocated based on Location, Program, Department, and/or the like grouping. Filtering by allocation allows a report to contain data relevant to the specified business Category/Subcategory and/or grouping. In one embodiment, business Category/Subcategory and/or grouping is orthogonal to accounting Classes/Subclasses.

If filtering of data based on allocation is desired, such filtering occurs at 3220. In one embodiment, business Categories/Subcategories may be specified as business Function/Subfunction. For example, business Functions may include Operations, Legal, Sales, Talent, Technology, Finance, Marketing, and/or the like. For example, business Subfunctions may include First Party, Third Party, Compliance, Processing, Compensation, Career, Benefits, Development, Maintenance, Network, Financial Planning and Analysis, Treasury, Accounting, Purchasing, and/or the like. In another embodiment, business Categories/Subcategories may be specified as Vertical/Subvertical business units. For example, Vertical business units may include Financial Services, Communications, Healthcare, Utilities, Commercial, and/or the like. For example, Subvertical business units may include Credit Card, Auto Loan, Student Loan, Demand Deposit, Phone, Television, Hospitals, Gas, Electric, Transportation, Waste, Insurance, and/or the like. In one implementation, an operator may enter business Categories/Subcategories into a database used by FTT, such as via a graphical user interface. In another implementation, business Categories/Subcategories may be entered into a database used by FTT by parsing a configuration file containing a list of business Categories/Subcategories. For example, the configuration file may take on the following form:

Class: Legal
Class: Talent
Class: Technology
Subclass: Legal: Compliance
Subclass: Talent: Benefits
Subclass: Technology: Development In one embodiment, filtering report data by allocation may involve specifying one or more of the business Categories/Subcategories, stored in a database used by FTT, as parameters to the report. In another embodiment, filtering report data by allocation may involve specifying one or more of Location, Program, Department, and/or the like as parameters to the report. In one implementation, filtering report data by allocation may involve comparing specified business Category/Subcategory and/or grouping to that associated with transaction data accessible to FTT. For example, such comparison may be done using a SQL SELECT query having the following format:

SELECT *
FROM TransactionsTable
WHERE Function="Legal" AND Subfunction="Compliance"

In one implementation, a table-tracking syntax configured string may be used to streamline the creation of the SQL query.

At 3225, report data may be filtered based on accounting Classes/Subclasses. Such filtering may be done in a manner similar to filtering by allocation, but using accounting Classes/Subclasses instead of business Categories/Subcategories. For example, such comparison may be done using a SQL SELECT query having the following format:

SELECT *
FROM TransactionsTable
WHERE (Class="Assets" AND
(Subclass="Cash" OR Subclass="Receivables — Invoiced"))

It is to be understood that filtering report data by allocation may be done either before, after or concurrently with filtering report data based on accounting Classes/Subclasses in 3225 depending on implementation.

At 3230, report breakdown may be determined based on accounting Classes/Subclasses. In one embodiment, report configuration details may be used to help determine report breakdown. For example, a Balance Sheet report may comprise a list of Assets, Liabilities and Equity accounting Classes broken down by accounting types and/or accounting Subclasses. In one implementation, report configuration details may specify that these three accounting Classes should be displayed. Report configuration details may also specify the order in which these Classes should be displayed. In one implementation, all Subclasses having a specified Class may be displayed as part of the Class. For example, all Assets Subclasses may be listed under Assets Class. In another implementation, report configuration details may specify that a subset of Subclasses should be used as part of a Class. For example, report configuration details may specify that only Cash and Receivables—Invoiced Subclasses should be used as part of the Assets Class. The report may also be configured to perform calculations, such as calculating total Assets, based on all or a subset of Subclasses.

In one embodiment, Subclasses may be further organized by accounting types. For example, Assets subclasses may be organized under Current Assets, Fixed Assets, Intangibles, and Other Assets accounting types. In one implementation, information regarding which accounting type a Subclass belongs to may be stored in a SQL database table associated with the Subclass. In another implementation, this information may be available as part of report configuration details.

In one embodiment, calculations based on accounting Classes/Subclasses may be performed. For example, such calculations may involve calculating totals by Class/Subclass over a time period, calculating totals based on accounting type and or accounting Class/Subclass, calculating accounting metrics such as EBITDA and Net Income, and/or the like. In one implementation, such calculations may be performed using a C++ program configured to perform calculations using data retrieved from a SQL database.

At 3235, the report is displayed to the user. In various embodiments, displaying the report to the user may involve one or more of displaying the report on a computer monitor and/or projector, saving the report to a file on a hard drive or to a database, printing the report on a printer, and/or the like. In one implementation, the report may be displayed in accordance with determined report options.

FTT Controller

Figure 35:
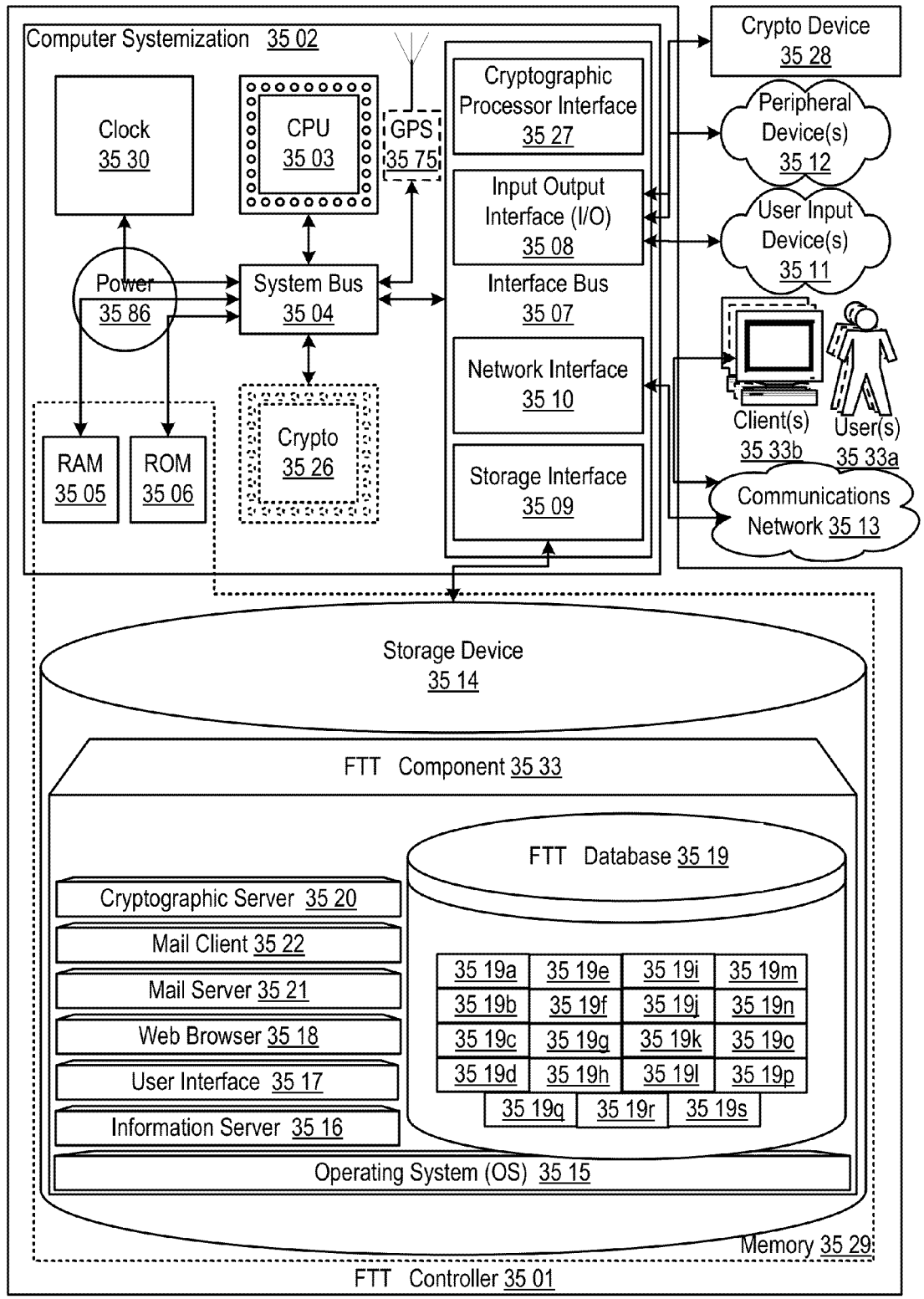
FIG. 35 is of a block diagram illustrating embodiments of the FTT controller.

FIG. 35 illustrates inventive aspects of a FTT controller 3501 in a block diagram. In this embodiment, the FTT controller 3501 may serve to aggregate, process, store, search, serve, identify, instruct, generate, match, and/or facilitate interactions with a computer through enterprise and human resource management technologies, and/or other related data.

Typically, users, which may be people and/or other systems, may engage information technology systems (e.g., computers) to facilitate information processing. In turn, computers employ processors to process information; such processors 3503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 3529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the FTT controller 3501 may be connected to and/or communicate with entities such as, but not limited to: one or more users from user input devices 3511; peripheral devices 3512; an optional cryptographic processor device 3528; and/or a communications network 3513.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The FTT controller 3501 may be based on computer systems that may comprise, but are not limited to, components such as: a computer systemization 3502 connected to memory 3529.

Computer Systemization

A computer systemization 3502 may comprise a clock 3530, central processing unit ("CPU(s)" and/or "processor(s)" (these terms are used interchangeable throughout the disclosure unless noted to the contrary)) 3503, a memory 3529 (e.g., a read only memory (ROM) 3506, a random access memory (RAM) 3505, etc.), and/or an interface bus 3507, and most frequently, although not necessarily, are all interconnected and/or communicating through a system bus 3504 on one or more (mother)board(s) 3502 having conductive and/or otherwise transportive circuit pathways through which instructions (e.g., binary encoded signals) may travel to effect communications, operations, storage, etc. Optionally, the computer systemization may be connected to an internal power source 3586. Optionally, a cryptographic processor 3526 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the FTT controller and beyond through various interfaces. Should processing requirements dictate a greater amount speed and/or capacity, distributed processors (e.g., Distributed FTT), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the FTT may be achieved by implementing a microcontroller such as CAST's R8051XC2 microcontroller; Intel's MCS 51 (i.e., 8051 microcontroller); and/or the like. Also, to implement certain features of the FTT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the FTT component collection (distributed or otherwise) and/or features may be implemented via the microprocessor and/or via embedded components; e.g., via ASIC, coprocessor, DSP, FPGA, and/or the like. Alternately, some implementations of the FTT may be implemented with embedded components that are configured and used to achieve a variety of features or signal processing.

Depending on the particular implementation, the embedded components may include software solutions, hardware solutions, and/or some combination of both hardware/software solutions. For example, FTT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the FTT features. A hierarchy of programmable interconnects allow logic blocks to be interconnected as needed by the FTT system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the FTT may be developed on regular FPGAs and then migrated into a fixed version that more resembles ASIC implementations. Alternate or coordinating implementations may migrate FTT controller features to a final ASIC instead of or in addition to FPGAs. Depending on the implementation all of the aforementioned embedded components and microprocessors may be considered the "CPU" and/or "processor" for the FTT.

Power Source

The power source 3586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 3586 is connected to at least one of the interconnected subsequent components of the FTT thereby providing an electric current to all subsequent components. In one example, the power source 3586 is connected to the system bus component 3504. In an alternative embodiment, an outside power source 3586 is provided through a connection across the I/O 3508 interface. For example, a USB and/or IEEE 1394 connection carries both data and power across the connection and is therefore a suitable source of power.

Interface Adapters

Interface bus(ses) 3507 may accept, connect, and/or communicate to a number of interface adapters, conventionally although not necessarily in the form of adapter cards, such as but not limited to: input output interfaces (I/O) 3508, storage interfaces 3509, network interfaces 3510, and/or the like. Optionally, cryptographic processor interfaces 3527 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 3509 may accept, communicate, and/or connect to a number of storage devices such as, but not limited to: storage devices 3514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 3510 may accept, communicate, and/or connect to a communications network 3513. Through a communications network 3513, the FT controller is accessible through remote clients 3533*b* (e.g., computers with web browsers) by users 3533*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed FTT), architectures may similarly be employed to pool, load balance, and/or otherwise increase the communicative bandwidth required by the FTT controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 3510 may be used to engage with various communications network types 3513. For example, multiple network interfaces may be employed to allow for the communication over broadcast, multicast, and/or unicast networks.

Input Output interfaces (I/O) 3508 may accept, communicate, and/or connect to user input devices 3511, peripheral devices 3512, cryptographic processor devices 3528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, Bluetooth, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 3511 may be card readers, dongles, finger print readers, gloves, graphics tablets, joysticks, keyboards, mouse (mice), remote controls, retina readers, trackballs, trackpads, and/or the like.

Peripheral devices 3512 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the FTT controller may be embodied as an embedded, dedicated, and/or monitor-less (i.e., headless) device, wherein access would be provided over a network interface connection.

Cryptographic units such as, but not limited to, microcontrollers, processors 3526, interfaces 3527, and/or devices 3528 may be attached, and/or communicate with the FTT controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 3529. However, memory is a fungible technology and resource, thus, any number of memory embodiments may be employed in lieu of or in concert with one another. It is to be understood that the FTT controller and/or a computer systemization may employ various forms of memory 3529. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 3529 will include ROM 3506, RAM 3505, and a storage device 3514. A storage device 3514 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 3529 may contain a collection of program and/or database components and/or data such as, but not limited to: operating system component(s) 3515 (operating system); information server component(s) 3516 (information server); user interface component(s) 3517 (user interface); Web browser component(s) 3518 (Web browser); database(s) 3519; mail server component(s) 3521; mail client component(s) 3522; cryptographic server component(s) 3520 (cryptographic server); the FTT component(s) 3535; and/or the like (i.e., collectively a component collection). These components may be stored and accessed from the storage devices and/or from storage devices accessible through an interface bus. Although non-conventional program components such as those in the component collection, typically, are stored in a local storage device 3514, they may also be loaded and/or stored in memory such as: peripheral devices, RAM, remote storage facilities through a communications network, ROM, various forms of memory, and/or the like.

Operating System

The operating system component 3515 is an executable program component facilitating the operation of the FTT controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the FTT controller to communicate with other entities through a communications network 3513. Various communication protocols may be used by the FTT controller as a subcarrier transport mechanism for interaction, such as, but not limited to: multicast, TCP/IP, UDP, unicast, and/or the like.

Information Server

An information server component 3516 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective–) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the FTT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the FTT database 3519, operating systems, other program components, user interfaces, Web browsers, and/or the like.

Access to the FTT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the FTT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the FTT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces in some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 3517 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 3518 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the FTT enabled nodes. The combined application may be nugatory on systems employing standard Web browsers.

Mail Server

A mail server component 3521 is a stored program component that is executed by a CPU 3503. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the FTT.

Access to the FTT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 3522 is a stored program component that is executed by a CPU 3503. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 3520 is a stored program component that is executed by a CPU 3503, cryptographic processor 3526, cryptographic processor interface 3527, cryptographic processor device 3528, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the FTT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/ or facilities of the like. The cryptographic component supports encryption schemes allowing for the secure transmission of information across a communications network to enable the FTT component to engage in secure transactions if so desired. The cryptographic component facilitates the secure accessing of resources on the FTT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The FTT Database

The FTT database component 3519 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the FTT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the FTT database is implemented as a data-structure, the use of the FTT database 3519 may be integrated into another component such as the FTT component 3535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 3519 includes several tables 3519*a-s*. A ClientProgram table 3519*a* may include fields such as, but not limited to: ProgramID, ProgramCode, ProgramName, Description, EndDate, CreatedBy, CreatedDate, UpdatedBy, UpdatedDate, Timestamp (TS), AutoDeductFlag, SalesID foreign key (FK), ClientID (FK), CountryID (FK), BusinessTypeID (FK), VerticalID (FK), ProgramTypeID (FK), EntityID (FK), InvoiceGroupID (FK), and/or the like. A Sales table 3519*b* may include fields such as, but not limited to: SalesID, SalesName, SalesCode, StartDate, EndDate, CreatedBy, CreatedDate, UpdatedBy, UpdatedDate, TS, and/or the like. A ProgramType table 3519*c* may include fields such as, but not limited to: ProgramTypeID, ProgramTypeName, StartDate, EndDate, CreatedBy, CreatedDate, UpdatedBy, UpdatedDate, TS, and/or the like. A BusinessType table 3519*d* may include fields such as, but not limited to: BusinessTypeID, BusinessTypeCode, BusinessTypeName, StartDate, EndDate, CreatedBy, CreatedDate, UpdatedBy, UpdatedDate, TS, and/or the like. A ClientProgramHistory table 3519*e* may include fields such as, but not limited to: ProgramHistoryID, OldProgramCode, ChangeDate, EndDate, CreatedBy, CreatedDate, UpdatedBy, UpdatedDate, TS, ProgramID (FK), and/or the like. A Country table 3519*f* may include fields such as, but not limited to: CountryID, CountryName, CountryCode, StartDate, EndDate, CreatedBy, CreatedDate, UpdatedBy, UpdatedDate, TS, and/or the like. A LegalEntity table 3519*g* may include fields such as, but not limited to: EntityID, EntityName, EntityCode, TaxID, ChairmanName, SecretaryName, DirectorName, StartDate, EndDate, CreatedBy, CreatedDate, UpdatedBy, UpdatedDate, TS, CurrencyID (FK), CountryID (FK), and/or the like. A Client table 3519*h* may include fields such as, but not limited to: ClientID, ClientName, StartDate, EndDate, CreatedBy, CreatedDate, UpdatedBy, UpdatedDate, TS, CountryID (FK), VerticalID (FK) and/or the like. A Vertical table 3519*i* may include fields such as, but not limited to: VerticalID, VerticalName, VerticalCode, StartDate, EndDate, CreatedBy, CreatedDate, UpdatedBy, UpdatedDate, TS, and/or the like. A DepartmentCode table 3519*j* may include fields such as, but not limited to: DepartmentCodeID, DepartmentCode, DepartmentFullName, TreeLevel, StartDate, EndDate, CreatedBy, CreatedDate, UpdatedBy, UpdatedDate, TS, DepartmentID (FK), EntityID (FK), LocationID (FK), ClassID (FK), SubClassID (FK), and/or the like. A Department table 3519*k* may include fields such as, but not limited to: DepartmentID, Name, Code, Type, CreatedBy, CreatedDate, TS, and/or the like. A DepartmentHistory table 3519*l* may include fields such as, but not limited to: DepartmentHistoryID, DepartmentFullName, DepartmentCode, DepartmentID, ParentDepartmentID, ChangedDepartmentID, ChangedDate, StartDate, EndDate, CreatedBy, CreatedDate, UpdatedBy, UpdatedDate, TS, and/or the like. A Location table 3519*m* may include fields such as, but not limited to: LocationID, LocationName, LocationCode, StartDate, EndDate, CreatedBy, CreatedDate, UpdatedBy, UpdatedDate, TS, CountryID (FK), and/or the like. A Class table 3519*n* may include fields such as, but not limited to: ClassID, ClassName, ClassCode, StartDate, EndDate, CreatedBy, CreatedDate, UpdatedBy, UpdatedDate, TS, and/or the like. A SubClass table 3519*o* may include fields such as, but not limited to: SubClassID, SubClassName, SubClassCode, StartDate, EndDate, CreatedBy, CreatedDate, UpdatedBy, UpdatedDate, TS, ClassID (FK), SubClassTypeID (FK), and/or the like. An Assignment table 3519*p* may include fields such as, but not limited to: AssignmentID, StartDate, EndDate, CreatedBy, CreatedDate, UpdatedBy, UpdatedDate, TS, ProgramID (FK), DepartmentCodeID (FK), and/or the like. An Employee table 3519*q* may include fields such as, but not limited to: UserID, GUID, UserName, Email, SubTitleID, SubFunctionID, ISOwner, StartDate, EndDate, CreatedBy, CreatedDate, UpdatedBy, UpdatedDate, TS, TitleID (FK), FunctionID (FK), DepartmentCodeID, and/or the like. A Universal Data Library table 3519*r* may include fields such as, but not limited to: variable_ID, family, subfamily, field_name, display name, type, category, used_by, associated_database(s), associated_table(s), associated_field(s), reformatting_instruction(s), value_combination_instruction(s), and/or the like. A Data Transaction table 3519*s* may include fields such as, but not limited to: transaction_ID, variable_ID(s), schedule and/or trigger condition(s), data_repository_ID, data_repository_address, report type, data_layout and/or data_configuration, file_type, file_name, file_password, program_code, department_code, limiter, chooser, and/or the like. One or more of the tables discussed above may support and/or track multiple entity accounts on a FTT.

In one embodiment, the FTT database may interact with other database systems. For example, employing a distributed database system, queries and data access by search FTT component may treat the combination of the FTT database, an integrated data security layer database as a single database entity.

In one embodiment, user programs may contain various user interface primitives, which may serve to update the FTT. Also, various accounts may require custom database tables depending upon the environments and the types of clients the FTT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 3519*a-s*. The FTT may be configured to keep track of various settings, inputs, and parameters via database controllers.

The FTT database may communicate to and/or with other components in a component collection, including itself, and/or facilities of the like. Most frequently, the FTT database communicates with the FTT component, other program components, and/or the like. The database may contain, retain, and provide information regarding other nodes and data.

The FTTs

The FTT component 3535 is a stored program component that is executed by a CPU. In one embodiment, the FTT component incorporates any and/or all combinations of the aspects of the FTT that was discussed in the previous figures. As such, the FTT affects accessing, obtaining and the provision of information, services, transactions, and/or the like across various communications networks.

The FTT component enables the management of enterprise and human resources, the provision of tailored and/or personalized computing experiences, massively scalable monitoring and regulation of personnel, efficient collection, organization, distribution, and presentation of enterprise data, and/or the like and use of the FTT.

The FTT component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the FTT server employs a cryptographic server to encrypt and decrypt communications. The FTT component may communicate to and/or with other components in a component collection, including itself, and/or facilities of the like. Most frequently, the FTT component communicates with the FTT database, operating systems, other program components, and/or the like. The FTT may contain, communicate, generate, obtain, and/or provide program component, system, user, and/or data communications, requests, and/or responses.

Distributed FTTs

The structure and/or operation of any of the FTT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the FTT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), local and remote application program interfaces Jini, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using standard development tools such as lex, yacc, XML, and/or the like, which allow for grammar generation and parsing functionality, which in turn may form the basis of communication messages within and between components. For example, a grammar may be arranged to recognize the tokens of an HTTP post command, e.g.:

w3 c-post http://... Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or other wise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., the SOAP parser) that may be employed to parse communications data. Further, the parsing grammar may be used beyond message parsing, but may also be used to parse: databases, data collections, data stores, structured data, and/or the like. Again, the desired configuration will depend upon the context, environment, and requirements of system deployment.

In order to address various issues and improve over the prior art, the invention is directed to apparatuses, methods and systems for an automated data extractor. The entirety of this application (including the Cover Page, Title, Headings, Field, Background, Summary, Brief Description of the Drawings, Detailed Description, Claims, Abstract, Figures, and otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a FTT individual and/or enterprise user, database configuration and/or relational model, data type, data transmission and/or network framework, syntax structure, and/or the like, various embodiments of the FTT, may be implemented that enable a great deal of flexibility and customization. The instant disclosure discusses embodiments of the FTT directed to manipulation and storage of business data and enterprise-scale operations. However, it is to be understood that the systems described herein may be readily configured and/or customized for a wide variety of other applications and/or implementations. For example, aspects of the FTT may be adapted for non-enterprise and/or personal data management, efficient data access by mobile devices, and/or the like applications. It is to be understood that the FTT may be further adapted to other implementations or data management applications.

What is claimed is:

1. A processor-implemented method comprising:
  receiving transaction data associated with an enterprise-based transaction and including at least a transaction identifier;
  analyzing via a computer processor the received transaction data;
  determining via the processor that a contextual rule of a plurality of contextual rules for different transactions is triggered based on the analysis of the transaction data;
  utilizing at least one universal variable to obtain the contextual rule from a plurality of contextual rules for different transactions, wherein the universal data variable comprises an intermediate data object that allows access to a plurality of database relational structures, disparate databases and external data sources, and wherein at least one universal variables is organized into a hierarchical structure comprising a family, a subfamily and a field name components;
  applying the applicable contextual rule to the transaction data that triggered the contextual rule;
  tagging the transaction data with transaction characteristics based on the contextual rule;
  evaluating and determining via the processor that additional transactional characteristics are needed for the transaction based at least partially on the evaluation of the contextual rule; and
  extracting additional transaction characteristics using a table-tracking syntax configured string based on the contextual rule and tagging the transaction with the additional set of transaction characteristics.

2. The method of claim 1, wherein the transaction data is received using universal variables.

3. The method of claim 1, wherein additional transaction data may be retrieved based on the transaction identifier.

4. The method of claim 1, wherein the analysis is based on transaction characteristics specified in the transaction data.

5. The method of claim 1, wherein the contextual rule may be implemented as a database trigger.

6. The method of claim 1, further comprising:
  analyzing the transaction data and the newly tagged transaction characteristics;
  determining that a second contextual rule is triggered based on the second analysis; and
  tagging the transaction with transaction characteristics based on the second contextual rule.

7. The method of claim 1, further comprising:
  determining that the transaction should be tagged with additional transaction characteristics; and
  tagging the transaction with the additional transaction characteristics.

8. The method of claim 7, wherein a human operator tags the transaction with the additional transaction characteristics.

9. The method of claim 7, wherein the tagging with the additional transaction characteristics is performed using a table-tracking syntax configured string.

10. The method of claim 7, further comprising:
  analyzing the transaction data and the newly tagged additional transaction characteristics;
  determining that a second contextual rule is triggered based on the second analysis; and
  tagging the transaction with transaction characteristics based on the second contextual rule.

11. A method of claim 1, where the transaction data associated with a transaction comprises a financial information that describes the transaction.

12. A computerized system comprising:
- a computer input device;
- a computer memory;
- a computer processor, operating on a set of computer instructions, wherein the computer instructions comprise:
  - receiving transaction data associated with an enterprise-based transaction and including at least a transaction identifier;
  - analyzing via a computer processor the received transaction data;
  - determining via the processor that a contextual rule of a plurality of contextual rules for different transactions is triggered based on the analysis of the transaction data;
  - utilizing at least one universal variable for obtaining the contextual rule from a plurality of contextual rules for different transactions, wherein the universal data variable comprises an intermediate data object that allows access to a plurality of database relational structures, disparate databases and external data sources, and wherein at least one universal variable is organized into a hierarchical structure comprising a family, a subfamily and a field name components;
  - applying the applicable contextual rule to the transaction data that triggered the contextual rule;
  - tagging the transaction data with transaction characteristics based on the contextual rule; and
  - evaluating via the computer processor whether additional transactional characteristics are needed for the transaction based at least partially on the evaluation of the contextual rule.

* * * * *